US010606452B2

(12) United States Patent
Lin-Hendel

(10) Patent No.: US 10,606,452 B2
(45) Date of Patent: Mar. 31, 2020

(54) DYNAMIC ARRAY PRESENTATION AND MULTIPLE SELECTION OF DIGITALLY STORED OBJECTS AND CORRESPONDING LINK TOKENS FOR SIMULTANEOUS PRESENTATION

(71) Applicant: Catherine G. Lin-Hendel, Summit, NJ (US)

(72) Inventor: Catherine G. Lin-Hendel, Summit, NJ (US)

(*) Notice: Subject to any disclaimer, the term of this patent is extended or adjusted under 35 U.S.C. 154(b) by 19 days.

(21) Appl. No.: 15/882,230

(22) Filed: Jan. 29, 2018

(65) Prior Publication Data
US 2018/0150191 A1     May 31, 2018

Related U.S. Application Data

(63) Continuation of application No. 13/274,166, filed on Oct. 14, 2011, now Pat. No. 9,891,785, which is a
(Continued)

(51) Int. Cl.
*G06F 3/0482*     (2013.01)
*G06F 16/95*     (2019.01)
(Continued)

(52) U.S. Cl.
CPC .......... *G06F 3/0482* (2013.01); *G06F 3/0485* (2013.01); *G06F 3/04817* (2013.01);
(Continued)

(58) Field of Classification Search
CPC .. G06F 3/0481; G06F 3/04886; G06F 16/322; G06F 16/951; G06F 16/9558
See application file for complete search history.

(56) References Cited

U.S. PATENT DOCUMENTS 5,959,621 A * 9/1999 Nawaz ................. G06F 3/14
715/733
5,970,471 A * 10/1999 Hill ..................... G06Q 30/02
705/26.8
(Continued)

OTHER PUBLICATIONS

WEbb, Martin, "Controlling Images," Aug. 10, 1997, retrieved from www.itr.org/articles/js0034 (Year: 1997).*
(Continued)

*Primary Examiner* — Eric J. Bycer
(74) *Attorney, Agent, or Firm* — Douglas L. Weller

(57) ABSTRACT

Data is configured and displayed on an interactive display screen of an electronic display device. A page of content is displayed on the interactive display screen. A designated portion of a displayed page is assigned as a thumbnail display area for displaying sets of image representations as graphical thumbnails in a thumbnail array. The thumbnails represent a category of items. Each thumbnail represents an item in the category of items. Each thumbnail is embedded with a link to an information packet describing the item with various information elements. In response to a first thumbnail in the thumbnail array being tentatively selected by a viewer, a predetermined information element in a first information packet linked to the first thumbnail is temporally displayed on a first different display area. The predetermined information element includes a larger and higher resolution image than the first thumbnail. In response to the viewer activating a determined selection of the first thumbnail, a full information packet linked to the first thumbnail is displayed on a second different display area. In response to a second thumbnail in the thumbnail array being tentatively selected by the viewer, a predetermined information element in a second information packet linked to the second thumbnail is temporally displayed on the first different display area. The second temporarily displayed information
(Continued)

element from the second information packet includes an image larger and at higher resolution than the second tentatively selected thumbnail.

16 Claims, 83 Drawing Sheets

Related U.S. Application Data continuation of application No. 09/544,036, filed on Apr. 6, 2000, now Pat. No. 8,042,063.

(51) Int. Cl.
| | | |
|---|---|---|
| *G06F 16/951* | (2019.01) | |
| *G06F 16/954* | (2019.01) | |
| *G06F 16/9535* | (2019.01) | |
| *G06F 16/955* | (2019.01) | |
| *G06F 3/0485* | (2013.01) | |
| *G06F 17/22* | (2006.01) | |
| *G06Q 30/06* | (2012.01) | |
| *H04L 29/08* | (2006.01) | |
| *G06F 3/0481* | (2013.01) | |
| *G06F 3/0488* | (2013.01) | |
| *G06F 9/451* | (2018.01) | |
| *G06F 16/958* | (2019.01) | |
| *G06F 16/957* | (2019.01) | |

(52) U.S. Cl.
CPC ............ *G06F 16/95* (2019.01); *G06F 16/951* (2019.01); *G06F 16/954* (2019.01); *G06F 16/9535* (2019.01); *G06F 16/9558* (2019.01); *G06F 17/2247* (2013.01); *G06Q 30/0625* (2013.01); *G06Q 30/0641* (2013.01); *G06Q 30/0643* (2013.01); *H04L 67/02* (2013.01); *G06F 3/0481* (2013.01); *G06F 3/04886* (2013.01); *G06F 9/451* (2018.02); *G06F 16/958* (2019.01); *G06F 16/9577* (2019.01); *G06F 2203/04803* (2013.01)

(56) References Cited

U.S. PATENT DOCUMENTS

| | | | | |
|---|---|---|---|---|
| 6,239,797 | B1 * | 5/2001 | Hills | G06F 16/958 |
| | | | | 715/784 |
| 6,337,697 | B1 * | 1/2002 | Kim | G06F 3/0485 |
| | | | | 715/784 |
| 6,341,280 | B1 * | 1/2002 | Glass | G06F 16/10 |
| | | | | 707/754 |
| 6,763,522 | B1 * | 7/2004 | Kondo | H04N 5/44543 |
| | | | | 348/E5.097 |

OTHER PUBLICATIONS

Bassler, Steve, "Yet Another Vertical Scroller Applet," Version 1.2, 1988, retrieved from mertechuniversal.com/mertech.txt (Year: 1988).*

HTML 4.0 Specification,Apr. 24, 1998, Section 16—Frames, pp. 193-205 (Year: 1998).*

* cited by examiner

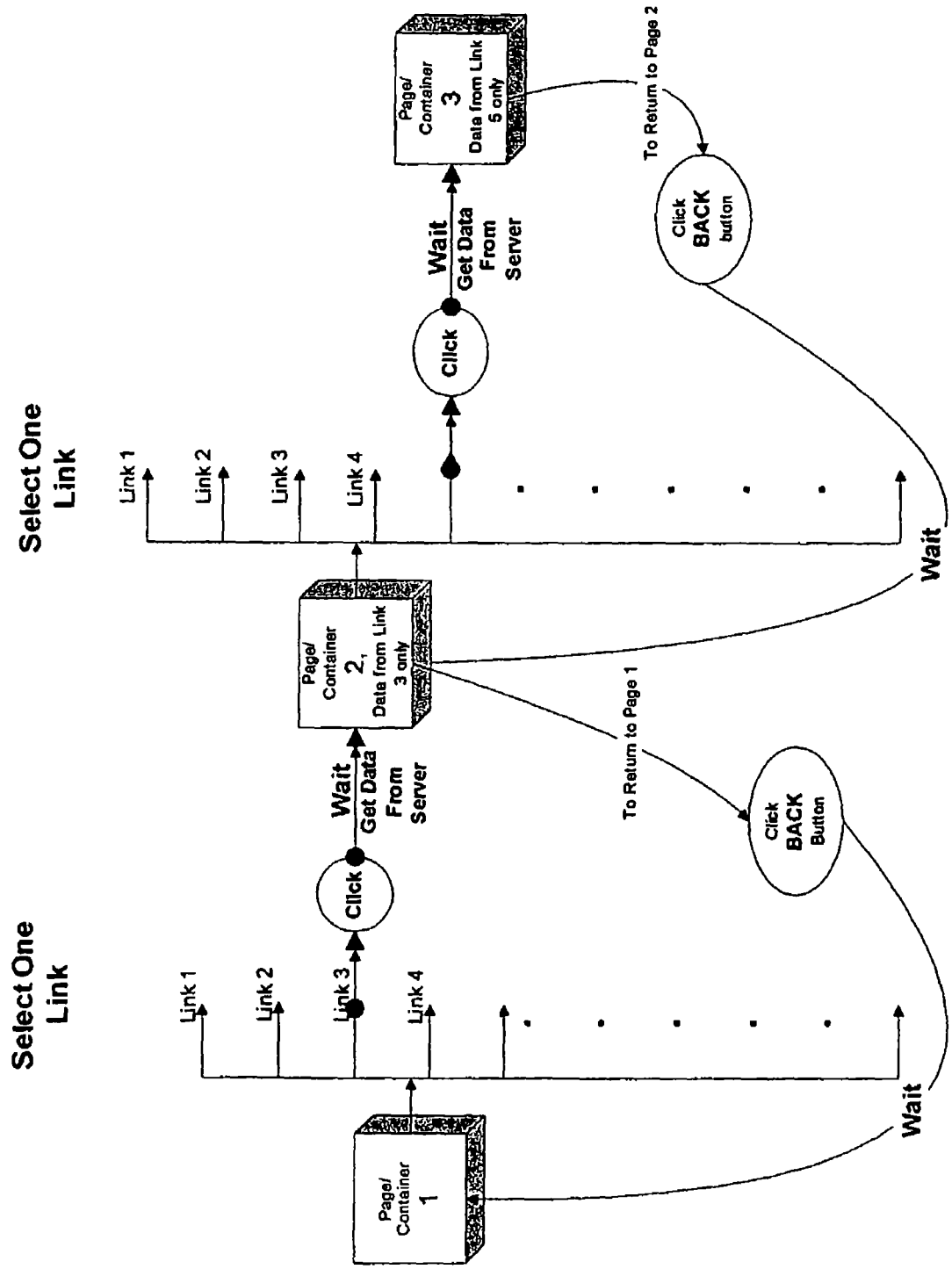
Figure 1 The Single Link Selection and Linking Process of the Prior Art

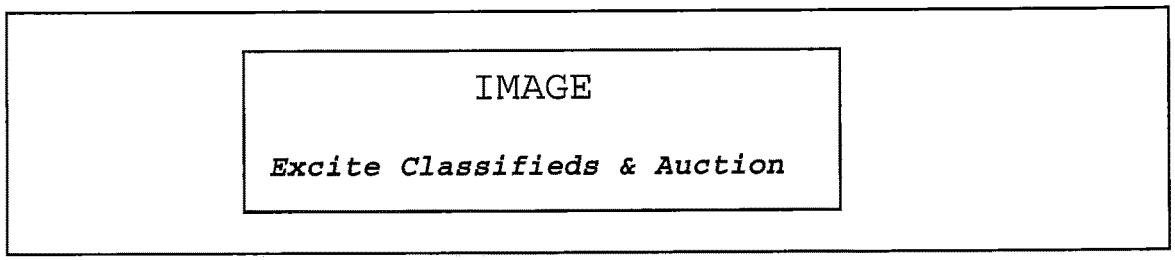

| Make - Model | YR | Miles | Price | Dlr | Phone Number | City | Area | |
|---|---|---|---|---|---|---|---|---|
| BMW 540i | 98 | 5K | $60,000 | | 650-948-6936 | Los Altos | CA | * |
| BMW 740i | 98 | 14K | $60,000 | | 408-531-1595 | San Jose | CA | * |
| BMW 740iL | 97 | 18K | $50,750 | | 510-523-9291 | Alameda | CA | * |
| Mercedes CL500 C... | 98 | 15K | $82,500 | | 408-354-3297 | Los Gatos | CA | * |
| Mercedes E320 | 98 | 19K | $62,500 | | 415-460-5984 | Marin Co... | CA | * |
| Like Spawn? X-Men? We've got action figures and more! | | | | | | | | |
| Mercedes E420 Se... | 97 | 21K | $49,950 | * | Auto Town | San Jose | CA | * |
| Mercedes S320 Se... | 97 | 29K | $55,950 | * | Auto Town | San Jose | CA | * |
| Mercedes S500 Co... | 98 | 15K | $82,500 | | 408-354-3297 | Los Gatos | CA | * |
| BMW M3 DINAN Sta... | 97 | 4K | $49,000 | | 714-730-5425 | Tustin | CA | * |
| Mercedes S500 | 98 | 69K | $48,900 | * | 800-608-2886 | Los Ange... | CA | * |
| The clock is ticking! Click for NEW COLLECTIBLE Auctions. | | | | | | | | |
| Mercedes SL320 | 97 | 9K | $64,950 | * | 949-584-9420 | Laguna B... | CA | * |
| Jaguar XJ-R | 98 | 4K | $58,500 | | 303-861-1181 | Denver | CO | * |
| Mercedes S600 Co... | 97 | 18K | $100,000 | | 303-534-2757 | Denver | CO | * |
| Jaguar Vanden Pl... | 97 | 10K | $52,000 | | 203-625-0292 | Greenwich | CT | * |
| BMW 540i A Ltd. ... | 98 | 7K | $51,000 | | 561-366-0027 | West Pal... | FL | * |
| Search THE LARGEST classifieds & auctions site on the Web! | | | | | | | | |
| BMW 540i Sport 6... | 97 | 19K | $48,780 | * | 954-527-3300 | Fort Lau... | FL | * |
| BMW 540i | 99 | 6K | $48,988 | * | 813-933-2811 | Tampa | FL | * |
| BMW 540i | 99 | 2K | $54,750 | | | Ft. Laud... | FL | * |
| BMW 540i | 98 | 9K | $48,998 | * | 813-933-2811 | Tampa | FL | * |
| BMW 540i | 98 | 4K | $48,998 | * | 813-933-2811 | Tampa | FL | * |
| The clock is ticking! Click here for COLLECTIBLES Auctions! | | | | | | | | |

◨ = Photo in ad
† = Outside US, Canada, and UK

FIG. 2A
Prior Art

```
┌─────────────────────────────────────────┐
│                                         │
│              IMAGE                      │
│                                         │
│      Excite Classifieds & Auction       │
│                                         │
│                                         │
└─────────────────────────────────────────┘

┌───────────────────────┐
│                       │
│       IMAGE           │
│                       │
│     Search Ads        │
│                       │
└───────────────────────┘
```

◄◄ Prev 20 | New Search | Next 20 ►►

Displaying 21 - 40 of 106 classified ads          Click on column headers to sort

| Make - Model | YR | Miles | Price | Dlr | Phone Number | City | Area | 📷 |
|---|---|---|---|---|---|---|---|---|
| BMW 740iL | 97 |  | $48,999 | * | 813-933-2811 | Tampa | FL | * |
| BMW 740iL | 97 | 25K | $51,998 | * | 813-933-2811 | Tampa | FL | * |
| BMW 740iL | 97 | 28K | $52,870 | * | 954-527-3300 | Fort Lau... | FL | * |
| Audi A8 QUATTRO | 98 | 15K | $54,990 | * | 847-432-5020 | Highland... | IL | * |
| BMW 528i | 99 |  | $48,270 | * | 708-481-9400 | Chicago ... | IL | * |
| Like Spawn? X-Men? We've got action figures and more! |
| BMW 540 I | 97 | 22K | $48,995 | * | 630-241-4848 | Downers ... | IL | * |
| BMW 540 IA | 98 | 10K | $51,995 | * | 847-604-5000 | Lake Blu... | IL | * |
| BMW 540 SPORT | 98 | 5K | $53,995 | * | 630-443-1600 | West Chi... | IL | * |
| BMW 540i SPORT | 99 | 3K | $56,900 | * | 217-528-2277 | Springfi... | IL | * |
| BMW 540i | 99 |  | $52,420 | * | 708-481-9400 | Chicago ... | IL | * |
| Crazy about collecting? We've got porcelain, stamps and more |
| BMW 740 I | 98 | 12K | $51,995 | * | 847-604-5000 | Lake Blu... | IL | * |
| BMW 740 IA | 97 | 26K | $50,900 | * | 847-843-4000 | Schaumbu... | IL | * |
| BMW 740 IL | 97 | 33K | $49,988 | * | 847-843-4000 | Schaumbu... | IL | * |
| BMW 740 IL | 97 | 30K | $50,900 | * | 847-843-4000 | Schaumbu... | IL | * |
| BMW 740iL | 99 |  | $71,495 | * | 708-481-9400 | Chicago ... | IL | * |
| Obsessed with collecting? We've got THOUSANDS of listings! |
| BMW 750iL | 98 | 8K | $75,000 | * | 630-968-3201 | Downers ... | IL | * |
| BMW 840Ci | 97 | 21K | $55,900 | * | 847-843-4000 | Schaumbu... | IL | * |
| BMW M3 DIMAN | 98 | 1K | $54,995 | * | 847-604-5000 | Lake Blu... | IL | * |
| Jaguar XJ6 VANDE... | 97 | 20K | $48,778 | * | 773-227-3200 | Chicago | IL | * |
| Jaguar XK8 CONVE... | 98 | 5K | $65,955 | * | 630-668-8870 | Wheaton | IL | * |
| Thousands of Beanie Babies for sale now! |

📷 = Photo in ad
† = Outside US, Canada, and UK

FIG. 2B
Prior Art

```
┌─────────────────────────────────────────────────────┐
│              ┌──────────────────────────┐           │
│              │         IMAGE            │           │
│              │                          │           │
│              │ Excite Classifieds & Auction │       │
│              │                          │           │
│              └──────────────────────────┘           │
│                                                     │
│      ┌──────────────────┐                           │
│      │      IMAGE       │                           │
│      │   Search Ads     │                           │
│      └──────────────────┘                           │
└─────────────────────────────────────────────────────┘
```

◄◄ Prev 20 | New Search | Next 20 ►►

Displaying 41 - 60 of 106 classified ads                     Click on column headers to sort

| Make - Model | YR | Miles | Price | Dlr | Phone Number | City | Area | 📷 |
|---|---|---|---|---|---|---|---|---|
| Jaguar XK8 CONVE... | 98 | 16K | $66,500 | * | 847-256-0606 | Wilmette | IL | * |
| Jaguar XK8 CONVE... | 98 | 13K | $66,500 | * | 847-256-0606 | Wilmette | IL | * |
| Jaguar XK8 CONVE... | 98 | 12K | $67,500 | * | 847-256-0606 | Wilmette | IL | * |
| Jaguar XK8 CONVE... | 97 | 33K | $52,000 | * | 847-256-0606 | Wilmette | IL | * |
| Jaguar XK8 CONVE... | 97 | 17K | $58,000 | * | 847-256-0606 | Wilmette | IL | * |
| Like Spawn? X-Men? We've got action figures and more! | | | | | | | | |
| Jaguar XK8 CONVE... | 97 | 10K | $61,900 | * | 217-528-2277 | Springfi... | IL | * |
| Jaguar XK8 COUPE | 97 | 6K | $55,900 | * | 847-256-0606 | Wilmette | IL | * |
| Jaguar XK8 | 97 | 6K | $52,375 | * | 630-668-8870 | Wheaton | IL | * |
| Lexus LS400 | 98 | 8K | $52,900 | * | 217-528-2277 | Springfi... | IL | * |
| Lexus LX450 | 98 | 1K | $56,995 | * | 630-323-5600 | Westmont | IL | * |
| Serious about collecting? Click for coins, stamps and more! | | | | | | | | |
| Mercedes S600 | 97 | 17K | $98,900 | * | 217-528-2277 | Springfi... | IL | * |
| Mercedes SL320 R... | 97 | 22K | $59,900 | * | 708-460-0400 | Orland P... | IL | * |
| Mercedes SL500 C... | 98 | 4K | $75,960 | * | 847-234-1700 | Lake Blu... | IL | * |
| Mercedes SL500 | 98 | 3K | $74,995 | * | 630-443-1600 | West Chi... | IL | * |
| Mercedes SL500 | 98 | 4K | $76,960 | * | 847-234-1700 | Lake Blu... | IL | * |
| Sell your old comic books, toys and trading cards. FREE! | | | | | | | | |
| Mercedes SL500 | 97 | 3K | $69,900 | * | 708-460-0400 | Orland P... | IL | * |
| Mercedes SL500 | 97 | 7K | $70,000 | * | 630-968-3201 | Downers ... | IL | * |
| Mercedes SL500 | 97 | 21K | $74,100 | * | 708-448-5822 | Worth | IL | * |
| Mercedes SL500 | 97 | 2K | $89,900 | * | 708-448-5822 | Worth | IL | * |
| Mercedes SL600 C... | 98 | 14K | $97,900 | * | 217-528-2277 | Springfi... | IL | * |

📷 = Photo in ad
† = Outside US, Canada, and UK

FIG. 2C
Prior Art

```
┌─────────────────────────────────────────────────┐
│                                                 │
│              IMAGE                              │
│                                                 │
│         Excite Classifieds & Auction            │
│                                                 │
└─────────────────────────────────────────────────┘

┌──────────────────────┐
│       IMAGE          │
│     Search Ads       │
└──────────────────────┘
```

◄◄ Prev 20 | New Search | Next 20 ►►

Displaying 61 - 80 of 106 classified ads — Click on column headers to sort

| Make - Model | YR | Miles | Price | Dlr | Phone Number | City | Area | 📷 |
|---|---|---|---|---|---|---|---|---|
| Mercedes SL600 S... | 97 | 7K | $99,995 | * | 630-443-1600 | West Chi... | IL | * |
| Rolls royce Silv... | 98 | | $190,892 | * | 630-655-3535 | Hinsdale | IL | * |
| Mercedes S500 | 98 | 22K | $69,900 | | 317-578-3311 | Oaklandon | IN | * |
| Mercedes CLK-GTR | 98 | 12K | $750,000 | | 502-345-2970 | Mayfield | KY | * |
| BMW 540i | 97 | 26K | $51,980 | * | Special | Marlow H... | MD | * |
| The clock is ticking! Click here for COLLECTIBLES Auctions! | | | | | | | | |
| BMW 740i | 98 | 14K | $58,990 | * | Special | Marlow H... | MD | * |
| BMW 740i | 97 | 44K | $52,495 | * | Special | Marlow H... | MD | * |
| BMW 740iL | 97 | 38K | $48,500 | * | Special | Silver S... | MD | * |
| BMW 740iL | 97 | 35K | $48,500 | * | Special | Silver S... | MD | * |
| BMW 740iL | 97 | 27K | $49,900 | * | Special | Cockeysv... | MD | * |
| Like Spawn? X-Men? We've got action figures and more! | | | | | | | | |
| BMW 740iL | 97 | 26K | $51,995 | * | Special | Cockeysv... | MD | * |
| BMW 740iL | 97 | 39K | $54,990 | * | Special | Marlow H... | MD | * |
| BMW 540i | 98 | 5K | $54,900 | * | 781-671-6678 | Norwood | MA | * |
| Mercedes 500 CL | 99 | 2K | $99,000 | * | 781-671-6678 | Boston | MA | * |
| Mercedes 500SL R... | 98 | 7K | $86,650 | | 413-746-2266 | West Spr... | MA | |
| Thousands of Art & Antiques for sale now! | | | | | | | | |
| Audi A8 Quattro | 97 | 11K | $49,900 | * | Special | Minneapo... | MN | * |
| BMW 740iL | 97 | 24K | $51,995 | * | | Minneton... | MN | * |
| Jaguar XK8 COUPE | 97 | 9K | $49,500 | * | 417-831-6065 | Springfi... | MO | * |
| Mercedes CLK320 ... | 99 | 5K | $56,500 | | 877-838-8363 | Blue Spr... | MO | * |
| BMW 740i SEDAN 4D | 98 | 11K | $56,995 | * | 716-359-7373 | Rochester | NY | * |
| Obsessed with collecting? We've got THOUSANDS of listings! | | | | | | | | |

📷 = Photo in ad
† = Outside US, Canada, and UK

FIG. 2D
Prior Art

[IMAGE: Excite Classifieds & Auction]

[IMAGE: Search Ads]

◄◄ Prev 20 | New Search | Next 20 ►►

Displaying 81 - 100 of 106 classified ads     Click on column headers to sort

| Make - Model | YR | Miles | Price | Dlr | Phone Number | City | Area | 📷 |
|---|---|---|---|---|---|---|---|---|
| Mercedes S CLASS... | 97 | 22K | $54,050 | * | 716-424-4740 | Rochester | NY | * |
| Mercedes SLK230 | 99 | 2K | $48,600 | | 704-460-4438 | Gastonia | NC | * |
| Acura NSX T | 97 | 14K | $72,500 | | 918-581-6075 | Tulsa | OK | * |
| Mercedes E 430 | 98 | 11K | $49,000 | | 918-584-0506 | Tulsa | OK | * |
| BMW 740 740i | 97 | 5K | $57,240 | * | | Beaverton | OR | * |

Search THE LARGEST classifieds & auctions site on the Web!

| | | | | | | Beaverton | OR | * |
|---|---|---|---|---|---|---|---|---|
| BMW 740 740iL | 98 | 11K | $59,000 | * | | | | |
| Mercedes E420 SP... | 97 | 18K | $49,500 | | 215-295-7695 | Morrisvl... | PA | * |
| Mercedes CLK430 | 99 | 4K | $48,500 | | 864-422-5247 | Greenvil... | SC | * |
| Jaguar XK8 Coupe | 97 | 6K | $64,000 | | 512-327-9359 | Austin | TX | * |
| BMW 540i | 98 | 2K | $52,900 | * | Special | Houston | TX | * |

Don't miss out! Thousands of COLLECTIBLES at Classifieds2000

| Mercedes E420 SP... | 97 | 19K | $49,950 | * | 281-772-7373 | Houston | TX | * |
|---|---|---|---|---|---|---|---|---|
| Mercedes E420 | 97 | 30K | $48,851 | * | Special | Houston | TX | * |
| Mercedes E420 | 97 | 4K | $57,900 | * | 713-869-3300 | HOUSTON | TX | * |
| Mercedes S320 | 97 | 26K | $53,025 | * | Special | Houston | TX | * |
| Mercedes SL320 | 97 | 24K | $58,914 | * | Special | Houston | TX | * |

Sell your old comic books, toys and trading cards. FREE!

| Mercedes SL320 | 97 | 19K | $60,550 | * | Special | Houston | TX | * |
|---|---|---|---|---|---|---|---|---|
| Mercedes SL500 S... | 98 | 3K | $75,950 | * | 281-772-7373 | Houston | TX | * |
| Mercedes SL500 | 98 | 8K | $73,789 | * | Special | Houston | TX | * |
| Mercedes SL500 | 97 | 37K | $68,900 | * | Special | Houston | TX | * |
| BMW 540i | 98 | 10K | $49,998 | * | | Milwaukee | WI | * |

Time is running out! Click here for NEW COLLECTIBLE Auctions.

📷 = Photo in ad
† = Outside US, Canada, and UK

FIG. 2E
Prior Art

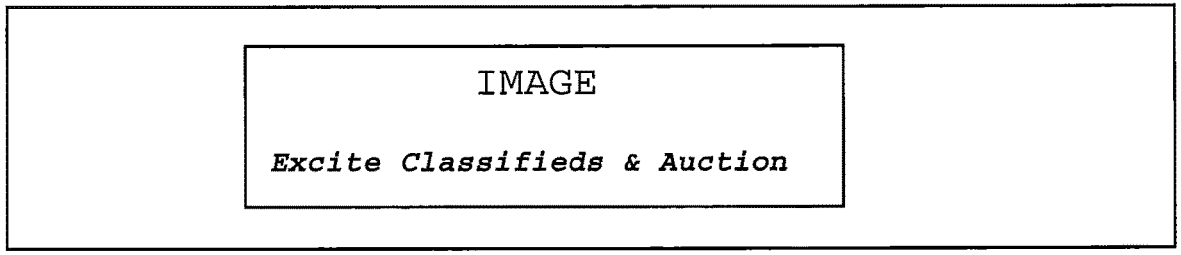

| Make - Model | YR | Miles | Price | Dlr | Phone Number | City | Area |
|---|---|---|---|---|---|---|---|
| BMW 740iL | 98 | 18K | $57,998 | * | | Milwaukee | WI * |
| Mercedes E420 | 97 | 18K | $49,998 | * | | Milwaukee | WI * |
| Lincoln Continen... | 98 | 2K | $49,995 | * | 403-434-8411 | Edmonton | AB * |
| Like Spawn? X-Men? We've got action figures and more! | | | | | | | |
| Cadillac DeVille... | 98 | | $49,995 | * | 204-786-3811 | Winnipeg | MB * |
| Lexus LS400 Base | 97 | 24K | $62,900 | * | 416-751-1530 | Scarboro... | ON * |
| Mercedes 280 C | 98 | 11K | $55,810 | * | 705-728-1883 | Barrie | ON * |
| Click here for car insurance information. | | | | | | | |

Displaying 101 - 106 of 106 classified ads
Click on column headers to sort

◉ = Photo in ad
† = Outside US, Canada, and UK

FIG. 2F
Prior Art

```
┌─────────────────────────────────────────────┐
│        ┌─────────────────────────┐          │
│        │         IMAGE           │          │
│        │ Excite Classifieds & Auction │     │
│        └─────────────────────────┘          │
└─────────────────────────────────────────────┘

┌──────────────────────────┐
│         IMAGE            │
│       Search Ads         │
└──────────────────────────┘

┌─────────────────────────────────────┐
│     ┌──────────────────────┐        │
│     │        IMAGE         │        │
│     │                      │        │
│     │  Car, 1997 BMW 740iL │        │
│     └──────────────────────┘        │
│                                     │
└─────────────────────────────────────┘
```

| | |
|---|---|
| Car | 1997, BMW 740iL, Listed without mileage, $48,999 |
| Options | 8-Cyl. |
| Description | stock number L992440A |
| Vehicle ID | WBAGJ8327VDM06863 |
| Seller Info | [ Send message ] |
| | For sale by Dealer (Buying from a Dealer) |
| | Reeves Import Motorcars |
| | info@reevesimportmotorcars.com |
| | (813) 933-2811 [Day] |
| | Tampa, Florida 33612 |
| Post Date | 11-MAR-99 |

Think a friend might be interested in this ad? Send a copy!

If you find this ad to be in violation of our Terms of Participation, please notify us.

[◄ Prev] [Back To List] [Next ►]   [Cool Notify] [Add To Hot List]

FIG. 2G
Prior Art your personal trading community™

Search tips categories

Antiques (49601)
Books, Movies, Music (227582)
Coins & Stamps (73416)
Collectibles (611226)
Computers (66096)
Dolls, Figures (40230)
Jewelry, Gemstones (72851)
Photo & Electronics (30945)
Pottery & Glass (123834)
Sports Memorabilia (234439)
Toys & Beanies (219822)
Miscellaneous (148117)
all categories...

Sell your item new users
Click here

Get news and chat

Register
It's free and fun featured

Star Wars Episode 1 Supersale - 7 Poster Set!
70+ Sports Autographs Sale! Mantle, DiMaggio...
New Powerful 650 Watts Subwoofer + 4 Speakers
Star Wars Set Of 7 Posters - Start at 29.99!
2 Ct. Diamond Tennis S-Link Bracelet 70% off!!
Norton AntiVirus 5.0 Utilities 3 + More La-di-K more featured...

stats 1,902,115 items for sale in 1,588 categories now!
Over 600 million page views per month!

Click here for Rosie's charity auctions!

other happenings

Read about your eBay community. Check out eBay Life, the new monthly newsletter.

other happenings...

About eBay | SafeHarbor | Bookmarks | eBay Store | Jobs
Go Global! | Canada | UK Last updated: 04/13/99, 11:45:01 PDT

  

Copyright © 1995-1999 eBay Inc. All Rights Reserved.
Use of this Web site constitutes acceptance of the eBay User Agreement.

FIG. 3A
Prior Art

STAR WARS SET OF 7 POSTERS - START at 29.99! (Item #89889815)

| | |
|---|---|
| Minimum bid | $29.99 |
| Minimum bid | $29.99 |

Registration required. eBay requires registration in order to bid. Find out how to become a registered user. It's fast and it's free!

User ID or E-mail address        Password (forgotten it?)

Quantity you are bidding for.

_____ Current minimum bid is 29.99  [review bid]

Your maximum bid. (The amount you are offering for each item.)

Please type only numerals and the decimal point (if required). Do not include currency symbols such as a dollar sign ('$') or commas (',').

Binding contract.
Placing a bid is a binding contract in many states. Do not bid unless you intend to buy this item at the amount of your bid.

This is a Dutch auction
Please refer to the preceding link for the rules governing Dutch auctions before bidding.
If you have bid on this item before, note that your new total value must be greater than your previous one.
Total value is determined by multiplying the quantity you are bidding for by the amount bid per item.

Home Listings Buyers Sellers Search Help News/Chat Site Map

About eBay | SafeHarbor

*Copyright © 1995-1999 eBay Inc. All Rights Reserved.*
All trademarks and brands are the property of their respective owners.
Use of this web site constitutes acceptance of the eBay User Agreement and Privacy Policy.

FIG. 3C
Prior Art

Home Listings Buyers Sellers Search Help News/Chat Site Map

Join in the effort to help the Kosovo Refugees – click here to learn more.
You're insured! Learn more about the free insurance available to eBay members.

NEW POWERFUL 650 WATTS SUBWOOFER + 4 SPEAKERS
Item #88790424

Computers:Hardware:Multimedia

Description

Bid!

| | | | | |
|---|---|---|---|---|
| Lowest | $44.00 | First bid | $44.00 | |
| Quantity | 200 | # of bids | 3 (bid history) (with emails) | |
| Time left | 2 days, 8 hours + | Location | California | |
| Started | 04/08/99 20:23:52 PDT | (mail this auction to a friend) | | |
| Ends | 04/15/99 20:23:52 PDT | (request a gift alert) | | |
| | | Featured & Featured Category Auction | | |
| Seller | computerbiz (1013) ★ | | | |
| | (view comments in seller's Feedback Profile) (view seller's other auctions) (ask seller a question) | | | |
| High bids | see Dutch high bidders (include emails) | | | |
| Payment | See item description for payment methods accepted | | | |
| Shipping | See item description for shipping charges | | | |

Seller assumes all responsibility for listing this item. You should contact the seller to resolve any questions before bidding. Currency is U.S. dollars (US$) unless otherwise noted.

Description

650 Watts PMPO PC Surround System
Power Subwoofer & 4 Satellite Speakers
Why Spend $190 for something like this if you can buy here for only
$44.00!!
BRAND NEW IN RETAIL BOX!!

FIG. 3D
Prior Art

IMAGE

"BOKA Multimedia Speaker"

SW-200

BOKA Speakers

Powerful Lifelike Sound Quality
Subwoofer Extends Low Frequency Dynamics
Connects to any Computer, Television, Boombox, Shelf System, CD Player
Magnetically Shielded to Prevent Distortion and Data Loss
Windows 95/98 Compatible
CE Approved
Input Impedance, 10K Ohms
Frequency Response: 42 Hz, 18 KHz, 3dB
Subwoofer is about 10 Inches High and Satellite Speakers is about 4 Inches Cube.

FIG. 3E
Prior Art

Bidding

NEW POWERFUL 650 WATTS SUBWOOFER + 4 SPEAKERS (Item #88790424)

| | |
|---|---|
| Minimum bid | $44.00 |
| Minimum bid | $44.00 |

Registration required. eBay requires registration in order to bid. Find out how to become a registered user. It's fast and it's free!

User ID or E-mail address     Password (forgotten it?)

Quantity you are bidding for.

_____ Current minimum bid is 44.00  | review bid |

Your maximum bid. (The amount you are offering for each item.)

Please type only numerals and the decimal point (if required). Do not include currency symbols such as a dollar sign ('$')or commas (',').

Binding contract.
Placing a bid is a binding contract in many states. Do not bid unless you intend to buy this item at the amount of your bid.

This is a Dutch auction
Please refer to the preceding link for the rules governing Dutch auctions before bidding.
If you have bid on this item before, note that your new total value must be greater than your previous one.
Total value is determined by multiplying the quantity you are bidding for by the amount bid per item.

Home Listings Buyers Sellers Search Help News/Chat Site Map

About eBay | SafeHarbor

Copyright © 1995-1999 eBay Inc. All Rights Reserved.
All trademarks and brands are the property of their respective owners.
Use of this web site constitutes acceptance of the eBay User Agreement and Privacy Policy.

FIG. 3F
Prior Art eBay bid history for NEW POWERFUL 650 WATTS SUBWOOFER + 4 SPEAKERS (item #88790424)

If you have questions about this item, please contact the seller at the User ID provided below. Seller assumes all responsibility for listing this item.

```
Last bid for this item:      $44.00
Date auction ends:           04/15/99 20:23:52 Pacific Daylight Time
Date auction started:        04/08/99 20:23:52 Pacific Daylight Time
Seller:                      computerbiz (1018) ★
First bid at:                $44.00
Number of bids made:         4 (may include multiple bids by same bidder)
```

All bids in this Dutch Auction:

```
coastair@earthlink.net (0)
        Last bid at:         $44.00
        Quantity bid for:    1
        Date of bid:         04/09/99 08:45:23 Pacific Daylight Time solidus (3)
        Last bid at:         $44.00
        Quantity bid for:    1
        Date of bid:         04/09/99 23:17:18 Pacific Daylight Time llastimo@uswest.net (0)
        Last bid at:         $44.00
        Quantity bid for:    1
        Date of bid:         04/11/99 09:44:07 Pacific Daylight Time stilgar79 (0)
        Last bid at:         $44.00
        Quantity bid for:    1
        Date of bid:         04/13/99 11:59:01 Pacific Daylight Time
```

Bid retraction and cancellation history (if any):

There are no bid retractions.

FIG. 3G
Prior Art

Consumer Electronics (14907)
General (4144)
Audio Equipment (5316)
Radio Equipment (3736)
Telephone (1049)
Test Equipment (662)

Video Equipment (1726)

Photo Equipment (14290)
General (1598)
Accessories (1192)
Lenses (1292)
Lighting, Meters (499)
Subminiature (171)
Medium Format (921)
Large Format (364)
35mm (2927)
Movie (953)
Darkroom Equipment (537)
Vintage, Collectible (3121)
Instruction, Manuals (715)

 Search tips
Search only in Photo & Electronics
Search titles and descriptions Chat about Photo Equipment

 Featured Auctions
PROTON receiver: Budget audiophile classic!NR
115 Motorola Pagers- Start Your Own Business!
Qualcomm QCP-800 CDMA Digital Phone - NO RSV!

Inside Scoop
New to photography or photography equipment? Or are you a veteran with tips to share? Click here to read tips on buying and selling photography equipment and more.

 Express Yourself
Which company is your favorite manufacturer of photo equipment? Click here to share your thoughts and see what other people wrote. Have a question you think we should ask? Email us at photo@ebay.com.

FIG. 4A
Prior Art

Updated: 04/13/99, 14:00 PDT Check eBay official time
Use your browser's reload button to see the latest version.

[ ] Search
☐ Search only in Photo Equipment : Large Format
☐ Search within titles and descriptions Sell your item in the Photo Equipment : Large Format category NEW!

◄ Top : Photo & Electronics : Photo Equipment : Large Format ►
Current Auctions Current | New Today | Ending Today | Completed | Going, Going, Gone

Featured Auctions in Large Format
Current Auctions

To find out how to be listed in this section and seen by thousands, please visit this link.

| Item | Price | Bids | Ends PDT |
|---|---|---|---|
| Calumet 4x5 View Camera Outfit, Ready to GO! | $497.99 | 13 | 04/18 16:04 |

All Items in Large Format
Current Auctions
For more items in this category, click these pages:
■ 1 ■ 2 3 4 5 6 7 8 (next page)

| Item | Price | Bids | Ends PDT |
|---|---|---|---|
| NEW! Goerz Red Dot Artar 19" f/11 Lens- Exc! Pic | $100.00 | - | 04/20 13:46 |
| NEW! Handpainted Background Muslin 8X10' NR! New! Pic | $40.00 | - | 04/18 13:33 |
| NEW! NEW HP 755CM 36" Color Printer/Plotter | $5000.00 | - | 04/20 13:25 |
| NEW! Schneider Angulon 65mm f/6.8 Excellent+ Pic | $75.00 | - | 04/20 13:02 |
| NEW! Kodak Anistigmat f/7/7 203mm Lens- No Reserve Pic | $24.50 | - | 04/20 11:32 |
| NEW! ---> Polaroid Land Photography Book - Classic Pic | $5.00 | - | 04/20 11:16 |
| NEW! Heiland Flashgun for View Camera/lightsaber | $10.00 | - | 04/16 11:12 |
| NEW! ----------> Kodak Ektar 127mm Lens Pic | $5.00 | - | 04/20 10:51 |
| NEW! Graflex Graflite 3 Cell Flash with Reflector Pic | $5.00 | 1 | 04/20 10:10 |
| NEW! Graflex Graflite 2 Cell Flash with Reflector Pic | $5.00 | - | 04/20 10:08 |
| NEW! HOBO 8x10 handheld large format camera Pic | $375.00 | 1 | 04/20 09:22 |
| NEW! Seneca Camera Mfg 8X10 View Camera | $25.00 | - | 04/20 08:42 |
| NEW! GRAPHIC MONO RAIL VIEW CAMERA &CASE MINT- | $66.76 | 2 | 04/18 08:17 |
| NEW! 8 1/2" 212mm f6.3 Commerical Ektar lens | $25.00 | - | 04/20 08:05 |
| NEW! 4X5 Graphic Graphmatic film holder | $10.00 | - | 04/18 07:36 |
| NEW! Cambo 4x5 SF Super Field View Camera | $50.00 | - | 04/20 07:34 |
| NEW! TWO FIDELITY DELUXE 8X10 FILM HOLDERS Pic | $30.00 | - | 04/20 07:34 |
| NEW! Cambo 4x5 Master PC | $700.00 | - | 04/20 07:31 |

FIG. 4B
Prior Art

| Item | Price | Bids | Date/Time |
|---|---|---|---|
| NEW! 4X5 speed,crown or Super Graphic lens board | $12.75 | 1 | 04/20 07:04 |
| NEW! Oversize 7x Loupe with inch/mm scale PIC | $20.00 | - | 04/20 06:56 |
| NEW! (2) 4x5 large Format Film Cartridges {PIC} PIC | $1.00 | - | 04/16 06:23 |
| NEW! Gran View 4x5 w/Schneider Xenar 135/4.7 *LN* PIC | $550.00 | 1 | 04/20 03:49 |
| NEW! Kodak 5x7 film holders PIC | $5.00 | 2 | 04/20 00:34 |
| NEW! Bellows for Sinar P Large Format Camera | $20.50 | 2 | 04/19 22:37 |
| NEW! Wollensak Raptar 302 mm Lens for 4X5 | $200.00 | - | 04/17 21:55 |
| NEW! MPP 4x5 Monorail View Camera/Lens/Bellows | $55.00 | 4 | 04/19 21:31 |
| NEW! 8X10 BEATTIE INTENSCREEN-"WOW" NO RESERVE PIC | $148.45 | 6 | 04/19 20:39 |
| NEW! ** 1960 German publ - Internat. Photo Technik PIC | $9.99 | - | 04/19 20:33 |
| NEW! 8x10 Film Holder, barely used PIC | $25.00 | - | 04/19 20:23 |
| NEW! Lensboard Assortment | $35.00 | - | 04/19 20:21 |
| NEW! Horseman or Sinar Lens board - new in box PIC | $30.00 | 1 | 04/19 20:20 |
| NEW! (6) 4x5 FIDELITY SHEET FILM HOLDERS | $10.00 | 1 | 04/17 20:04 |
| NEW! Linhof twin shank profile tripod PIC | $95.00 | - | 04/19 19:58 |
| NEW! 4X5 FILM: T-MAX 400, 25 sheets *NO RESERVE* PIC | $7.50 | 2 | 04/19 19:34 |
| NEW! Wista 45DXII W/shift New in box | $510.00 | 2 | 04/19 19:32 |
| NEW! LINHOF TECHNIKA III FLAT BOARD PIC | $8.50 | 2 | 04/19 19:18 |
| NEW! LINHOF TECHNIKA III RECESSED BOARD PIC | $8.50 | 2 | 04/19 19:16 |
| NEW! ILEX #5 FLANGE PIC | $15.50 | 3 | 04/19 19:14 |
| NEW! THREE 8x10 FIDELITY HOLDERS. PIC | $31.00 | 9 | 04/19 19:03 |
| NEW! 4X5 Speed Graphic with 6.5" ILEX No.3 SYNCHRO PIC | $66.00 | 2 | 04/19 18:57 |
| NEW! Kodak 12in/f6.3 Commericial Ektar View Lens | $100.00 | - | 04/19 18:37 |
| NEW! 7 5X7 CUT FILM HOLDERS. NO RESERVE | $5.00 | - | 04/19 18:35 |
| NEW! Old Lg. & Med. Format Eastman View Camera PIC | $135.50 | 6 | 04/19 18:31 |
| NEW! Kodak 250mm/f6.3 Wide Field Ektar View Lens | $102.50 | 2 | 04/19 18:28 |
| NEW! 4X5 POLAROID BACK. NO RESERVE | $5.00 | 1 | 04/19 18:28 |
| NEW! 4X5 GRAFLEX GRAFLARGER N.R. | $7.01 | 3 | 04/19 18:21 |
| NEW! Goerz 19IN/f11 Artar View Camera Lens/Shutt | $113.50 | 2 | 04/19 18:19 |
| NEW! Goerz 14IN/f9 Red Dot Artar View Lens Shutter | $100.00 | 1 | 04/19 18:13 |
| NEW! Goerz 10 3/4IN/f9 Red Dot Artar View Lens/Shu | $100.00 | 1 | 04/19 17:58 |

For more items in this category, click these pages:
= 1 = 2 3 4 5 6 7 8 (next page)

Top : Photo & Electronics · Photo Equipment : Large Format

Click on a title to get a description and to bid on that item. A red ending time indicates that an auction is ending in less than five hours. These items are not verified by eBay; caveat emptor. This page is updated regularly; don't forget to use your browser's reload button for the latest version. The system may be unavailable during regularly scheduled maintenance, Mondays, 12 a.m. to 4 a.m. Pacific Time (Mondays, 00:01 a.m. to 04:00 a.m. eBay time).

FIG. 4C
Prior Art

Join in the effort to help the Kosovo Refugees – click here to learn more.
You're insured! Learn more about the free insurance available to eBay members.

Arca-Swiss 4x5 Back (Toyo 6x9 Quick Slider)
Item #90188995

Photo & Electronics:Photo Equipment:Large Format

| | | | |
|---|---|---|---|
| Starts at | $295.00 | First bid | $295.00 |
| Quantity | 1 | # of bids | 0 (bid history) (with emails) |
| Time left | 5 days, 11 hours + | Location | So. Florida |
| Started | 04/12/99 03:37:46 PDT | | (mail this auction to a friend) |
| Ends | 04/19/99 03:37:46 PDT | | (request a gift alert) |
| Seller | tomlynn (4) | | |
| | (view comments in seller's Feedback Profile) (view seller's other auctions) (ask seller a question) | | |
| High bid | -- | | |
| Payment | Money Order/Cashiers Checks | | |
| Shipping | Buyer pays fixed shipping charges | | |
| Update item | Seller: If this item has received no bids, you may revise it. | | |

Seller assumes all responsibility for listing this item. You should contact the seller to resolve any questions before bidding. Currency is U.S. dollars (US$) unless otherwise noted.

Description

Toyo 6x9 Sliding Rollfilm Back Adapted to fit Arca-Swiss 4x5. The back has been fitted to an Arca-Swiss 4x5 lens board to allow atachment to the camera back. The Quick Sliding Adapter accepts all 6x7 and 6x9cm Graflock type rollfilm backs and has a carriage that slides the rollfilm back with a groundglass in and out of place for fast change from groundglass focusing to shooting. Built-in darkslide engages when groundglass is in flim plane. The unit is in excellent condition and performs like a champ. Add $10.00 S&H Fedex Econo.

```
IMAGE
"Arca-Swiss 4x5
Back (Toyo 6x9
Quick Slider)"
```

Bidding

Arca-Swiss 4x5 Back (Toyo 6x9 Quick Slider) (Item #90188995)

FIG. 4D
Prior Art

| | |
|---|---|
| Starts at | $295.00 |
| Bid increment | $5.00 |
| Minimum bid | $295.00 |

Registration required. eBay requires registration in order to bid. Find out how to become a registered user. It's fast and it's free!

| User ID or E-mail address | Password (forgotten it?) |
|---|---|
| | |

| Current minimum bid is 295.00 | review bid |
|---|---|

Your maximum bid.

Please type only numerals and the decimal point (if required). Do not include currency symbols such as a dollar sign ('$') or commas (',').

Binding contract.
Placing a bid is a binding contract in many states. Do not bid unless you intend to buy this item at the amount of your bid.

Proxy bidding for all bids
Please bid the maximum amount you are willing to pay for this item. Your maximum amount will be kept secret; eBay will bid on your behalf as necessary by increasing your bid by the current bid increment up until your maximum is reached. This saves you the trouble of having to keep track of the auction as it proceeds and prevents you from being outbid at the last minute unless your spending limit is exceeded. (See an example of proxy bidding). Also, in case of a tie for high bidder, earlier bids take precedence. And, keep in mind that you cannot reduce your maximum bid at a later date. Unless otherwise noted, bids are in U.S. dollars.

If you have bid on this item before, note that your new bid must be greater than your previous bid.

FIG. 4E
Prior Art

IMAGE
*Yahoo Home and Garden*
*Home > Home and Garden > Bed and Bath*

Home and Garden Categories

IMAGE
ROPE BOWL
PERFUMED
CANDLE
$84.00
BUY IT

- Bathroom *(160)*
- Bedding *(2366)*
- Beds and Mattresses *(72)*

Yahoo! Top Sellers

La Crosse Down Comforter

Staten Pillowcases

100 Egyptian Cotton Towels

Aerobed - Bed in a Bag

Newly Discounted Items
1. Loveseat Tissue Box Cover — 21% off
2. Engraving Cutter Set — 53% off
3. Diamond Point Set — 43% off

Yahoo! Resources
- Auctions
- Classifieds
- Live Net Events
- Yellow Pages

FIG. 5A
Prior Art

- search
- shop online
    bedroom
    bath shop
    down shop
    primaloft
    throws & blankets
    company kids
    home accents
    sleepwear
- winter clearance
- our services
- ways to order
- rest-easy
    guarantee
- information
- request a catalog
- contact us

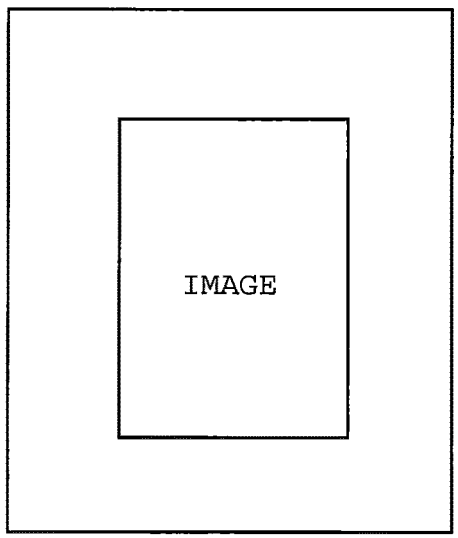

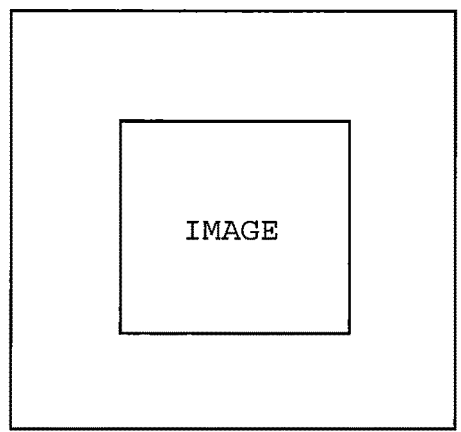

*Our most popular comforter has a soft-to-the-touch 232-thread count cotton cover, filled with our own 500-550 European TCS down. Classic 8" stitched squares prevent shifting and cold spots. Machine washable. Made in La Crosse, Wisconsin, of fine imported materials. Twin extra-long size in limited colors.*

*Clean and refresh your down comforters with The Company Store Down Accessories.*

FIG. 5B
Prior Art

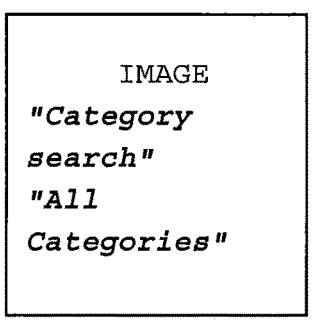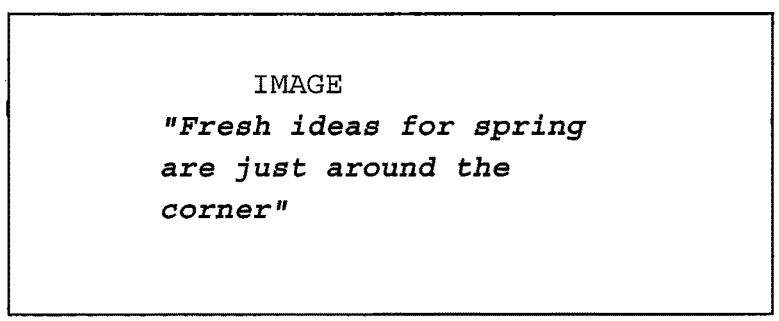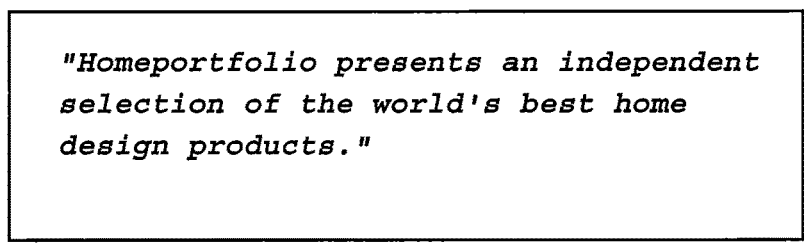
FIG. 6A
Prior Art

```
┌─────────────────────────────────────────────┐
│                                             │
│                   IMAGE                     │
│               "Homeportfolio"               │
│                                             │
└─────────────────────────────────────────────┘
```

Search History        Furniture & Home Furnishings

All categories        Accent Pieces
Furniture & Home  Area Rugs
Furnishings       Armoires
                      Bar Stools
Refine Your Search    Beds
                      Benches & Stools
                      Bookcases
                      China Cabinets
                      Coffee Tables
                      Computer Workstations
                      Console Tables
                      Decorative Mirrors
                      Desk Chairs
                      Desks
                      Dining Chairs
                      Dining Tables
                      Dressers & Chests
                      End Tables
                      Entertainment Centers
                      Kitchen Work Tables
                      Night Tables
                      Occasional Chairs
                      Other Tables
                      Secretaries
                      Sideboards
                      Sofas
                      Storage Pieces
                      Upholstered Chairs & Ottomans
                      Wall Units
                      Wine Storage FIG. 6B
Prior Art Image
Homeportfolio Search History
All Categories Area Rugs
View products by brand
View products by style Area Rugs Refine your
search FIG. 6C
Prior Art Image
Homeportfolio
Search
History
All
Categories
Furniture &
Home
Furnishings
Refine your
search
Image
Search Results:
premium
Area Rugs
*Showing 1 to 25 out of 33*
 Algarve
 Camel
 Carlise
 Center Ring
 Circus Runner
 Directoire
 Empire
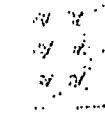 Ferncroft
 Fontaine
FIG. 6D
Prior Art

 Gardenia
 Green Bouquet
 Jazz
 Joliette
 Julien
 La Sarre
 Margate
 Menton
 Mellowes
 Moldova
 New Country Dance
FIG. 6E
Prior Art

 New Family Farm
click here to see more
 Odessa
click here to see more
 Pallazzo
click here to see more
 Pears
click here to see more
 Polar Bear
click here to see more
Results per page: 25 ▼ go
FIG. 6F
Prior Art Home  Listings  Buyers  Sellers  Search  Help  News/Chat  Site Map

Current auctions by tiffanysja (108) ☆

Includes ongoing auctions only. Bold price means at least one bid has been received.

If you have a registered User ID and password, and would like also to see the e-mail addresses of the high bidders, click here.

You can click on the Start Time, End Time, or Price links to sort the list.

| Item | Start | End | Price | Title | High Bidder |
|---|---|---|---|---|---|
| 81886073 | 03/23/99 | 03/28/99 06:40:14 | 449.00 | DIAMOND & TOPAZ RING 5.8 CARATS | No Bids Yet |
| 81885952 | 03/23/99 | 03/30/99 06:39:31 | 119.00 | AMETHYST LADY'S RING GREAT BUY !!!!! | 0 Dutch bids |
| 81968925 | 03/23/99 | 03/30/99 11:45:37 | 399.00 | DIAMOND & RUBY RING 1.3 CARATS | No Bids Yet |
| 81968584 | 03/23/99 | 03/30/99 11:44:48 | 299.00 | DIAMOND & SAPPHIRE RING 1.2 CARATS | No Bids Yet |
| 81969164 | 03/23/99 | 03/30/99 11:46:23 | 399.00 | DIAMOND & RUBY RING 1.65 CARATS | No Bids Yet |
| 81969397 | 03/23/99 | 03/30/99 11:47:09 | 499.00 | DIAMOND CLUSTER RING 2.6 CARATS | No Bids Yet |
| 81969680 | 03/23/99 | 03/30/99 11:47:54 | 369.00 | DIAMOND & EMERALD RING .8 CARATS | No Bids Yet |
| 81969948 | 03/23/99 | 03/30/99 11:48:38 | 499.00 | GOLD AND BLUE SAPPHIRE LADIE'S FASHION RING | No Bids Yet |
| 82022309 | 03/23/99 | 03/30/99 14:19:47 | 229.00 | DIAMOND & EMERALD RING PRICED TO SELL QUICK! | No Bids Yet |
| 82022673 | 03/23/99 | 03/30/99 14:20:52 | 75.00 | AMETHYST LADY'S FASHION RING CLEARANCE SALE | mgmtlaw (1) |
| 82022889 | 03/23/99 | 03/30/99 14:21:29 | 1099.00 | DIAMOND & EMERALD RING 2.4 CARATS | No Bids Yet |
| 82023894 | 03/23/99 | 03/30/99 14:24:13 | 529.00 | DIAMOND AND RUBY RING - 2.14 CARATS | No Bids Yet |

FIG. 7A
Prior Art

| | | | | | |
|---|---|---|---|---|---|
| 82024732 | 03/23/99 | 03/30/99 14:27:03 | 899.00 | DIAMOND & TOPAZ RING 17.6 CARATS !!!!! | No Bids Yet |
| 82025094 | 03/23/99 | 03/30/99 14:27:46 | 599.00 | DIAMOND & RUBY RING TAKE A LOOK!!!!! | No Bids Yet |
| 82030416 | 03/23/99 | 03/30/99 14:42:52 | 1200.00 | 2 DIAMOND SOLITARES 1.56 CARATS EACH LOW RES. | No Bids Yet |
| 82035007 | 03/23/99 | 03/30/99 14:55:25 | 335.01 | HEART SHAPED DIAMOND & RUBY RING 1.3 CARAT | burns7@prodigy.net (0) |
| 81594627 | 03/22/99 | 03/29/99 13:23:02 | 3230.00 | DIAMOND TENNIS BRACELET 10.42CT GIA $13,915 | No Bids Yet |
| 81595338 | 03/22/99 | 03/29/99 13:25:33 | 4750.00 | DIAMOND & EMERALD RING & NECKLACE 12.6 CARATS | No Bids Yet |
| 81596043 | 03/22/99 | 03/27/99 13:27:52 | 1899.00 | DIAMOND ENGAGEMENT RING 1.68 CARATS G/I2 | No Bids Yet |
| 81290688 | 03/21/99 | 03/28/99 17:42:23 | 959.00 | DIAMOND TENNIS BRACELET 6.65 CARATS | No Bids Yet |
| 82314380 | 03/24/99 | 03/31/99 06:23:11 | 999.00 | DIAMOND ILLUSION NECKLACE 1.08 CTS | No Bids Yet |
| 82314245 | 03/24/99 | 03/31/99 06:22:24 | 1999.00 | DIAMOND & SAPPHIRE NECKLACE 13.4 CARATS | No Bids Yet |
| 82314137 | 03/24/99 | 03/31/99 06:21:38 | 619.00 | DIAMOND & RUBY NECKLACE 10.3 CARATS | el9 (0) |
| 82313879 | 03/24/99 | 03/31/99 06:20:08 | 2850.00 | DIAMOND ENGAGEMENT RING 1.64 CARATS I/I1 | No Bids Yet |
| 81898552 | 03/23/99 | 03/28/99 07:46:08 | 50.00 | DIAMOND & BLUE TOPAZ RING SUPER LOW RESERVE!! | No Bids Yet |
| 81898945 | 03/23/99 | 03/30/99 07:47:49 | 79.00 | DIAMOND & BLUE SAPPHIRE RING FUN AUCTION!!!! | dendonb@bellsouth.net (0) |
| 81899407 | 03/23/99 | 03/30/99 07:50:16 | 229.00 | AMETHYST LADY'S RING 60% BELOW RETAIL!!!! | No Bids Yet |
| 81899868 | 03/23/99 | 03/30/99 07:51:19 | 1099.00 | DIAMOND ILLUSION NECKLACE 1.4 CTS. F-G COLOR | No Bids Yet |
| 81893864 | 03/23/99 | 03/30/99 07:23:17 | 280.00 | DIAMOND & GOLD NECKLACE VS2/H LOW RESERVE | whiskersmom (0) |

FIG. 7B
Prior Art

| | | | | | |
|---|---|---|---|---|---|
| 81900551 | 03/23/99 | 03/30/99 07:57:50 | 929.00 | DIAMOND ILLUSION NECKLACE 1.02 CTS. F-G COLOR | No Bids Yet |
| 81892323 | 03/23/99 | 03/30/99 07:14:45 | 899.00 | DIAMOND & RUBY COCKTAIL RING 5.4 CARATS | No Bids Yet |
| 81891784 | 03/23/99 | 03/30/99 07:11:38 | 899.00 | DIAMOND & SAPPHIRE RING 3.0 CARATS | No Bids Yet |
| 81890853 | 03/23/99 | 03/30/99 07:06:22 | 599.00 | GENT'S DIAMOND & WHITE GOLD RING 1 CARAT | No Bids Yet |
| 81890480 | 03/23/99 | 03/30/99 07:04:33 | 2999.00 | DIAMOND & EMERALD RING 4.86 CARATS | No Bids Yet |
| 81906930 | 03/23/99 | 03/30/99 08:20:04 | 500.00 | DIAMOND AND EMERALD RING 1.8 CTS. LOW RESERVE | txlawyer (1) |
| 81887885 | 03/23/99 | 03/30/99 06:50:18 | 1099.00 | DIAMOND & RUBY RING 3.05 CARATS | No Bids Yet |
| 81909200 | 03/23/99 | 03/30/99 08:28:59 | 800.00 | DIAMOND & EMERALD NECKLACE 4.4 CTS LOW RES | No Bids Yet |
| 81887264 | 03/23/99 | 03/30/99 06:46:49 | 2349.00 | DIAMOND & BLUE SAPPHIRE RING 6.03 CARATS | No Bids Yet |
| 81887024 | 03/23/99 | 03/30/99 06:45:30 | 1649.00 | DIAMOND & AMETHYST PENDANT 11.77 CARATS | No Bids Yet |
| 81886567 | 03/23/99 | 03/30/99 06:42:57 | 3339.00 | DIAMOND ENGAGEMENT RING 1.07 CTS. H-I COLOR | No Bids Yet |
| 81297198 | 03/21/99 | 03/28/99 17:50:49 | 139.00 | DIAMOND AND GOLD EARRINGS - DEALER SPECIAL A+ | 0 Dutch bids |
| 81289582 | 03/21/99 | 03/28/99 17:40:59 | 949.00 | DIAMOND TENNIS BRACELET 5.3 CARATS | No Bids Yet |
| 81285887 | 03/21/99 | 03/28/99 17:36:01 | 3351.00 | DIAMOND TENNIS BRACELET 10.81CT GIA $14,315 | No Bids Yet |
| 81295906 | 03/21/99 | 03/28/99 17:49:00 | 879.00 | DIAMOND & RUBY NECKLACE 9 CARATS | No Bids Yet |
| 81314104 | 03/21/99 | 03/28/99 18:11:52 | 575.00 | DIAMOND & SAPPHIRE NECKLACE & EARRING SET | No Bids Yet |
| 81313446 | 03/21/99 | 03/28/99 18:10:56 | 295.00 | 3 DIAMOND DROP NECKLACE | No Bids Yet |

FIG. 7C
Prior Art

| | | | | | |
|---|---|---|---|---|---|
| 81311243 | 03/21/99 | 03/28/99 18:08:12 | 775.00 | DIAMOND & SAPPHIRE 3.3 CARAT RING | No Bids Yet |
| 81306202 | 03/21/99 | 03/28/99 18:01:56 | 299.00 | DIAMOND & CITRINE & GARNET 18K RING | No Bids Yet |
| 81304240 | 03/21/99 | 03/28/99 17:59:22 | 389.00 | BLUE TOPAZ & DIAMOND RING 10.42 CARATS | No Bids Yet |
| 81301808 | 03/21/99 | 03/26/99 17:56:26 | 529.00 | DIAMOND & RUBY NECKLACE 8.3 CARATS | el9 (0) |
| 81299381 | 03/21/99 | 03/26/99 17:53:32 | 109.00 | DIAMOND AND BLUE TOPAZ (3.78 CARATS) | kcdee (18) ☆ |
| 81286863 | 03/21/99 | 03/28/99 17:37:34 | 3351.00 | DIAMOND TENNIS BRACELET 10.81CT GIA $14,315 | No Bids Yet |
| 81312158 | 03/21/99 | 03/28/99 18:09:32 | 1295.00 | OMEGA DIAMOND BEZEL NECKLACE | No Bids Yet |
| 81292714 | 03/21/99 | 03/28/99 17:45:01 | 4500.00 | DIAMOND ENGAGEMENT RING 1.083 CT EGL CERT. | No Bids Yet |
| 81300087 | 03/21/99 | 03/26/99 17:54:24 | 99.00 | BLUE TOPAZ RING NO RESERVE!!! | 0 Dutch bids |
| 81300726 | 03/21/99 | 03/26/99 17:55:06 | 599.00 | DIAMOND & RUBY NECKLACE 10 CARATS | No Bids Yet |
| 81291987 | 03/21/99 | 03/28/99 17:44:05 | 6750.00 | ENGAGEMENT RING 1.25 CT. SI1/F EGL CERTIFIED | No Bids Yet |
| 81288544 | 03/21/99 | 03/28/99 17:39:31 | 3500.00 | 5 STAR DIAMOND NECKLACE 14K WHITE GOLD | No Bids Yet |
| 81608899 | 03/22/99 | 03/27/99 14:09:38 | 659.00 | DIAMOND STUD EARRINGS 1.0 CTS H/I1 | betonred (0) |
| 82314491 | 03/24/99 | 03/31/99 06:23:47 | 400.00 | DIAMOND & EMERALD BRACELET NO RESERVE | No Bids Yet |
| 82418176 | 03/24/99 | 03/31/99 12:46:20 | 399.00 | DIAMOND AND RUBY RING 4.0 CARATS | 0 Dutch bids |
| 82371667 | 03/24/99 | 03/31/99 10:18:44 | 16900.00 | DIAMOND RING 3.51 CT PEAR SHAPED SI2/E | No Bids Yet |
| 82371403 | 03/24/99 | 03/31/99 10:17:53 | 2399.00 | DIAMOND & HEART SHAPED EMERALD RING 6.2CTS | No Bids Yet |
| 82371004 | 03/24/99 | 03/29/99 10:17:04 | 999.00 | GOLD & DIAMOND FASHION BRACELET STUNNING!!! | No Bids Yet |
| 82369641 | 03/24/99 | 03/31/99 10:15:06 | 1999.00 | DIAMOND & EMERALD RING 5.6 CARAT !!!!!! | No Bids Yet |

FIG. 7D
Prior Art

| | | | | | |
|---|---|---|---|---|---|
| 81596428 | 03/22/99 | 03/27/99 13:28:58 | 99.00 | AMETHYST FASHION RING | No Bids Yet |
| 81298143 | 03/21/99 | 03/26/99 17:51:53 | 599.00 | DIAMOND AND BLUE TOPAZ 16.3 CARATS | No Bids Yet |
| 81309398 | 03/21/99 | 03/28/99 18:05:49 | 349.00 | DIAMOND & AMETHYST & GARNET 18K RING | No Bids Yet |
| 81287913 | 03/21/99 | 03/28/99 17:38:39 | 3249.00 | DIAMOND TENNIS BRACELET 10.48CT GIA $13,490 | No Bids Yet |
| 82024482 | 03/23/99 | 03/28/99 14:25:57 | 175.25 | DIAMOND & RUBY FASHION RING .9 CARATS | ktown@comcomach.com (22) |
| 81285106 | 03/21/99 | 03/28/99 17:34:59 | 700.00 | DIAMOND & SAPPHIRE RING 2.45 CARATS | No Bids Yet |
| 81886796 | 03/23/99 | 03/30/99 06:44:14 | 1400.00 | DIAMOND ENGAGEMENT RING .81 CTS. G-H COLOR | No Bids Yet |
| 81302486 | 03/21/99 | 03/26/99 17:57:12 | 125.00 | AMETHYST LADY'S FASHION RING GREAT VALUE!!! | 0 Dutch bids |
| 81308180 | 03/21/99 | 03/28/99 18:04:23 | 269.00 | DIAMOND & GOLD NECKLACE GREAT BUY | No Bids Yet |
| 81303391 | 03/21/99 | 03/26/99 17:58:17 | 229.00 | RARE TANZANITE AND DIAMOND RING - VERY NICE!! | No Bids Yet |
| 81310040 | 03/21/99 | 03/28/99 18:06:36 | 219.00 | DIAMOND & BLUE TOPAZ RING 10.42 CARATS | No Bids Yet |
| 81888344 | 03/23/99 | 03/30/99 06:53:05 | 999.00 | DIAMOND & SAPPHIRE RING 7.72 CARATS | No Bids Yet |
| 82314030 | 03/24/99 | 03/31/99 06:20:58 | 569.00 | DIAMOND & RUBY NECKLACE 7.6 CARATS | No Bids Yet |
| 82024181 | 03/23/99 | 03/30/99 14:25:07 | 499.00 | DIAMOND & RUBY RING 1 CARAT GREAT PRICE!!! | No Bids Yet |
| 81294481 | 03/21/99 | 03/26/99 17:47:18 | 349.00 | DIAMOND & AMETHYST& GARNET 18K RING | No Bids Yet |
| 82606840 | 03/24/99 | 03/31/99 19:37:18 | 1200.00 | DIAMOND HEART SHAPED PLAT RING .75 CARATS | No Bids Yet |
| 82603209 | 03/24/99 | 03/31/99 19:31:48 | 2799.00 | DIAMOND HEART SHAPED RING 1.05 CARATS | No Bids Yet |

FIG. 7E
Prior Art

| | | | | | |
|---|---|---|---|---|---|
| 82600742 | 03/24/99 | 03/31/99 19:28:13 | 2499.00 | DIAMOND HEART SHAPED RING 1.0 CARATS | No Bids Yet |
| 82593255 | 03/24/99 | 03/31/99 19:16:40 | 3900.00 | GENTS DIAMOND & 18K GOLD BRACELET 4.6 CARATS | No Bids Yet |
| 82587104 | 03/24/99 | 03/31/99 19:07:26 | 2000.00 | DIAMOND & GOLD NECKLACE 2.50 CARATS | No Bids Yet |
| 82581134 | 03/24/99 | 03/31/99 18:58:21 | 1999.00 | DIAMOND & RUBY WHITE GOLD NECKLACE 11.30 CTS. | No Bids Yet |
| 82563944 | 03/24/99 | 03/31/99 18:32:46 | 1000.00 | BEAUTIFUL PLATINUM DIAMOND ROUND 1.05 CARAT | mgmtlaw (1) |
| 82557477 | 03/24/99 | 03/31/99 18:22:16 | 1000.00 | BEAUTIFUL PLATINUM DIAMOND PRINCESS 1.05 CTS | mcbjr (1) |
| 82553627 | 03/24/99 | 03/31/99 18:16:15 | 499.00 | DIAMOND & 18K GOLD PENDENT A MUST SEE!!!!! | 0 Dutch bids |
| 82551037 | 03/24/99 | 03/31/99 18:11:48 | 1000.00 | BEAUTIFUL PLATINUM DIAMOND PRINCESS 1.01 CTS | No Bids Yet |
| 82546101 | 03/24/99 | 03/31/99 18:03:54 | 1135.00 | BEAUTIFUL PLATINUM DIAMOND OVAL 1.10 CTS | mcbjr (1) |
| 82540940 | 03/24/99 | 03/31/99 17:55:10 | 1000.00 | BEAUTIFUL PLATINUM DIAMOND ROUND 1.35 CTS | No Bids Yet |
| 82536979 | 03/24/99 | 03/31/99 17:48:13 | 1000.00 | BEAUTIFUL PLATINUM DIAMOND OVAL 1.20 CTS | jonragusa (1) |
| 82531596 | 03/24/99 | 03/31/99 17:38:35 | 1525.00 | BEAUTIFUL PLATINUM DIAMOND PRINCESS 1.15 CTS | jwcarney (0) |
| 82513118 | 03/24/99 | 03/31/99 17:02:43 | 1000.00 | BEAUTIFUL PLATINUM DIAMOND SOLITAIRE 1.5 CTS | absolute_value (107) ☆ |
| 82456368 | 03/24/99 | 03/31/99 14:39:54 | 10000.00 | DIAMOND AND EMERALD RING 17.44 CARATS | mcbjr (1) |
| 82453403 | 03/24/99 | 03/31/99 14:31:31 | 5500.00 | DIAMOND CROSS PENDANT 9.50 CARATS | No Bids Yet |
| 82443462 | 03/24/99 | 03/31/99 14:04:02 | 4000.00 | DIAMOND CROSS PENDANT 10.8 CARATS | No Bids Yet |

FIG. 7F
Prior Art

| | | | | | |
|---|---|---|---|---|---|
| 82433337 | 03/24/99 | 03/31/99 13:34:23 | 12500.00 | DIAMOND SOLITARE RING 3.34 CARATS | mgmtlaw (1) |
| 82431418 | 03/24/99 | 03/31/99 13:27:50 | 42000.00 | DIAMOND SOLITARE RING 6.90 CARATS VVS1 | iron-maiden (2) |
| 82827217 | 03/25/99 | 04/01/99 13:34:18 | 4499.00 | DIAMOND AND EMERALD RING 8.56 CARATS | No Bids Yet |
| 82824462 | 03/25/99 | 04/01/99 13:25:30 | 6000.00 | DIAMOND & EMERALD BRACELET 31.30 CARATS | mcbjr (1) |
| 82791164 | 03/25/99 | 04/01/99 11:38:16 | 4599.00 | DIAMOND ENGAGEMENT RING 5.68 CARATS | No Bids Yet |
| 82787759 | 03/25/99 | 04/01/99 11:26:20 | 2199.00 | DIAMOND & SAPPHIRE NECKLACE 24.5 CARATS | No Bids Yet |
| 82784407 | 03/25/99 | 04/01/99 11:13:48 | 2499.00 | SAPPHIRE & DIAMOND NECKLACE 9.3 CARATS | No Bids Yet |
| 82784124 | 03/25/99 | 04/01/99 11:12:42 | 8500.00 | DIAMOND ENGAGEMENT RING 2.31 CT COLOR G-H | No Bids Yet |
| 82783932 | 03/25/99 | 04/01/99 11:11:57 | 7200.00 | DIAMOND ENGAGEMENT RING 1.95 CT SI1/L | No Bids Yet |
| 82783732 | 03/25/99 | 04/01/99 11:11:19 | 3549.00 | DIAMOND & SAPPHIRE NECKLACE 36.4 CARATS | No Bids Yet |
| 82783510 | 03/25/99 | 04/01/99 11:10:34 | 649.00 | DIAMOND & SAPPHIRE NECKLACE 7.2 CARATS | No Bids Yet |
| 82783334 | 03/25/99 | 04/01/99 11:09:56 | 3259.00 | DIAMOND & EMERALD RING 9.6 CARATS!!!!!!! | No Bids Yet |
| 82783095 | 03/25/99 | 04/01/99 11:09:05 | 200.00 | DIAMOND & EMERALD FASHION RING!!3.4 CARATS | el9 (0) |
| 82782869 | 03/25/99 | 04/01/99 11:08:18 | 400.00 | DIAMOND & RUBY LADIES RING 3.4 CARATS | No Bids Yet |
| 82782702 | 03/25/99 | 04/01/99 11:07:40 | 339.00 | DIAMOND & RUBY RING 2.5 CARATS | No Bids Yet |
| 82782436 | 03/25/99 | 04/01/99 11:06:46 | 3850.00 | DIAMOND ENGAGEMENT RING 1.32 CTS. F COLOR | No Bids Yet |
| 82782198 | 03/25/99 | 04/01/99 11:06:02 | 5450.00 | DIAMOND ENGAGEMENT RING 1.29 CTS EGL CERT | No Bids Yet |
| 82782023 | 03/25/99 | 04/01/99 11:05:16 | 5450.00 | DIAMOND ENGAGEMENT RING 1.29 CTS EGL CERT | No Bids Yet |
| 82781828 | 03/25/99 | 04/01/99 11:04:41 | 1299.00 | DIAMOND ENGAGEMENT RING .94 CARATS | No Bids Yet |
| 82781617 | 03/25/99 | 04/01/99 11:03:54 | 5500.00 | DIAMOND ENGAGEMENT RING 1.11 CTS. EGL CERT | No Bids Yet |

FIG. 7G
Prior Art

| | | | | | |
|---|---|---|---|---|---|
| 82781224 | 03/25/99 | 04/01/99 11:02:44 | 1450.00 | DIAMOND ENGAGEMENT RING .91 GREAT BUY | No Bids Yet |
| 82781000 | 03/25/99 | 04/01/99 11:01:51 | 1450.00 | DIAMOND ENGAGEMENT RING .76 CARATS | No Bids Yet |
| 83209853 | 03/26/99 | 03/31/99 13:37:37 | 4500.00 | DIAMOND & RUBY NECKLACE 8.3 CARATS | No Bids Yet |
| 83177436 | 03/26/99 | 04/02/99 11:42:54 | 299.00 | BEAUTIFUL WHITE GOLD HUGGIE EARRINGS - NICE!! | 0 Dutch bids |

FIG. 7H
Prior Art

Home Listings Buyers Sellers Search Help News/Chat Site Map

DIAMOND SOLITARE RING 6.90 CARATS VVS1
item #82431418
Jewelry, Gemstones:Jewelry:Fine

| | | | |
|---|---|---|---|
| Currently | $42000.00 (reserve not yet met) | First bid | $42000.00 |
| Quantity | 1 | # of bids | 1 (bid history) (with emails) |
| Time left | 4 days, 19 hours + | Location | Winter Park, Florida |
| Started | 03/24/99 13:27:50 PST | | (mail this auction to a friend) |
| Ends | 03/31/99 13:27:50 PST | | (request a gift alert) |
| | | | Featured Auction |
| Seller | tiffanysja (108) | | |
| | (view comments in seller's Feedback Profile) (view seller's other auctions) (ask seller a question) | | |
| High bid | iron-maiden (2) | | |
| Payment | Visa/MasterCard, American Express, Discover, Money Order/Cashiers Checks, COD (collect on delivery), Personal Checks, Online escrow, Other, See item description for payment methods accepted | | |
| Shipping | Buyer pays fixed shipping charges, Seller ships internationally, See item description for shipping charges | | |
| *Note:* | Seller revised this item before first bid. | | |

Seller assumes all responsibility for listing this item. You should contact the seller to resolve any questions before bidding. Currency is U.S. dollars (US$) unless otherwise noted.

Description

TIFFANY'S JEWELRY AUCTION INC., offers this lovely Lady's platinum diamond ring that features the diamond described in detail as follows: CENTER / MAIN DIAMOND SHAPE: ROUND-BRILLIANT CUT MAX. DIAMETER 12.32MM MIN. DIAMETER 12.12MM APPROX. WEIGHT 6.90 CARATS CLARITY GRADE VVS-1 COLOR GRADE O-P DEPTH % 56.0% TABLE % 67% GIRDLE MED CULET SM POLISH GOOD SYMMETRY GOOD FLUORESCENCE INERT Comes with a GIA graduate gemologist apprasial showing retail replacement value of $ 80,000.00. (274) ANY QUESTIONS PLEASE CALL 407-841-0761 OR 407-841-0974 To see our other auctions go here.

FIG. 7I
Prior Art

DIAMOND SOLITARE RING 6.90 CARATS VVS1 (Item #82431418)

| | |
|---|---|
| Current bid | $42000.00 |
| Bid increment | $100.00 |
| Minimum bid | $42100.00 |

Registration required. eBay requires registration in order to bid. Find out how to become a registered user. It's fast and it's free!

| User ID or E-mail address | Password (forgotten it?) |

_____ Current minimum bid is 42100.00  | review bid |

Your maximum bid.

Please type only numerals and the decimal point (if required). Do not include currency symbols such as a dollar sign ('$') or commas (',').

Binding contract.
　　Placing a bid is a binding contract in many states. Do not bid unless you intend to buy this item at the amount of your bid.

Proxy bidding for all bids
　　Please bid the maximum amount you are willing to pay for this item. Your maximum amount will be kept secret; eBay will bid on your behalf as necessary by increasing your bid by the current bid increment up until your maximum is reached. This saves you the trouble of having to keep track of the auction as it proceeds and prevents you from being outbid at the last minute unless your spending limit is exceeded. (See an example of proxy bidding). Also, in case of a tie for high bidder, earlier bids take precedence. And, keep in mind that you cannot reduce your maximum bid at a later date. Unless otherwise noted, bids are in U.S. dollars.
　　If you have bid on this item before, note that your new bid must be greater than your previous bid.

Home Listings Buyers Sellers Search Help News/Chat Site Map

Thank you for using eBay!

About eBay | SafeHarbor

*Copyright © 1995-1999 eBay Inc. All Rights Reserved.*
All trademarks and brands are the property of their respective owners.
Use of this web site constitutes acceptance of the eBay User Agreement and Privacy Policy.

FIG. 7K
Prior Art

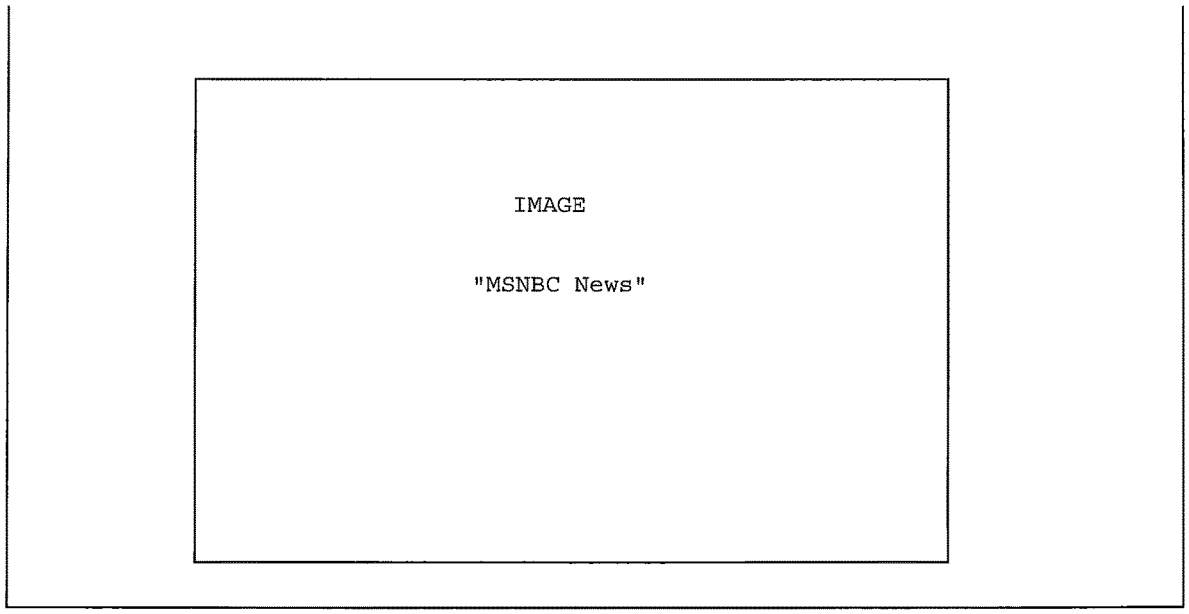

TOP STORIES

- Pope: Palestinian suffering must stop
- Social Security penalty voted down
- 'Today': Who was JonBenet Ramsey?
- Hostages safe in Maryland standoff
- Mubarak: Israel, Syria near deal
- India tepid on Clinton and nukes
- Conservatives may oppose Giuliani
- Judge denies Elian asylum appeal
- The Gordian knot of Taiwan
- Northwest works to restore service
- 'PoliticsOnly!': MSNBC's daily Webcast
- Live video: Watch news as it breaks
- Video news: NBC, MSNBC, CNBC reports
- The Week in Pictures

Pope in the Holy Land

- Pope in the Holy Land Section Front

Clinton in South Asia

- Clinton in South Asia Section Front

International News

- International News Section Front

FIG. 8A
Prior Art

Politics

- Politics Section Front

Crime and Punishment

- Crime and Punishment Section Front

Newsweek

- Newsweek Section Front

Environment

- Environment Section Front

Science

- Science Section Front

Mysteries of the Universe

- Mysteries of the Universe Section Front

Learning Online

- Learning Online Section Front

Special Coverage

- Special Coverage Section Front

FIG. 8B
Prior Art

Pope: Palestinian suffering must stop
Heavy religious, diplomatic symbolism in Bethlehem visit

MSNBC STAFF AND WIRE REPORTS

BETHLEHEM, West Bank, March 22 — Pope John Paul II chose the birthplace of Christ to issue a ringing endorsement of Palestinian statehood Wednesday, saying the Palestinian people had suffered "too long." The pope used unusually direct language to plead for a Palestinian homeland despite having said he would stay away from political themes during his week-long pilgrimage in the footsteps of Jesus.

FIG. 8C
Prior Art

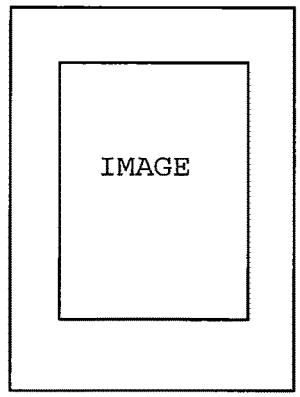
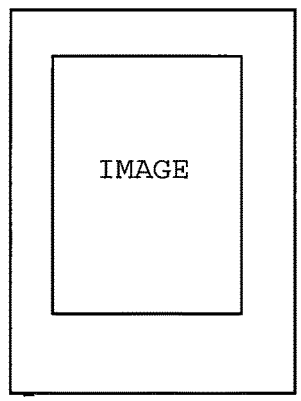
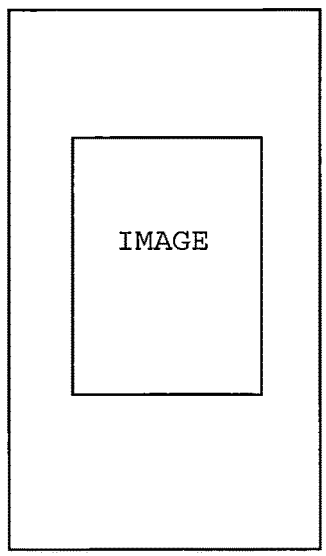

"Your torment is in the eyes of the world. And it has gone on too long."

Upon arriving in Bethlehem, a West Bank town under Palestinian rule, the Pontiff kissed a bowl of earth offered by a local boy and girl in a gesture seen by Palestinians as a papal seal on their demands for an independent state in the West Bank and Gaza.

Asked about the gesture, Vatican spokesman Joaquin Navarro-Valls said it did not imply recognition of a Palestinian state because independence had not yet been declared. "It would have been very strange if the pope had not kissed the earth at the place where Christ was born," he said.

In his speech, the pope said the Vatican had always recognized that the Palestinian people "have the natural right to a homeland and the right to live in peace and tranquility with the other peoples of this area."

"We must all work and pray for the success of every genuine effort to bring peace to this land," he said. "Only with a just and lasting peace — not imposed but secured through negotiation — will legitimate Palestinian aspirations be fulfilled.

"Only then will the Holy Land see the possibility of a bright new future, no longer dissipated by rivalry and conflict, but firmly based on understanding and cooperation for the good of all."

In a step toward the elusive peace that is promoted by the pontiff, Israel on Tuesday withdrew troops from 6.1 percent of the West Bank in a land transfer that fulfills a key obligation of Israeli-Palestinian accords. The transfer gives the Palestinians populated swaths of land bordering cities already under Palestinian control, creating the territorial continuity Palestinian leader Yasser Arafat needs for future statehood.

When the pope arrived by helicopter in Bethlehem Wednesday, Arafat stepped forward to shake the frail 79-year-old pontiff's hand. A Palestinian honor guard fired guns in salute and a band played the Vatican anthem. As the pontiff moved slowly forward, Arafat put a steadying hand on his stooped, bent back.

MASS AND MUSLIM PRAYER

The pope also celebrated Mass at Manger Square in Bethlehem, the pope's only stop in Palestinian territory during his weeklong visit to the Holy Land.

As the pope finished his homily, the Muslim call to prayer rang out from a mosque in the square, and the crowd and the pontiff alike waited silently for the wail of Koranic verses to end. A few people fidgeted uncomfortably, and a nun shook her head in apparent disbelief.

But a moment later, the crowd applauded when Jerusalem's Latin Patriarch, Michel Sabbah, spoke of the muezzin's call as symbolizing Muslim and Christian unity in Bethlehem. Navarro-Valls later said the overlapping of prayers in the square was "mutual and respectful."

The pope later paid a private visit to the Church of the Nativity, one of the holiest sites in Christianity. The fourth-century Greek Orthodox church is built over a grotto that tradition holds to be the place where Jesus was born. Pilgrims to the site traditionally kneel to kiss a 14-pointed silver star marking the FIG. 8D
Prior Art

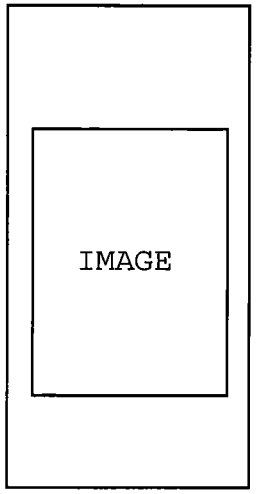

ISRAELIS SEE SIGNIFICANCE

The pope arrived in Israel Tuesday, beginning the first official visit by a Roman Catholic pontiff to the Jewish state and realizing his dream of walking in the footsteps of Jesus at the dawn of Christianity's third millennium. In a sign of the enormous importance that Israel attaches to the visit, virtually the entire Israeli government was on hand to greet the pope. "Welcome to the Holy Land," Prime Minister Ehud Barak told the pontiff.

The leader of one billion Roman Catholics stepped gingerly from the plane that brought him from Amman, Jordan, and kissed a bowl of Jerusalem earth. He spoke in his arrival speech of "peace and justice which the peoples of the Holy Land do not yet have."

In the speech, delivered in English, the pope noted that "yesterday, from the heights of Mount Nebo, I looked across the Jordan Valley to this blessed land. Today, it is with profound emotion that I set foot in the land that God chose."

- MSNBC Cable coverage
  Watch MSNBC Cable for coverage of this and other stories "The Psalmists remind us that peace is God's gift," he concluded, a reference to the strife that has long plagued the region. "May peace be God's gift to the land he chose as his own. Shalom."

The pope spent Tuesday night in Jerusalem, and flew early Wednesday morning to Qasr el Yahud for a private visit to the site on the west bank of the Jordan River where Israel says Jesus was baptized. John Paul on Tuesday visited the place on the east bank, which Jordan claims as the baptism site.

In the Holy Land

The pope in the Mideast
- Latest news
- Israel, Syria talk peace
- WNBC: The pope's journey
- Post: Healing a rift John Paul's Holy Land pilgrimage, which began on Monday in Jordan, marks only the second visit by a head of the Roman Catholic Church to the land where Jesus lived and died and where, 2,000 years on, FIG. 8E
Prior Art

LINKS, SITES & MEDIA
MSNBC not responsible for content of Internet links
[INTERNET] The Vatican

TODAY'S TOP NEWS STORIES
[STORY] Pope: Palestinian suffering must stop
[STORY] Social Security penalty voted down
[STORY] 'Today': Who was JonBenet Ramsey?
[STORY] Hostages safe in Maryland standoff
[STORY] Mubarak: Israel, Syria near deal Links, Sites & Media

Manufacturer's list price: $426.00 (January 1999).

Available in a variety of sizes and with coordinating accessories.

Empire Gold; Cranberry Red, Celadon; 1910A

Empire needlepoint wool carpet features an Empire architectural border in gold, celadon, and cranberry red. Broad leaves and oversized flowers provide central ornamentation.

Manufacturer's list price: Custom quote only (January 1999).

Ferncroft Green; Ivory; 2107BG

Ferncroft needlepoint wool carpet features a field of ferns in forest and true greens on an ivory background. Linear border design.

Manufacturer's list price: Custom quote only (January 1999).

4' x 6' to 12' x 18' as well as custom sizes available.

---

Bid Amount | $
Auto Bid Max | $
Membership ID | ********

Current Bid: $1,000.00      Starting Bid: $600.00
Quantity: 1                 Bid Increment $100.00
Ends                        Mail this auction to friends
Started                     Request a gift alert
SSL Protection              E-mail to merchant
Bid Amount | $
Auto Bid Max | $
Membership ID | ********

Current Bid: $1,000.00      Starting Bid: $600.00
Quantity: 1                 Bid Increment $100.00
Ends                        Mail this auction to friends
Started                     Request a gift alert
SSL Protection              E-mail to merchant
Bid Amount | $
Auto Bid Max | $
Membership ID | ********

Credit Card Number          Expiration Date

| Merchant Services | FAQ | Help | Site Map | Home | Top |
Maia Communications & Computing Phone: (408) 354-6273 Fax: (408) 354-0293 16850 Redwood Dr., Los Gatos, CA 95030 Have a question, comment or suggestion?
© 1998—2002 All rights reserved.

98CDE1    98CDE2    98CDE3

99

THE PORTAL TO GOOD LIVING

BON VIVRE

- Auctions
- Build to Order
- SpecialSales
- Shopping
- Audio Guide

- MyBonVivre
- MyEvents
- MyFavorites
- MyMail
- Rehistration

- CommCierge
- MyCierge
- WebCierge
- Customer Service
- Online Help

- Bulletin Board
- Magazines
- News, Events
- Chat, Forum
- RFP | RFQ

BON VIVRE

Bon Vivre | Automobile, Cars | Luxury | Auction |

Luxury Cars

102

| Select | Make - Model | Year | Miles | Price | Dealer | Phone | City | Area |
|---|---|---|---|---|---|---|---|---|
| | BMW 540i | 98 | 5K | $60,000 | | 650-948-6936 | Los Altos | CA |
| ☑ | BMW 740i | 98 | 14K | $60,750 | | 408-531-1595 | San Jose | CA |
| | BMW 740iL | 97 | 18K | $50,750 | | 408-354-3297 | Los Gatos | CA |
| ☑ | Mercedes CL500 Coupe | 98 | 15K | $82,500 | | 408-354-3297 | Los Gatos | CA |
| ☑ | Mercedes E320 | 98 | 19K | $62,500 | | 415-460-5984 | Marin County | CA |
| ☑ | Mercedes E420 Sedan | 97 | 21K | $49,950 | Yes | Auto Town | San Jose | CA |
| ☑ | Mercedes S320 Sedan | 97 | 29K | $55,950 | Yes | Auto Town | San Jose | CA |
| | Mercedes S500 Coupe | 98 | 15K | $82,950 | | 408-354-3297 | Los Gatos | CA |
| ☑ | BMW M3 DINAN Stage 3 | 97 | 40K | $49,000 | | 714-730-5425 | Tustin | CA |
| | Mercedes S500 | 98 | 69K | $48,900 | Yes | 800-608-2886 | Los Angeles | CA |
| ☑ | Mercedes SL320 | 97 | 9K | $64,950 | Yes | 949-584-9420 | Laguna Beach | CA |
| | Jaguar XJ-R | 98 | 4K | $58,500 | | 303-861-1181 | Denver | CO |
| | Mercedes S600 Coupe | 97 | 18K | $100,000 | | 303-534-2757 | Denver | CO |

FIG. 10A

| | | | | | | |
|---|---|---|---|---|---|---|
| ☐ | BMW 740iL | 97 | 25K | $51,998 | Yes | 813-933-2811 | Tampa | FL |
| ☐ | BMW 740iL | 97 | 28K | $52,870 | Yes | 954-527-3300 | Ft. Lauderdale | FL |
| ☐ | Mercedes S420 | 97 | 31K | $51,595 | Yes | 727-797-7070 | Clearwater | FL |
| ☐ | Audi A8 QUATTRO | 98 | 15K | $54,990 | Yes | 847-432-5020 | Highland Park | IL |
| ☐ | BMW 540i | 99 | 2K | $58,900 | Yes | 217-528-2277 | Springfield | IL |
| ☐ | BMW 540i SPORT | 99 | 3K | $56,900 | Yes | 217-528-2277 | Springfield | IL |
| ☐ | BMW 540i | 99 | | $52,420 | Yes | 708-481-9400 | Chicago | IL |
| ☐ | BMW 740 I | 98 | 12K | $52,500 | Yes | 630-357-1200 | Naperville | IL |
| ☐ | BMW 740 IA | 97 | 26K | $51,500 | Yes | 847-843-4000 | Schaumburg | IL |
| ☐ | BMW 740 IL | 87 | 33K | $48,900 | Yes | 217-528-2277 | Springfield | IL |
| ☐ | BMW 740 L | 87 | 33K | $49,888 | Yes | 847-843-4000 | Schaumburg | IL |
| ☐ | BMW 740I | 98 | | $69,570 | Yes | 708-481-9400 | Chicago | IL |
| ☐ | BMW 750IL | 98 | 8K | $75,000 | Yes | 630-968-3201 | Downers | IL |
| ☐ | BMW 750IL | 98 | 6K | $79,900 | Yes | 217-528-2277 | Springfield | IL |
| ☐ | BMW 840Ci | 97 | 21K | $55,900 | Yes | 847-843-4000 | Schaumburg | IL |
| ☐ | BMW M3 DINAN | 98 | 1K | $54,995 | Yes | 847-604-5000 | Lake Bluff | IL |
| ☐ | Jaguar XJ6 Vanden Plas Sedan | 97 | 20K | $48,778 | Yes | 773-227-3200 | Chicago | IL |
| ☐ | Jaguar XK8 Convertible | 98 | 16K | $66,500 | Yes | 847-256-0606 | Wilmette | IL |
| ☐ | Jaguar XK8 Convertible | 97 | 9K | $56,995 | Yes | 630-443-1600 | West Chicago | IL |
| ☐ | Jaguar XK8 Convertible | 97 | 16K | $58,000 | Yes | 847-256-0606 | Wilmette | IL |

Listing 1: 1996 Mercedes E320

19K miles
BBWS: $62,600
BBRT: $67,000

Exterior Color - Black
Interior Color - Black
6-cyl.
Air Conditioning

Current Bid $58,000
Quantity: 1
Ends
Started
SSL Protection
Bid Amount [  ]
Auto Bid Max [$ ]

Starting Bid: $60,000
Bid Increment $1,000
Mail this auction to friends
Request a gift alert
E-mail to merchant

Listing 2: 1997 Mercedes S320 Sedan 29K miles
BBWS: $66,860
BBRT: $69,150

Exterior Color - White
6-cyl.
Four Door

Current Bid $61,000
Quantity: 1
Ends
Started
SSL Protection
Bid Amount [$ ]
Auto Bid Max [$ ]
Membership ID [ ******* ]

Starting Bid: $45,000
Bid Increment $1,000
Mail this auction to friends
Request a gift alert
E-mail to merchant

Listing 3: 1997 BMW M3 DINAN Stage 3 Car 4K miles
BBWS: $49,000
BBRT: $55,500

Exterior Color - Purple
Interior Color - Grey Light
8-cyl.
Air Conditioning
Anti-Lock Brakes Current Bid $47,000
Quantity: 1
Ends
Started
SSL Protection
Bid Amount [$ ]
Auto Bid Max [$ ]

Starting Bid: $40,000
Bid Increment $1,000
Mail this auction to friends
Request a gift alert
E-mail to merchant

FIG. 10D

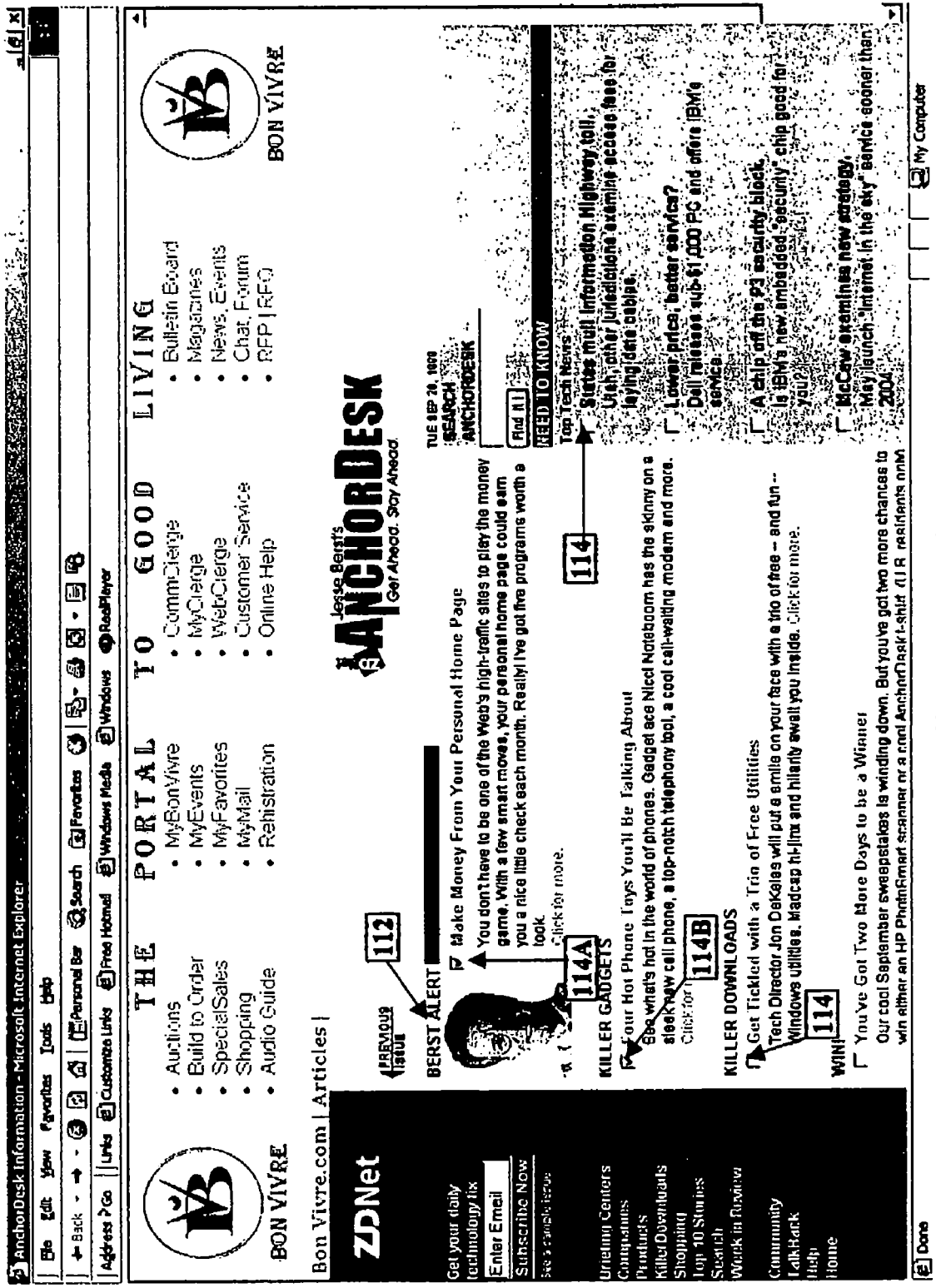
FIG. 11A1

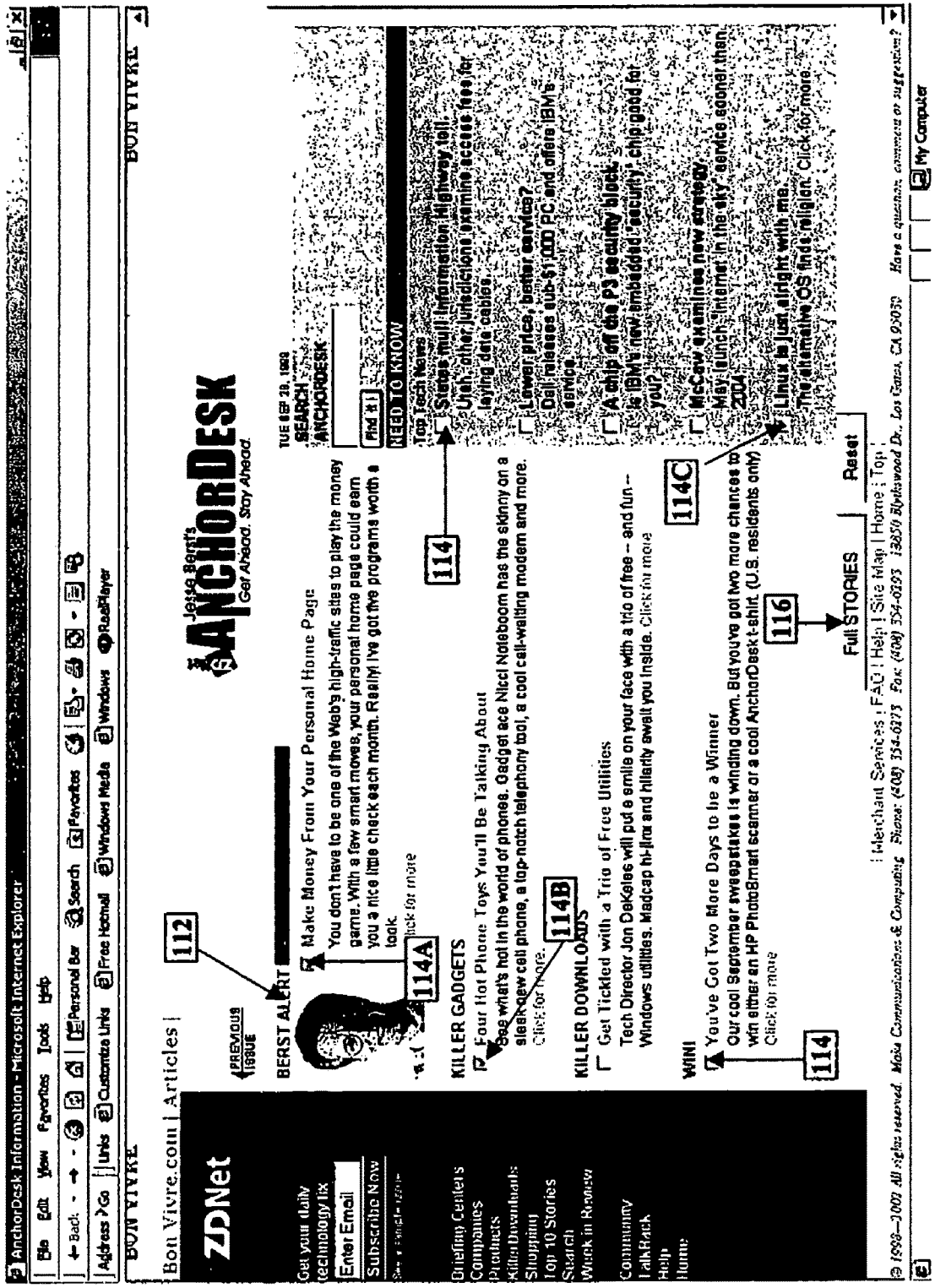
FIG. 11A2

Bon Vivre.com | Finance | My Quotes |

U.S. Stock Market
DOW 10793.82 +119.05 (+1.12%)   NASDAQ 2565.82 +25.82 (+1.02%)   6 August, 1999 (Thu) 4:07pm U.S. Markets Closed
S&P 500 1313.71 +6.39 (+0.64%)

MY QUOTES

| More Info | Symbol | Last Trade | | Change | | Volume | Daily Chart |
|---|---|---|---|---|---|---|---|
| L | AMAT | 4:01 PM | 72 7/16 | 7/16 | -0.60% | 6,079,400 | |
| L | AMTD | 4:00 PM | 23 7/16 | +3 6/16 | +16.46% | 11,266,260 | |
| L | AMZN | 4:01 PM | 97 1/4 | +8 13/16 | +9.96% | 18,756,600 | |
| L | AOL | 4:00 PM | 83 49/64 | -3 43/64 | -4.20% | 57,056,600 | |
| L | C | 4:05 PM | 44 | +1/16 | +0.14% | 9,341,400 | |
| L | EBAY | 4:00 PM | 92 7/8 | +17 1/8 | +22.61% | 13,549,600 | |
| L | INTL | 4:00 PM | 20 11/16 | +5/16 | +1.53% | 323,700 | |

FIG. 12A1

| | | | | | |
|---|---|---|---|---|---|
| L | AMZN | 4:01 PM | 97 1/4 | +8 13/16 | +9.96% | 18,755,600 |
| L | AOL | 4:00 PM | 83 49/64 | -3 43/64 | -4.20% | 57,056,800 |
| L | C | 4:05 PM | 44 | +1/16 | +0.14% | 9,341,400 |
| L | EBAY | 4:00 PM | 92 7/8 | +17 1/8 | +22.61% | 13,649,600 |
| L | INTL | 4:00 PM | 20 11/16 | +5/16 | +1.53% | 323,700 |
| L | LU | 4:05 PM | 84 1/4 | +1 5/16 | +2.09% | 10,897,700 |
| L | MCOM | 4:00 PM | 22 5/16 | +1/16 | +0.28% | 1,707,600 |
| L | MSFT | 4:00 PM | 85 3/4 | +13/16 | +0.96% | 38,314.9 |
| L | QCOM | 4:01 PM | 143 3/16 | +3/4 | -0.53% | 5,750,700 |
| L | QWST | 4:01 PM | 27 1/2 | +7/8 | +3.29% | 10,524,100 |
| L | T | 4:02 PM | 58 11/16 | +3/4 | +1.50% | 12,593,600 |

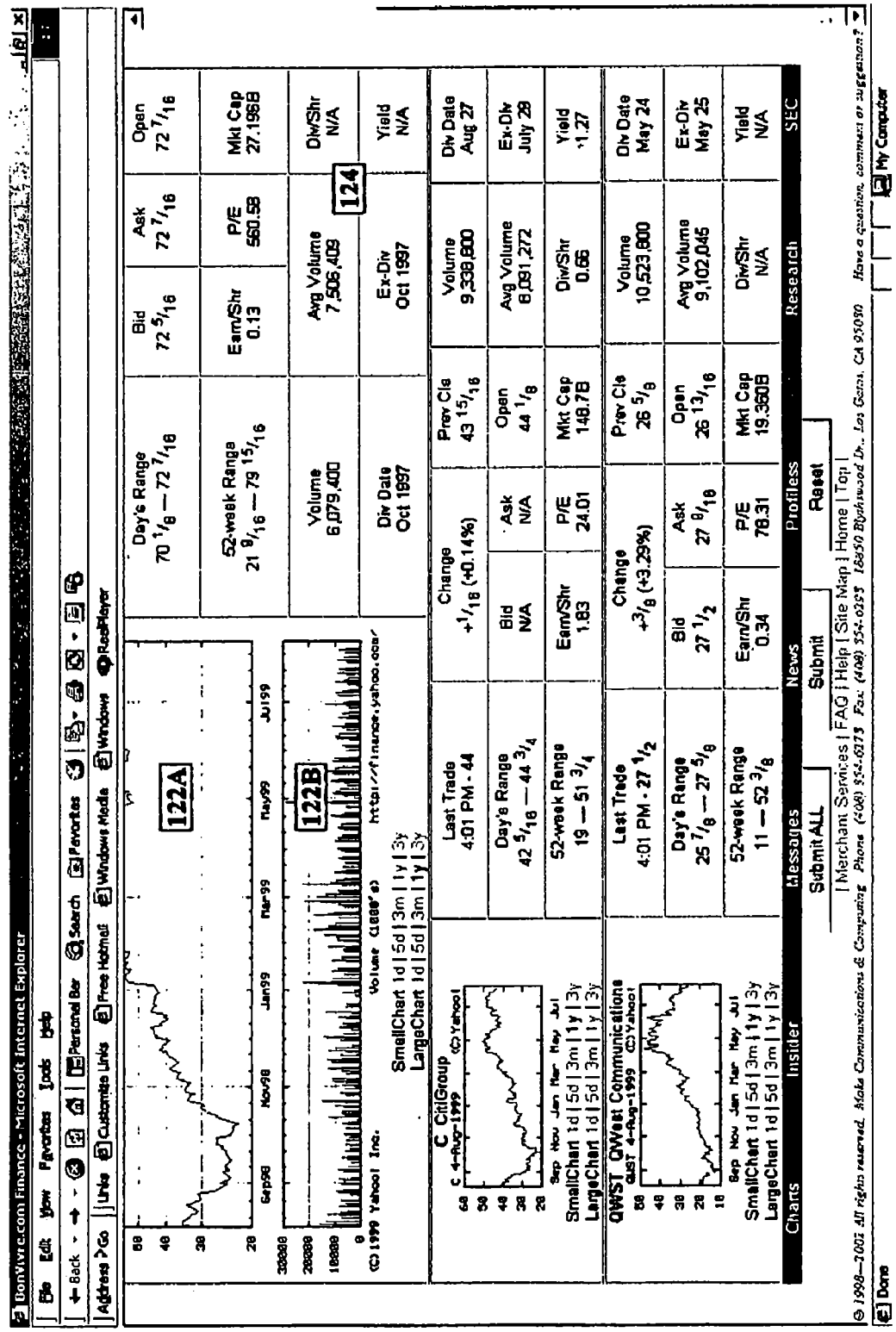
FIG. 12C2

FIG. 12D

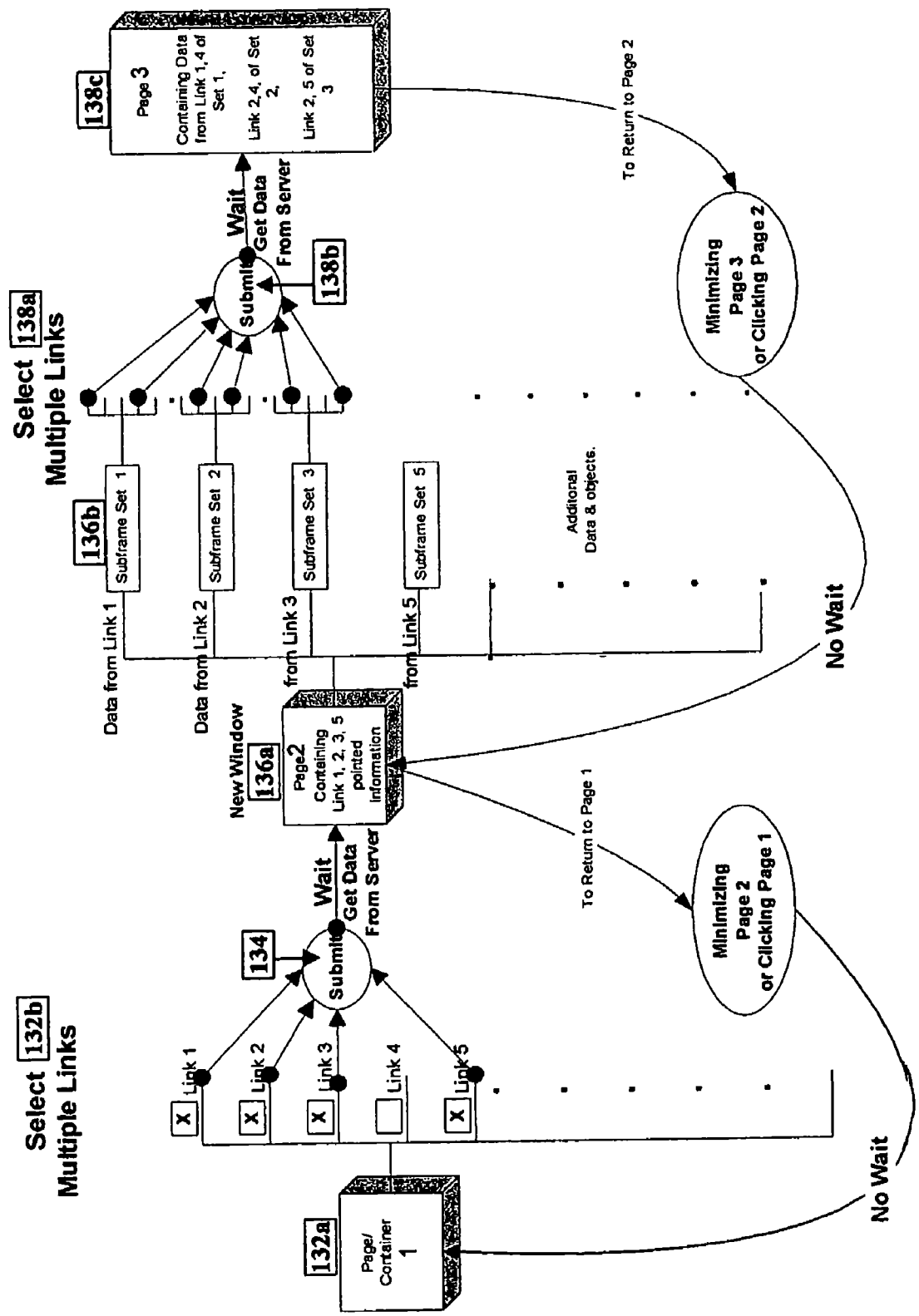
Figure 13 The Multiple Link Selection and Linking Process of the Current Invention

FIG. 14M1

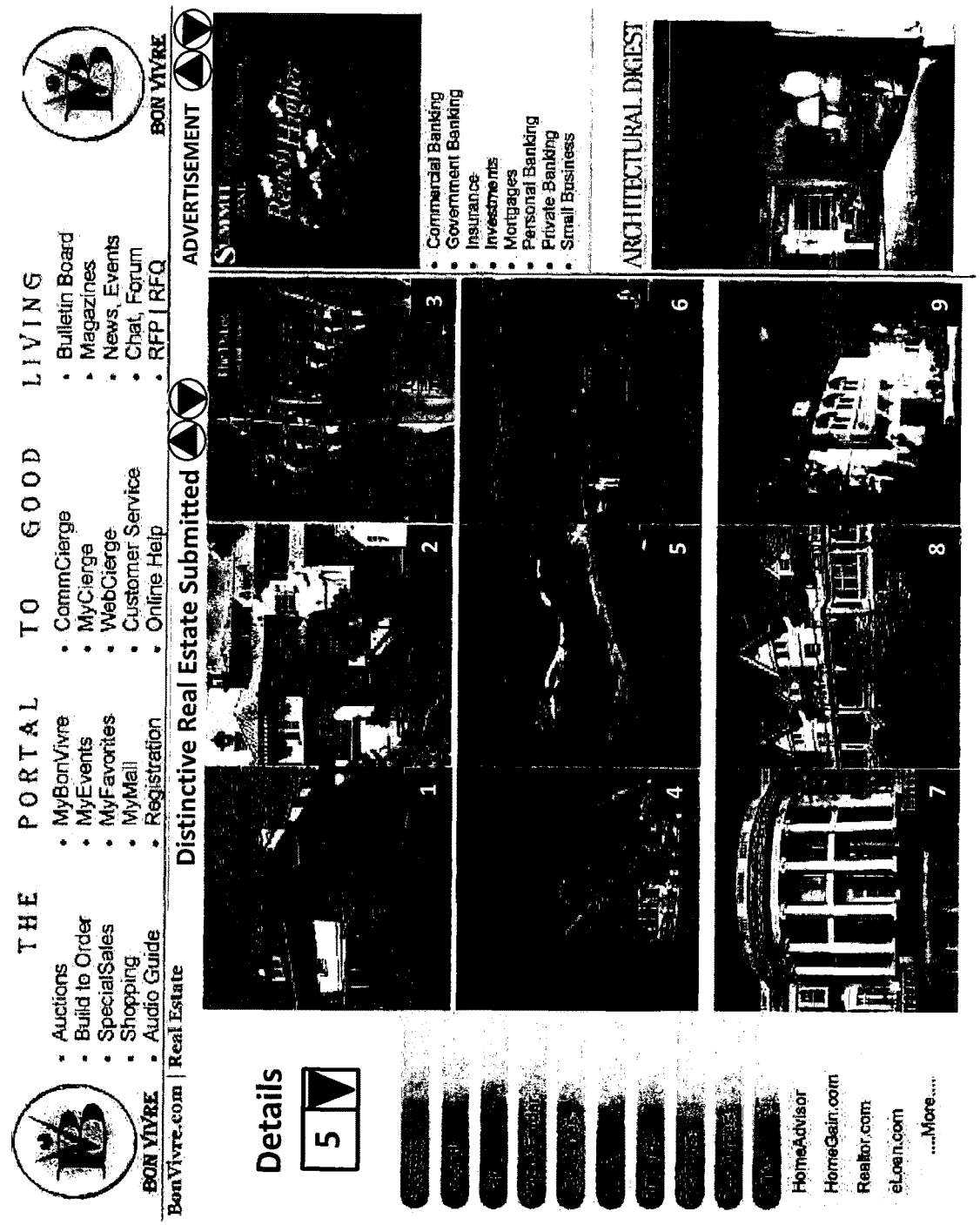
FIG. 14M2

DYNAMIC ARRAY PRESENTATION AND MULTIPLE SELECTION OF DIGITALLY STORED OBJECTS AND CORRESPONDING LINK TOKENS FOR SIMULTANEOUS PRESENTATION

RELATED APPLICATIONS

This Application is a Continuation of U.S. patent application Ser. No. 09/544,036, filed Apr. 6, 2000 which claims benefit of priority to U.S. Provisional Patent Application No. 60/130,397, filed Apr. 19, 1999. All of the aforementioned priority applications are hereby incorporated by reference in their entirety for all purposes.

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

BACKGROUND OF THE INVENTION

Field of the Invention

The present invention is related to the multiple selection of digitally presented and digitally stored objects (starting objects), and the link-tokens linking the starting objects to additional information, data, and/or related data-entry or transaction mechanisms (destination objects) pertinent to each selected starting object, for simultaneous presentation and examination of the selected starting objects along with their associated linked destination objects/information. The present invention further relates to an organized dynamic array presentation for graphical thumbnails. The term "dynamic" refers to the automatic "self-scrolling" and "user programmable" features of the array-presentation. When the number of elements of a row or a column exceeds what the view-frame of the display-screen or browser can display simultaneously, the row or column begins to scroll through the view-frame as soon as the row (or column is filled). Viewers can program/select what categories are displayed in each row or column, and can control all rows and columns independently.

Graphical thumbnails are small images that represent objects frequently used in on-line or other viewable recording media (such as CD ROM) to represent the objects that are best represented by the image. Additionally, the present invention provides for sub-framing, which allows intelligent partitioning of information associated with an object.

Description of Related Art

The application of hyper text mark up language (HTML), dynamic HTML scripting languages, such as Common Gateway Interface (CGI), Practical Extraction and Report Language (PERL), Visual Basic Script Language, VBScript, and derivatives thereof, other languages, markup languages, or metalanguages, such as the Standard Generalized Markup Language (SGML-ISO 8879), extensible Markup Language (XML), Cascading Style Sheet (CSS), and ActiveX allow the static and dynamic presentation and linking of computer stored objects (texts, graphics, icons, parts, items, lists, audio and video segments, etc.) from a container, i.e., a file, a collection of objects, or a "page" of information, to related information and/or other objects and other containers via a software link token. A link token is an addressing pointer, pointing to the memory location of the linked destination). A link token is usually represented by a textstring, an underlined textstring, a bullet in front of a textstring, a color change of a text string, a graphical icon or thumbnail. An "index finger hand" would appear when the cursor is placed on an object that has an embedded link-token. A typical web page can contain numerous link-tokens, but only one link-token can be evoked at a time. When a link token is selected and evoked, for example, by clicking the computer "mouse" left-button while resting the cursor on the object with a link-token, the Browser would bring forth the destination object, i.e., a webpage that is linked by the link-token, from the database or memory bank in the connected storage media and/or networked computers and their storage media that is addressed by the evoked link token. The Browser then presents the object for viewing or examination by the viewer, i.e., the human, device, or computer software that evoked the link-token. The pointing-clicking action to "select" can similarly be performed with a wireless point-click device, such as a light-pen, or other remote input/control device.

However, on conventional web sites, selecting the starting object and its associated link-token from a segment of media (e.g., a page of graphics and texts, a list of parts, a segment of video or audio recording) where many objects and link-tokens are present, can only be performed one link at a time. When a particular link-token is evoked by clicking the left button of the mouse (a computer input device), or any remote input/control device, while the cursor is resting on the link-token, the destination object is brought forth for viewing or examination from the recording media addressed by the link-token. When one wishes to evoke another link-token on the starting (previous) page, he/she must return to that page by "clicking" the "Back" tool-button on the upper-left corner of the browser screen, to find the next link-token to be evoked. This operation must be done one token at a time, in serial fashion. If more additional objects from the starting page, or segment of media, are of interest, one must return to the segment to make a single selection from the interested objects, and evoke its associated link-token, again, repeatedly, one at a time. Moving forward and backward in segments of media or a series of web pages linked by the link tokens in this manner is a slow, awkward, labor-intensive procedure. FIG. 1A shows a flow chart depicting this process.

This procedure/methodology is especially awkward when there are many objects of interest in a particular starting segment, container, or page of media, and when there are multiple links of interest embedded again in the subsequent linked destination pages. The viewing human or examination devices are often taken several link-addressing steps away from the starting segment or page, such as an index list of items of interest, and are taken through multiple branches on a subsequent page. Such multiple branching causes the "Back" button pointer to loop between the two branches, making returning to the pages prior to the branching difficult, or even impossible. The URL (Universal Resource Locator) addresses of the prior pages and/or starting page must be remembered and entered in the "go to:" URL Address entry box on the Browser tool-band located at the top of the Browser frame, to return to the starting page in such situation.

FIGS. 2A through 8F show examples of pages from conventional web sites on which digitally stored starting objects are selected one at a time and their associated dynamically linked destination objects are displayed for viewing one at a time. One can only select and evoke a single link, out of the numerous links present on a web page. To select another object or link of interest from the page, one must return to the page, via clicking repeatedly the "Back" button on the Browser tool-band, reversing the path over which one has navigated in the forward direction in following the previously selected links. The color of a selected link or object does not change when placing the cursor on the link, nor when clicking on the link to select and evoke the link. The color change only manifests itself when after having selected and evoked the link, the browser returns "Back" to the page from which the link was selected and evoked.

FIGS. 2A-2G show a first example of pages from a conventional web site, i.e., Excite™, where one can only select a single item from the 106 luxury cars listed in FIGS. 2A-2F in 20 item segments and six physical "title only" pages. By "clicking" the left "mouse" button, while the cursor is resting on the selected item, the Browser brings the first level information linked to that item, and displayed for viewing as shown in FIG. 2G. Each underlined text string (an object, representing the "title" of a particular luxury car) has one link-token signified by the underline, with a single address pointer, pointing to a web page containing the information associated with this particular link. Only one single link (the underlined text string title) can be selected/clicked to bring forth and view the first level information associated with this underlined/linked "title", for example, the BMW 740iL from the first listing segment page. If a browser is interested in another three titles from the page, he must return "Back" to this particular listing segment page in order to select one of these three titles, and repeat the procedure three times. It may happen that one is viewing several pages of information several links deep to a title on the sixth segment page of the listing, and is interested in comparing this title to another two titles in the third segment page, and three titles in the first segment page. To do so, one would need to print the current information pages, one link at a time, and then either remember the uniform resource locator (URL) (i.e., the address) of the third segment, or click the "Back" button of the Browser as many times of the link-levels of the last information page to return to the 6$^{th}$ segment page where the current title locates, and then three more times to get to the third segment, each time clicking a "continue" indicator in a pop-up dialog box that indicates you, i.e., the browser, are submitting information "unsecured". The user must then wait for the uploading of the "unsecured" address to the site-server, and the downloading of the addressed information from the site-server to the desktop computer, to finally reach the third segment to click/select one of the two interested titles on that segment. The user would then need to print the resulting information; click "Back" one time to return to the segment, and click/select the another one title of interest on this segment page; print the resulting information. The user would then click the "Back" button two times, each time waiting for each segment page to load, to reach the first segment page. Finally the user must then click/select one of the three interested titles, print the resulting information, click the "Back" button one time, wait for the content to load, and repeat the procedure another two times for the remaining two interested titles from the page. If the user wishes to compare more number of items from the 106 item listing, the process becomes even more elaborate.

FIGS. 3A-3G show a second example of pages from a conventional web site, ebaY™, on which various categories of items including posters and a set of four 650 watt sub woofer stereo speakers shown as underlined text strings on the ebaY™ Home Page in FIG. 3A can be selected and displayed at a time as shown in FIGS. 3B-3G. The invocation of a link-token (represented by the underline) associated with the particular object represented/indexed by the text-string underlined, by clicking the left mouse button while the cursor is brought to the underlined text string title/index of the object, would bring forth the information page linked to this particular object represented by the underlined text string. Second stage links on this (brought forth) page would link to other additional pages containing further information related the particular "featured object." If one is interested in viewing information about another featured object on the ebaY™ Home Page, one must return to the ebaY™ Home Page from wherever the navigation has led the viewer, and repeat the process as many times as the number of items that interest the viewer.

As will be discussed further with regard to the present invention, the multi-tier information associated with particular items, such as the items listed in FIGS. 3A-3B, is not "sub-framed" to allow a sensible array presentation of such information. Such an array feature as in the present invention would provide a comparison-shopping capability that is highly desirable and easily comprehensible in one setting with one retrieval process. Yet, conventional systems and methods only enable information about items in a list such to be accessed one-at-a-time, and one-level, one-link-at-a-time. To view other interested items, one must return to scan the list over and over again, at times returning "Back" from many addresses away, which is an arduous, time consuming, and annoying process.

Additional examples of pages from conventional web sites on which only a single item from a list of items can be selected and displayed for viewing at a time are shown in: FIGS. 4A-4E, which show camera equipment for sale on the ebaY™ web site; FIGS. 5A-5B which show home products for sale on the Yahoo!™ web site; FIGS. 6A-6G which show home design products for sale on the Homeportfolio™ web site; FIGS. 7A-7K which show various tiffanysia jewelry items for sale on the ebaY™ web site; and FIGS. 8A-8F which show various news headlines from the Microsoft™/National Broadcasting Corporation™ (MSNBC™) news web site.

To view multiple headlined news articles listed on the homepage of MSNBC.COM shown in FIGS. 8A-8B, for example, one must select one headline at a time, clicking forward to additional links on follow-on pages, to wherever the article leads through the hierarchy of multiple interested reads/links on subsequent pages. To view another headline article, the browser must click backward as many times from where the previous article has taken him via clicking forward, each time waiting for a page to download, until back to the headline page, to click another interested article on that page. If multiple branches are taken from a page subsequent to the headline page, or a page containing multiple links of interest, the browser is often lost in a loop, and cannot get back out of the loop to return to pages prior to the page from which multiple branching is taken.

SUMMARY OF THE INVENTION

The present invention provides for the multiple selection of digitally stored and presented objects (texts, graphics, parts, lists, audio or video segments, etc.) with their associated dynamic link-tokens (addressing pointers) from any starting container of digitally recorded media, such as pages of text or graphics, lists of items, parts, objects, symbols, icons, digitally recorded audio or video segments, and the simultaneous presentation, displaying, viewing, and/or examination of the destination objects and/or information linked to these selected starting objects through their associated link-tokens.

The present invention enables a far more efficient viewing, comprehension, comparing, examination of all information related to the multiple interested objects at once, without having to present and exam each interested object and its singly linked information (at times at depths of many levels of links), one at a time, and each time having to return "Back" to the address of the starting container or page, wait for the loading of the content of the container from the storage device, repeating for several cycles, until reaching the starting container/page to select another interested object and its link, again one at a time, and one level at a time.

Additionally, the present invention provides for the organized array presentation of static or dynamically rolling/scrolling graphic thumbnails. Graphical thumbnails are frequently used in on-line or other viewable recording media (such as CD ROM) to represent objects that are best represented with their images. The invention dynamically presents a large collection of thumbnails in a two-dimensional array with a selectively adjustable number of columns and rows. The present invention provides mechanisms for a user/viewer to select/program each row or column to display thumbnails of a particular category of objects. The present invention also dynamically and automatically scrolls the thumbnails through the display-screen or Browser view-frame, when the content of a particular row(s) or column(s) of thumbnails exceeds (and extends beyond) the displaying capacity of the display-screen or Browser view-frame. This method of presentation allows easy overview, multiple-selection for detailed viewing and examination of multiple objects in the array, easy comparison and further selection (for example for buying/acquiring), and optimized utilization of screen/media real estate. This invention also provides mechanisms for the user/viewer to control the automated scrolling, display larger and more detailed graphics and detailed information of selected thumbnails, and make multiple-selections from the displayed information of a large number of selected objects for further purposes.

Finally, the present invention provides for sub-framing. The sub-framing allows intelligent partitioning of information associated with an object that is typically linked to the object through multiple numbers and levels of links. Dynamic scroll bars in each subframe are used to allow the orderly arraying and presentation of "primarily textual" contents associated with a graphical content to be side-by-side with the graphical content. The textual content may have a length and/or width that are incompatible to the optimal sizing of the graphical content. By sub-framing the graphical content and the textual content of differing nature or subject, the presentation can be arrayed in an orderly manner, using scroll bars to indicate the existence of additional content beyond the viewing area. Furthermore, this invention includes a feature that when the cursor is moved within a sub-frame area, indicating the browser's interest in the content of the sub-frame, the complete content of the sub-frame would be displayed on the computer screen, saving the browser effort that would otherwise be needed in scrolling the scroll bar to view the content contained beyond the viewing area.

Furthermore, the present invention allows an array to present thumbnails of differing categories or sub-categories in each row (or column) in the array. For categories that contain more thumbnails than the screen viewing area can accommodate, the rows or columns of such categories would show horizontal (or vertical) scroll bars to indicate additional content beyond the viewing area. The additional content can be viewed by manual or automated scrolling of the scroll bars. The automated scrolling feature of the present invention can automatically commence upon the rows/column's filling the display-screen/Browser view-frame, and when their content exceeds/extends-beyond the display-screen or Browser view-frame. The manner, direction, and speed of scrolling can be controlled and commanded by the viewer/user, using command buttons provided by this invention.

BRIEF DESCRIPTION OF THE DRAWINGS

FIG. 1 shows a flow chart illustrating the steps by which digitally stored objects are selected and their associated dynamically linked destination objects displayed for viewing on conventional (known-art) web sites.

FIGS. 2A-2G show a first example of pages from a conventional (known-art) web site, Excite.com, on which objects are both selected and displayed for viewing one at a time.

FIG. 3A-3G shows a second example of pages from a conventional (known-art) web site, ebaY.com, on which objects are both selected and displayed for viewing one at a time.

FIGS. 4A-4E show a third example of pages from a conventional (known-art) web site, ebaY.com, on which objects are both selected and displayed for viewing one at a time.

FIGS. 5A-5B show a fourth example of pages from a conventional (known-art) web site, Yahoo!™.com, on which objects are both selected and displayed for viewing one at a time.

FIGS. 6A-6G show a fifth example of pages from a conventional (known-art) web site, Homeportfolio™.com, on which objects are both selected and displayed for viewing one at a time.

FIGS. 7A-7K show a sixth example of pages from a conventional (known-art) web site, ebaY™.com, on which objects are both selected and displayed for viewing one at a time.

FIGS. 8A-8F show a seventh example of pages from a conventional (known-art) web site, MSNBC™.com, on which objects are both selected and displayed for viewing one at a time.

FIGS. 9A-9E show a first exemplary embodiment of pages from a present-invention web site on which multiple objects are both selected and simultaneously displayed for viewing using the system and method according to the present invention.

FIGS. 10A-10D show a second exemplary embodiment of pages from a present-invention web site on which multiple objects are both selected and simultaneously displayed for viewing using the system and method according to the present invention.

FIGS. 11A1-11C shows a third exemplary embodiment of pages from a present-invention web site on which multiple objects are both selected and simultaneously displayed for viewing using the system and method according to the present invention.

FIGS. 12A1-12E shows a fourth exemplary embodiment of pages from a present invention web site on which multiple objects are both selected and simultaneously displayed for viewing using the system and method according to the present invention.

FIG. 13 shows flow chart illustrating the steps of present invention by which digitally stored and presented starting objects and links are multiply selected and their associated dynamically linked destination objects retrieved and presented simultaneously according to the present invention, respectively.

FIGS. 14A-14M2 show an automated scrolling thumbnail array feature of the present invention, with rows presenting thumbnails of selectable categories of products and a column representing another selectable category, such as a "promotion" category at the right side of the page. Example control buttons are also show to allow users/views to control/select the content and scrolling. When the number of thumbnails in a category exceeds what the display-screen or Browser view-frame can fit in, the thumbnails begin to scroll automatically, as soon as the row or column is filled, and loops around the view-frame. Alternately, the auto-scrolling can be programmed to stop, at the end, when all thumbnails have been show.

DETAILED DESCRIPTION OF THE EMBODIMENTS OF THE INVENTION

Described is a method and apparatus for the multiple selection of digitally stored and presented starting objects from a starting container, e.g. a web page, and the link-tokens of each selected object for simultaneous presentation and examination of the selected objects with multiple-levels of their associated linked objects and information. Further described is a method and apparatus for an organized and dynamic array presentation for graphical thumbnails. Additionally described is a method and apparatus for sub-framing, which allows for the intelligent partitioning of information associated with an object. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

The multiple selection of digitally stored and presented objects (texts, graphics, lists, catalogs, audio or video segments, etc.) with their associated dynamic link-tokens (addressing pointers) from any other container of digitally recorded media, such as pages of text or graphics, lists of items, parts, other objects, symbols, icons, digitally recorded audio or video segments, and the simultaneous presentation, displaying, viewing, and/or examination of the destination objects and/or information linked to these selected starting objects through their associated link-tokens, enable a far more efficient method for viewing, comprehending, comparing, and examining all information pertinent to these selected interested objects. This is in contrast to the prior art, where each interested object is selected one at a time, and its sole link token invoked one at a time, at times at depths of several hierarchical levels of links, to present and exam each interested object and its linked information, one object at a time and one link at a time, and returning by clicking the "Back" button multiple times to the URL address of the starting container/page, where the indices and links to other interested objects reside. Each forward or backward click is compounded by having to wait for the loading of the content of the associated page from the remote storage device(s).

Figure 3B:
Figure 6G:
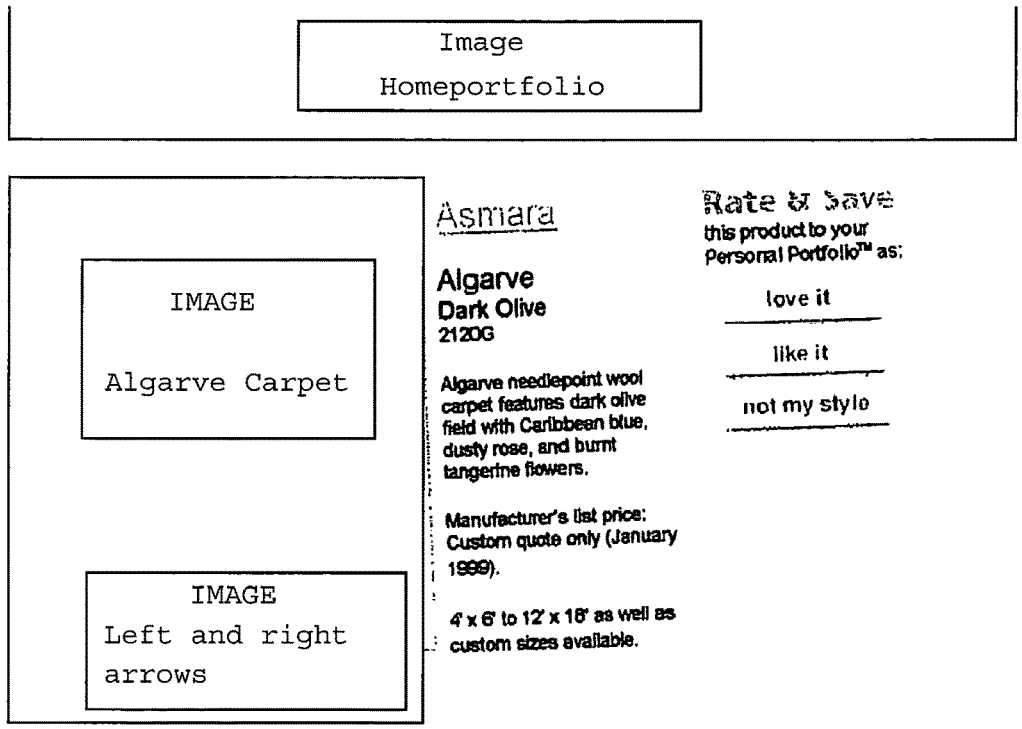
Figure 7J:
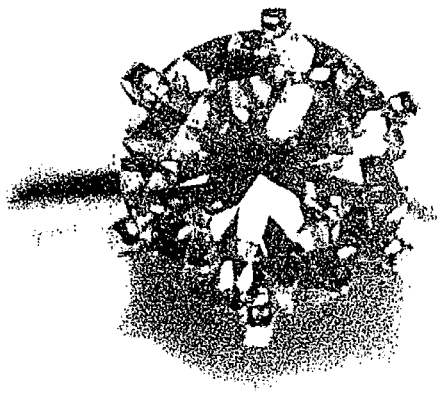
Figure 8F:
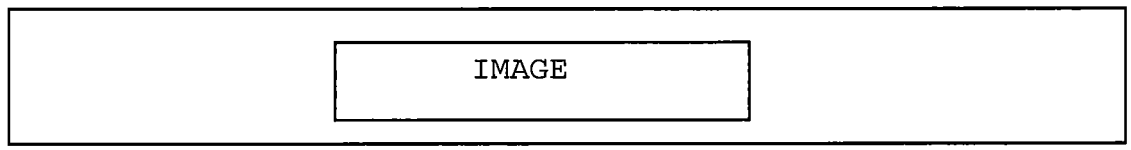
Figure 9A:
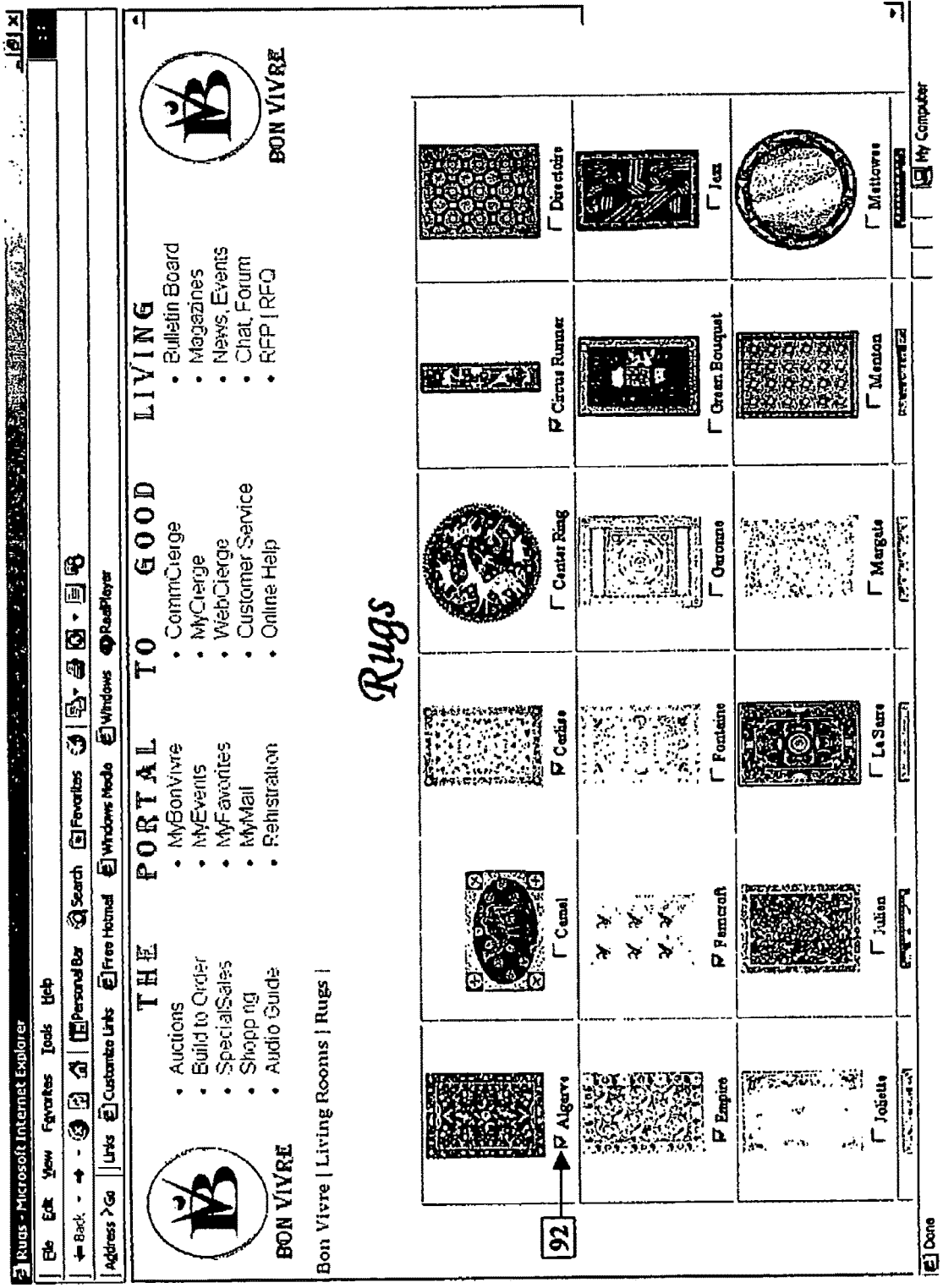
Figure 9B:
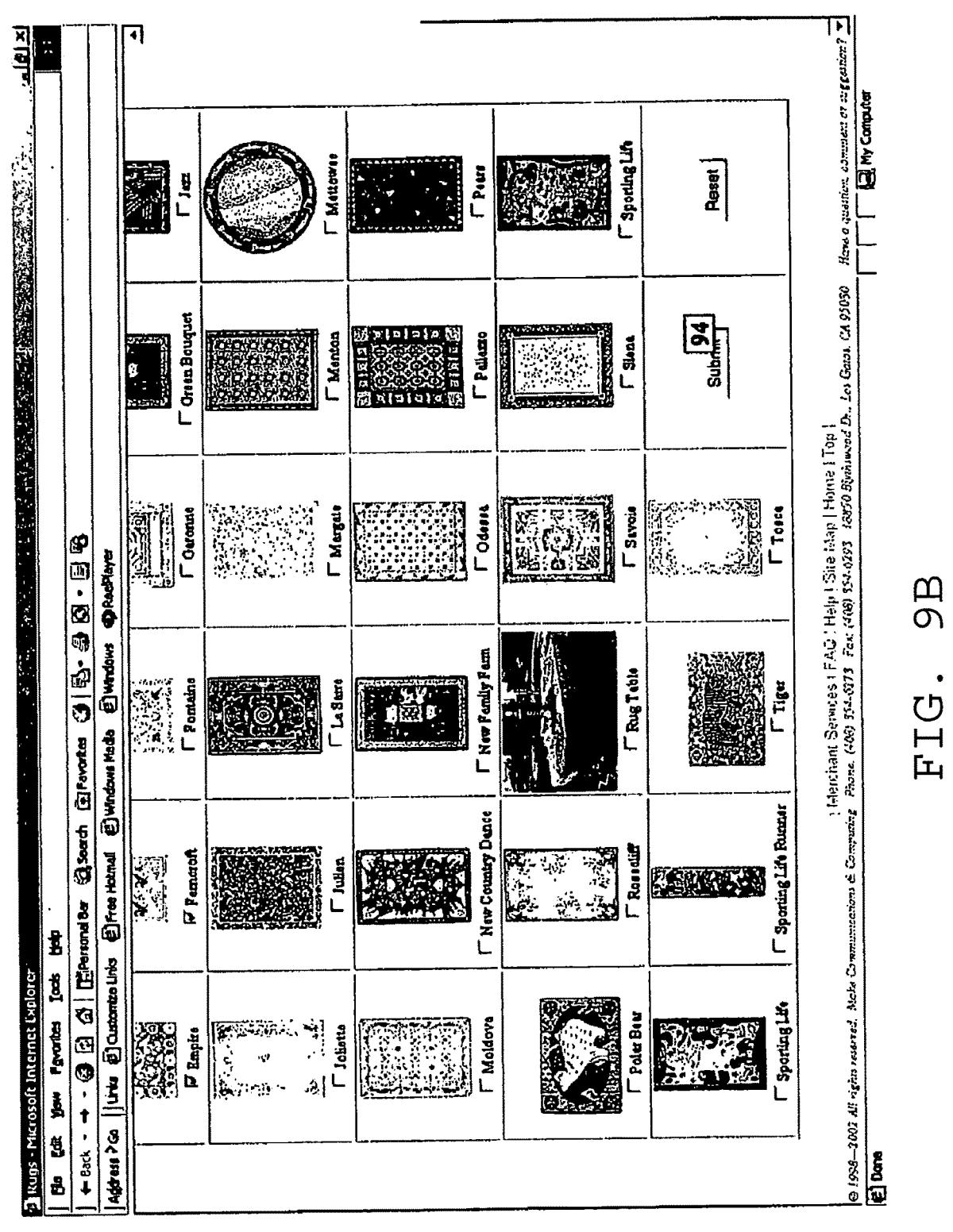
Figure 9C:
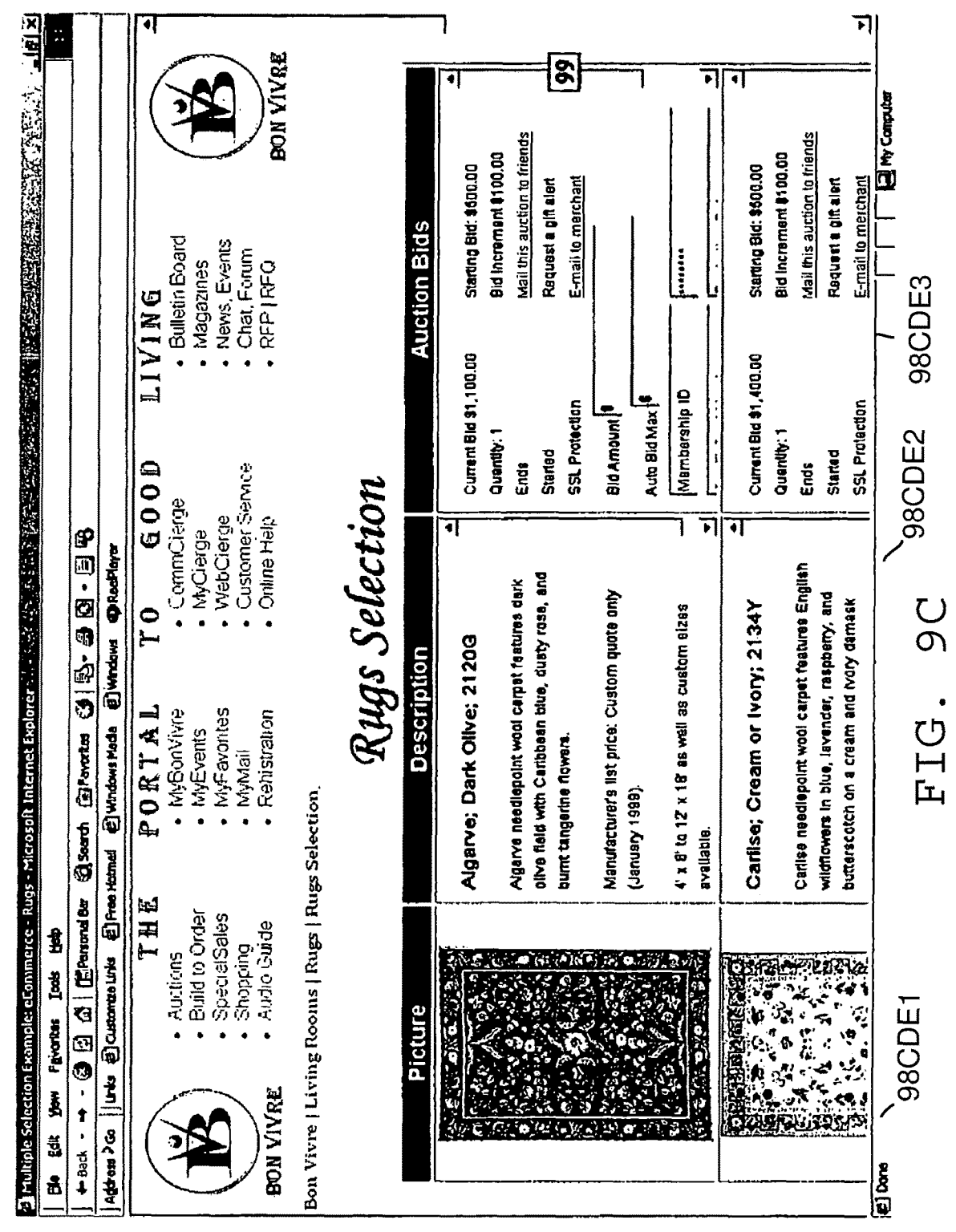
Figure 9D:
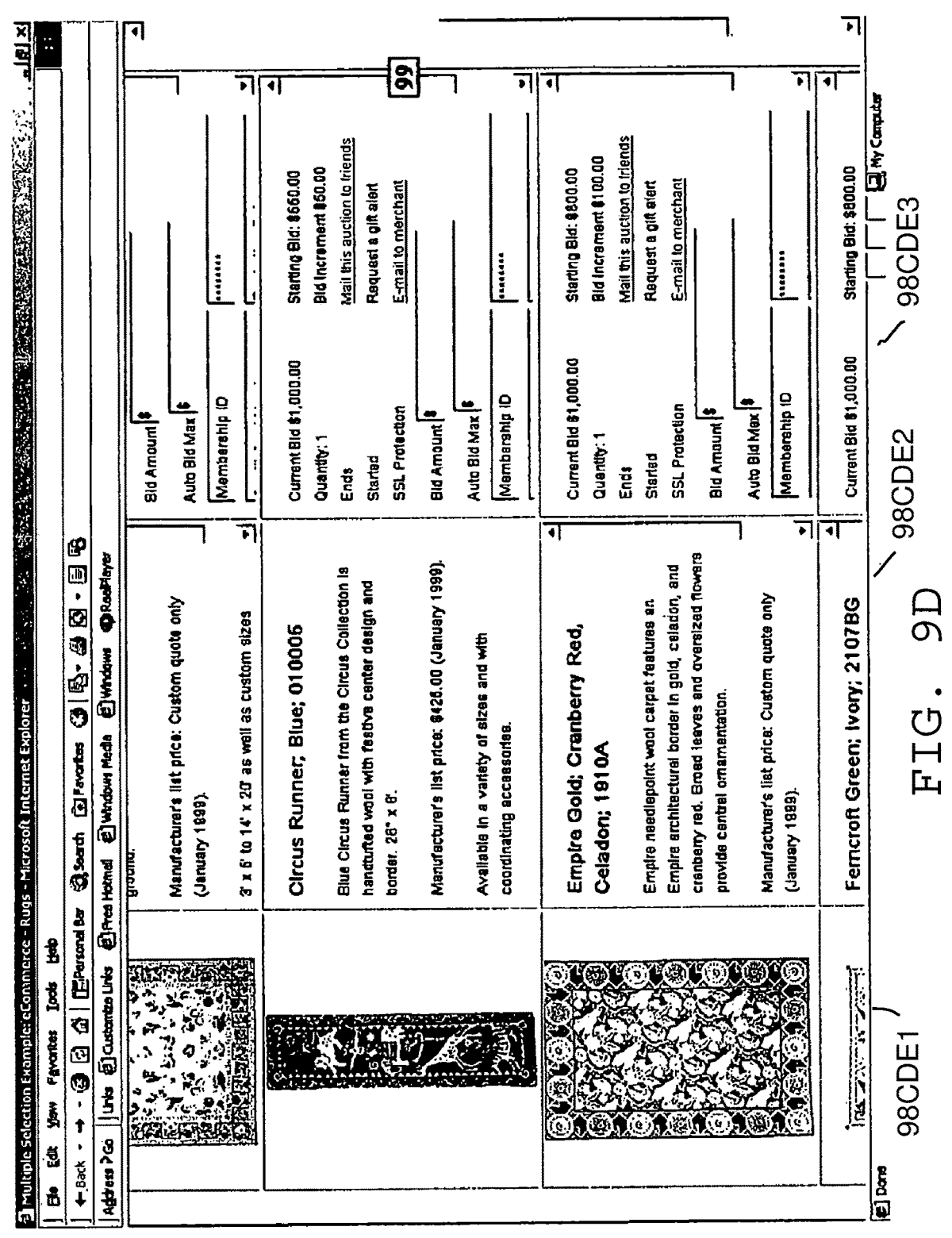

Referring now to FIGS. 9A-9E, which show a first exemplary embodiment of the present invention in which rugs from an array of rugs shown in FIGS. 9A-9B can be selected via checking the associated selection check-boxes 92, and clicking the "Submit" 94 button in FIG. 9B so that the dynamically linked associated information pertaining to the selected rugs is simultaneously displayed for viewing as shown in FIGS. 9C-9E. This enables multiple rugs to be simultaneously viewed and examined at the same time, side-by-side. To "de-select" a particular previously selected rug, can be accomplished by clicking on the "checked" selection check-box. To "null" all previous selections and start over, a viewer can "click" the "Reset" button 96 in FIG. 9B, which will erase all "checks" from the previously "checked" check-boxes. In FIGS. 9C-9E, the larger/detailed pictures of the selected rugs have a predetermined/optimized size, and are arrayed in picture column 98CDE1. The textual information of each of the selected rugs, which may contain further links to audio, video, even more detailed descriptions, or phone connection to the merchant selling the rug, are arrayed in the column 98CDE2 next to the picture column 98CDE1. The transaction information and commands are contained in column 98CDE3, next to column 98CDE2. When and if content of some or all elements of column 98CDE2 and 98CDE3 exceeds the height of the Picture column 98CDE1, a vertical scroll-bar 99 would appear at the right side of such elements.

Figure 10C:
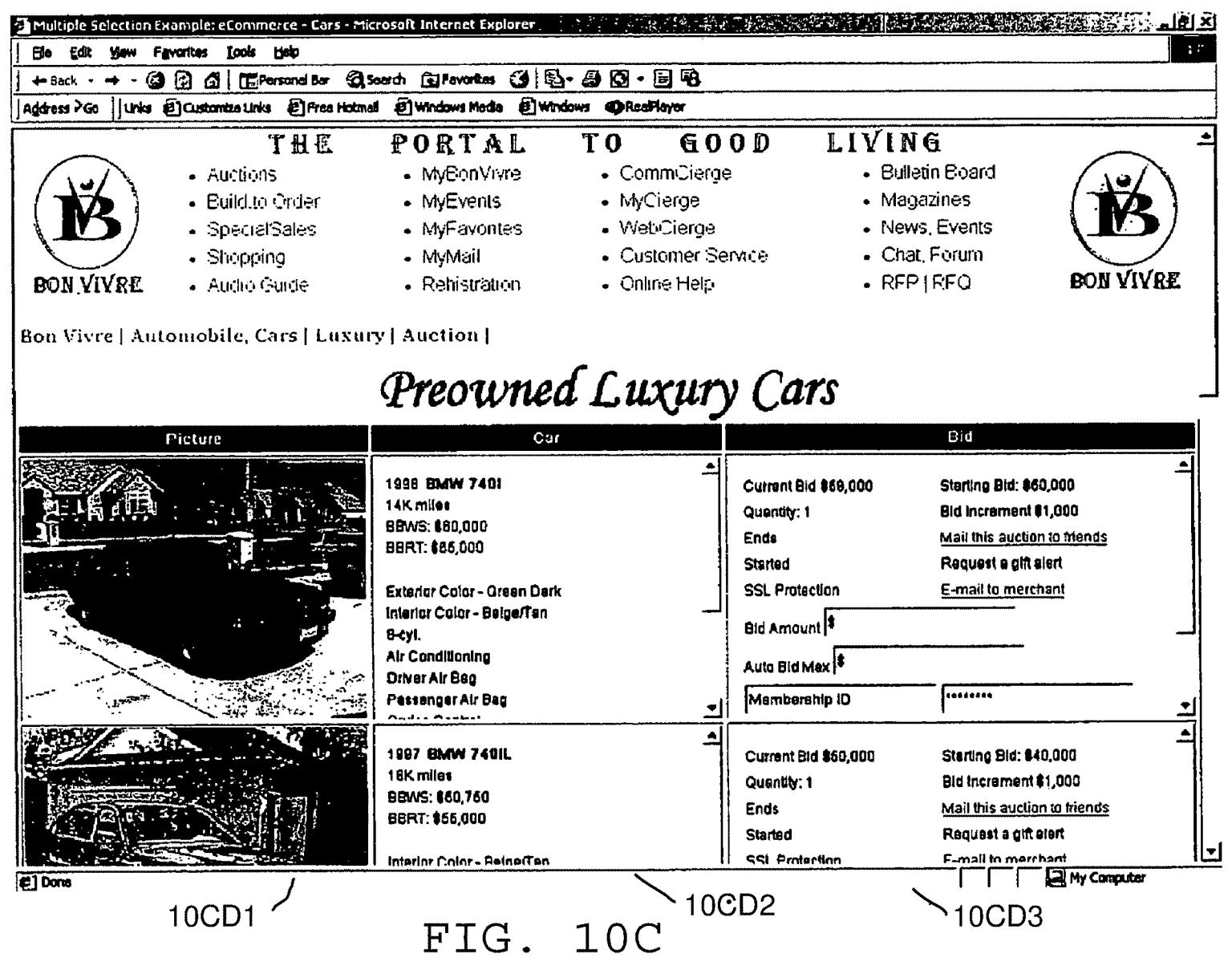

Referring now to FIGS. 10A-10D, which show a second exemplary embodiment of the present invention, in which multiple luxury cars from a list of luxury cars shown in FIGS. 10A-10B can be selected from the selection check-box 102 to the left of each listing, so that the dynamically linked associated information pertaining to the selected cars is simultaneously displayed for viewing as shown in FIGS. 10C-10D. This enables a multitude of information regarding the multitude of selected cars to be simultaneously retrieved, displayed, viewed, and compared side-by-side.

Graphical thumbnails are frequently used in on-line or other viewable recording media (such as CD ROM) to represent objects that are best represented by an image. Such objects include products such as furniture, painting, rugs, and parts catalogs, just to name a few examples. In the prior art, graphics thumbnails are used either in a linear fashion as shown in FIGS. 6D-6G, random as shown in FIGS. 7A-7H, or semi-random. However, with reference to FIGS. 9A-9E, the present invention dynamically presents a large collection of thumbnails in a two-dimensional array with a selectively adjustable number of columns and rows. This method of presentation allows easy viewing and examination, easy selection, and optimized utilization of screen/media real estate. When the number of thumbnails exceeds what can be shown within the view-frame of the display-screen or Browser, the present invention automatically scrolls the array into view, at user selectable speed.

With reference to FIGS. 9D-9E and 10C-10D, sub-framing allows intelligent partitioning of information associated with an object. The dynamic scroll bars allow the orderly arraying and presentation of "primarily textual" contents associated to a graphical content, where textual content may occupy an area with a length (at a chosen width) that is incompatible to the optimal sizing for the graphics.

According to an embodiment of the present invention, the multiple selection mechanism, for example, can be effected/represented by check-boxes 92 and 102 associated with each "selectable" starting object, as shown in FIGS. 9A-9C and 10A-10B. However, this mechanism can also be implemented by changing the color of the link-token (an underline, a bullet, a dot, a change of shading when touched by the cursor, or any symbolic representation of a link-token), wherein the link-tokens are a first color/shading before being selected, change to a second color/shading when they are selected, and are a third color when the browser "returns back" to the list of link tokens from the simultaneously displayed associated destination objects to select additional link-tokens. The third color differentiates those link-tokens whose associated destination objects have already been selected, retrieved, and simultaneously displayed, from those link-tokens whose associated starting object have not yet been selected, and destination objects have not yet been retrieved and displayed. A single click by a mouse, for example, can represent select, and the color of the selected token changes to indicate its selected status, whereas a double click of the input device can represent "submit," and all destination objects linked through the selected tokens are brought forth with the double-click. Another way to accomplish this mechanism is to click left button of the mouse while holding down the right button to select, or vise-versa. The link-tokens selected change color, and a click of the left button without holding down the right button represents "submit" to bring forth the linked destination objects. Or the regular single click on the left button represents "select" and a single or double click on the left button while holding down the right button can represent "submit."

In the embodiments of the present invention, each starting object can be linked to three separate destination containers, or a destination container containing on graphic folder, one text and links folder, and one frame with multiple objects, commands, and multiple link-tokens, each represented as a separate "internal," or "sub" frame with dynamic scroll bars. However, it will be appreciated by those of ordinary skill in the art that the destination object linked to a selected object through the link token can be an object, multiple objects, a container containing multiple objects, or multiple containers each containing multiple objects of various and differing media. The graphics folder portion, for example, can contain multiple links to a set of multiple photographs taken from different angles, a video, an audio description, a music segment, or another textual description, or an actionable link to forward the photograph to a friend or a relative. Selection and invocation of such a link may spawn a "process" with a separate "pop-up" frame or window, while retaining the "parent" window, or advance the original "parent" window to the uniform resource locator (URL) of the object to which the invoked link-token points. The sub-framing and dynamic scroll bars allow the orderly arraying and presentation of "primarily textual" contents of varied length and width that may not be the same as to the optimal height and/or width for the graphics frame.

In the embodiment of the present invention shown in FIGS. 10A-10D, multiple car titles and their links are selected from a list. The selections are submitted to retrieve and present the multiple destination objects (in this case, a photograph of the car in one subframe, its textual description in another sub-frame, and an actionable command and information sub-frame). Each group of destination objects is associated with each starting object (e. g., a selected car title), containing information associated with each selected starting object. There is no limitation to the size of the list, the number of selections, the size, content, and number of fields of each destination object, other than the limitation of practicality and the size of the storage device.

Clicking on the photograph of the car in FIG. 10C-10D, picture-column 10CD1, for example, may provide a separate window detailing enlarged photographs of multiple directional views, a panning and scanning video with sound or audio description of the car, the manufacturer's detailed specifications and drawings, etc. Clicking on the "description" frame in column 10CD2 may bring forth a menu for related articles, third party commentaries, appraisals, detailed maintenance and usage records, etc. Upon clicking the mouse button for a selection or multiple selections, a separate window pops up to display the selected items, for example, the appraisal and the detailed maintenance and usage records. Clicking on the "action/auction" frame in column 10CD3, a menu shows possible selections of merchant records/information, customer feedback, bidding history, video-conferencing, telephone or email contact with the merchant, etc. A separate window to display selected items at this level may be spawned when a selection or multiple selections are made.

Figure 14A:
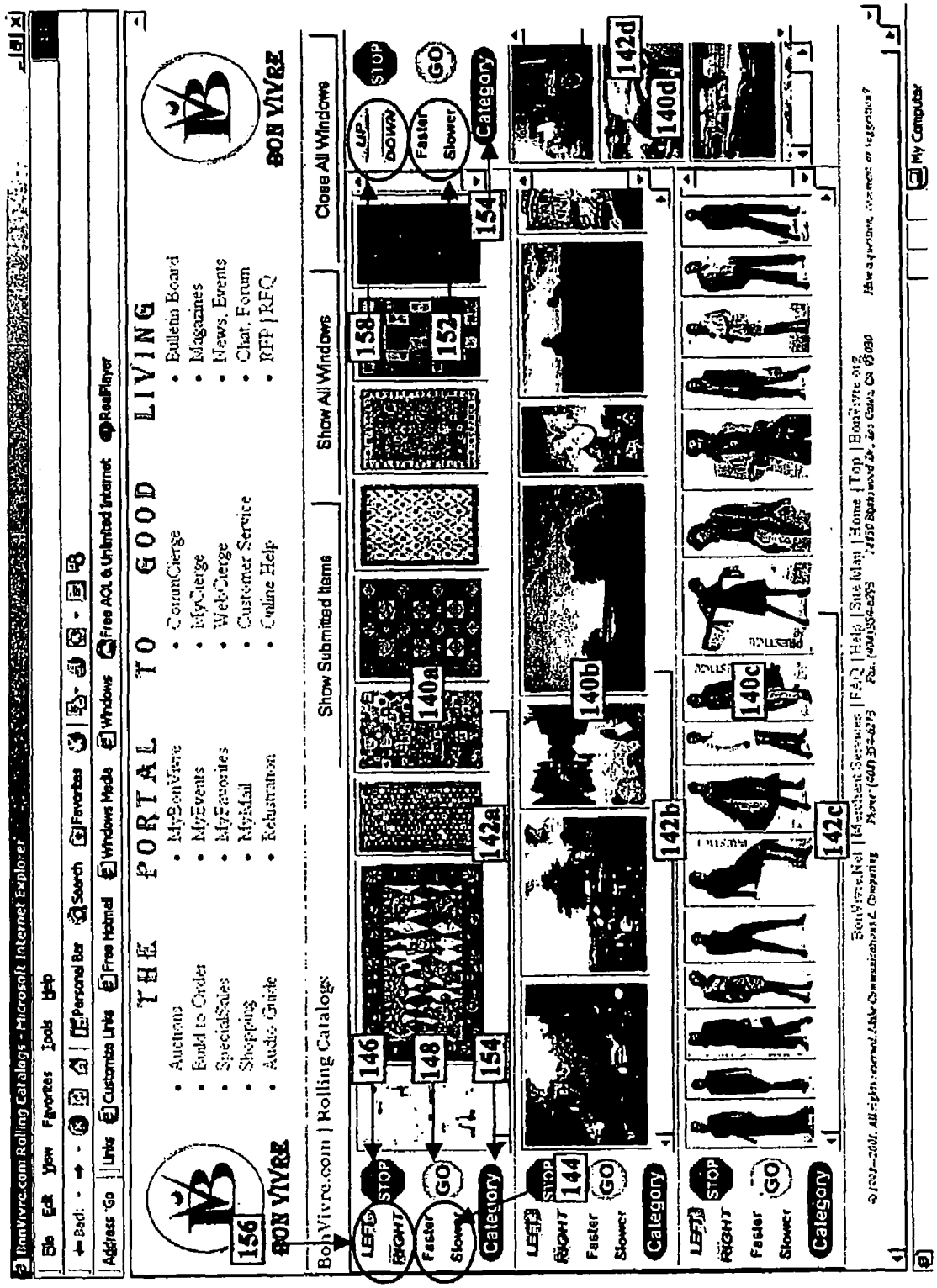
Figure 14B:
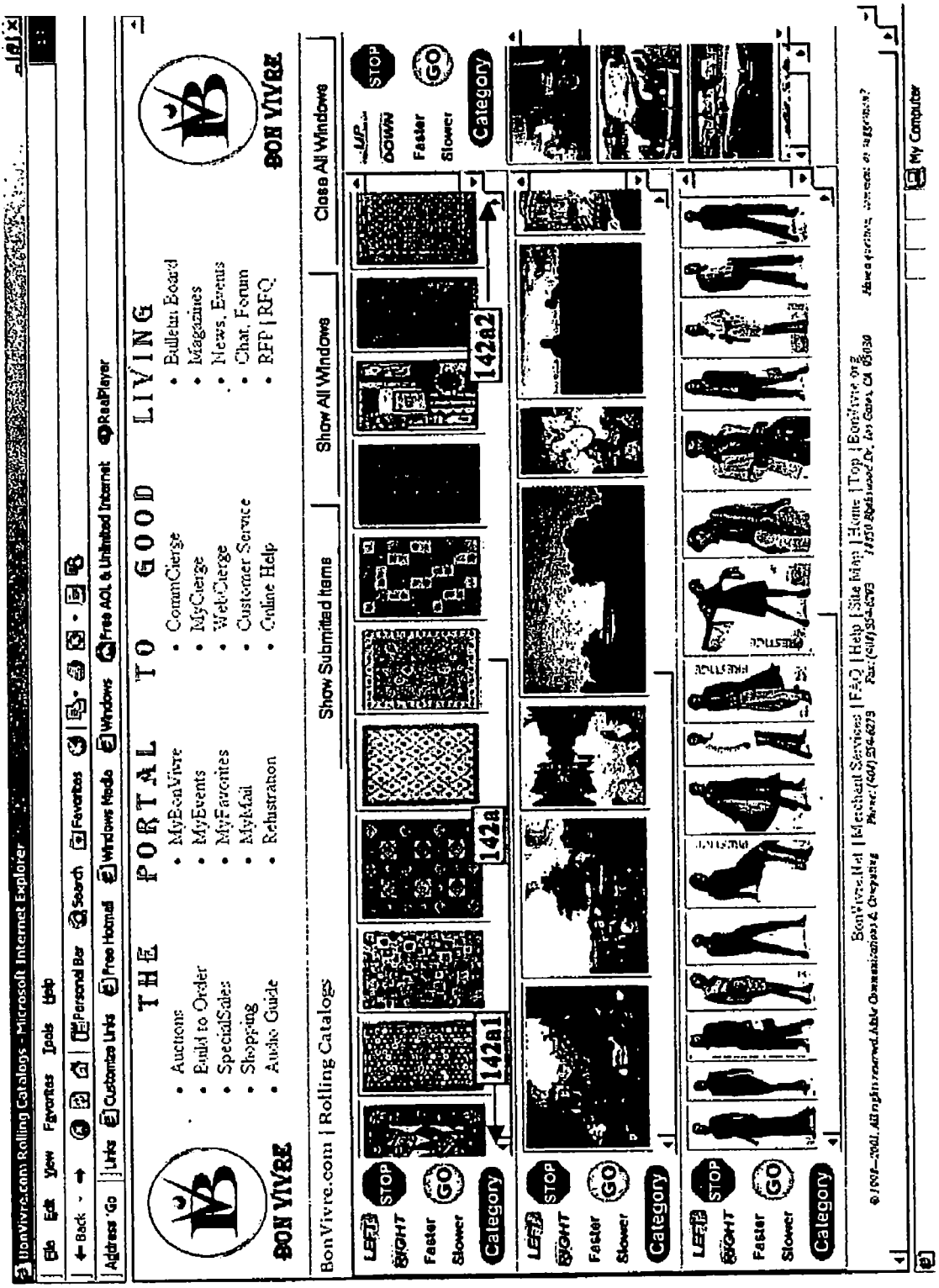

An embodiment of the present invention further contemplates a two dimensional array presentation of graphical thumbnails of objects (paintings, furniture, rugs, lamps, jewelry, clothes, sculptures, machine parts, etc.) and the multiple selection of their associated links to simultaneously present multiple destination objects and object fields, such as detailed graphics (which can also be audio or video segments), a textual information window/frame containing additional links, and an actionable command and informational window/frame associated with each selected starting thumbnail. Similar secondary selections are possible from pop-up menus associated with each window/frame as described above. As shown in FIG. 14A, sub-framing the array allows a number of categories to be presented on the computer screen simultaneously; each row or column can represent a category, or a sub-category under a main category. When the content, i.e., number of thumbnails is so large that it can not be viewed in the screen viewing area, the present invention allows the sub-frame to contain a scroll bar to indicate more content beyond the viewing area of the screen in the row or column. An embodiment of the present invention facilitates the automated scrolling of each row or column presented in a sub-frame. The details of the user controllable automatic scrolling are illustrated in FIGS. 14A-14J, and will be described in further detail later.

Referring now to FIGS. 11A1-11C, illustrating a third exemplary embodiment of the present invention in which multiple news headlines from a list of news headlines 112 shown in FIG. 11A1 can be selected by various mechanisms as described previously in this application, so that the dynamically linked associated news stories are simultaneously retrieved and displayed for viewing as shown in FIGS. 11B-11C. In this particular example, we use the "check-boxes" 114 as a selection mechanism, for visual clarity. In this example, the viewer selects/clicks headline check-boxes 114A, 114B, and 114C for retrieving the detailed information by moving the cursor to "Full Story" 116, and clicking the left mouse-button. This enables multiple headlines to be simultaneously retrieved, viewed and read, side-by-side, as shown in FIG. 11B. Although in the embodiment shown the associated news stories are displayed in three columns, any practical number of columns can be used. In the embodiment shown, if more than three headlines are selected, for example, six headlines, then the news stories associated with fourth, fifth and sixth headlines selected will appear vertically below (or horizontally next to) the news stories for the first, second and third headlines selected and can be viewed for reading by vertically scrolling down (or horizontally scrolling to the right of) the computer screen. The automatic scrolling feature of the invention scrolls the content for the browser when the browser moves the cursor to the bottom (for vertical scrolling down beyond the current screen), or to the right (for horizontal scrolling to the right of the screen) of the view-frame. For optimized interface with human eyes, full-stories of each three to five (or more, as dictated by the display-screen size) successive headline selected is displayed in three to five (or more, when display-screen is large) columns to each full-screen view-frame in the manner as just described.

Figure 12E:
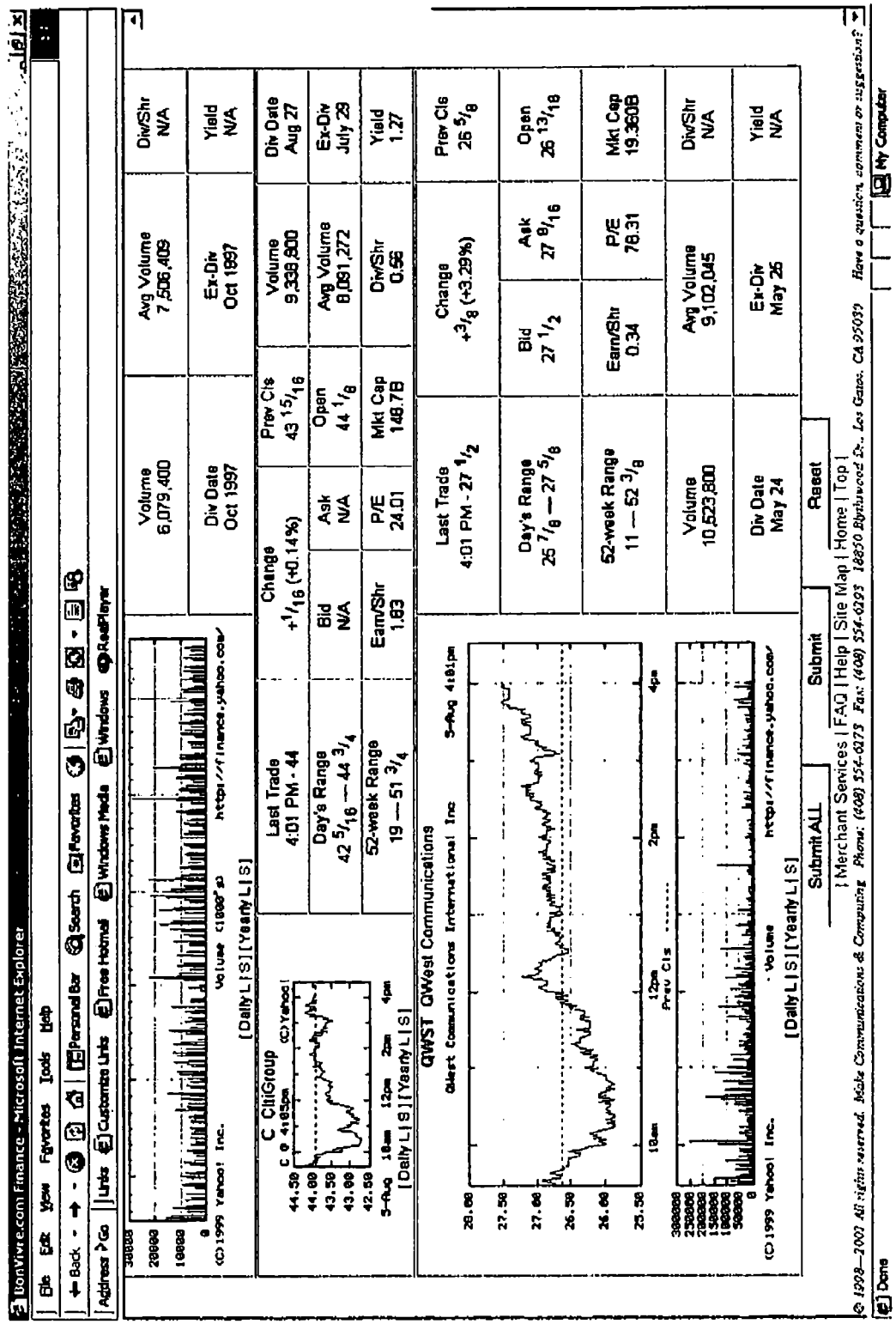

Referring now to FIGS. 12A1-12E, which show a fourth exemplary embodiment of the present invention in which multiple stocks from a list of stocks shown in FIG. 12A1 can be selected so that the dynamically linked associated graphical, e.g., charts, and alphanumeric, textual, or audio information (analytical, numerical, and competitive data and analysis, news, reports, etc.) are simultaneously displayed for viewing as shown in FIGS. 12B-12E, where charts are arrayed in the left column with the numerical information arrayed in the right column. Alternately, a first set of number of charts can be arrayed in the first row, with the associated numerical information underneath it in the $2^{nd}$ row, and then array the next sequence of charts in the $3^{rd}$ row, with the associated numerical information arrayed in the $4^{th}$ row. This enables information regarding the selected stocks to be simultaneously retrieved, viewed and compared at the same time, side-by-side. When a first one of the simultaneously displayed charts, for example one of the charts shown in FIG. 12B1, is selected using a computer input device such as, by clicking a computer mouse or a light-pen, while pointing to the chart, the selected chart is made larger 122, with an added trading-volume chart, as shown in FIG. 12C1. More detailed numeric data can be shown along with the enlarged chart in the now also enlarged associated right-side area available. When a second one of the simultaneously displayed charts is selected using the input device, the first chart can either remain enlarged, or returns to its original smaller size which is the same as all of the other simultaneously displayed charts, while the second chart is made larger than the other simultaneously displayed charts. FIG. 12D and its continuation print FIG. 12E shows the first alternative, where both of the selected stocks/charts remain enlarged with further details shown simultaneously.

Referring now to FIG. 13, a flow chart illustrating the steps by which the present invention presents a multitude of digitally stored objects, and selecting a multitude of the links that associate these objects to further information—the associated dynamically linked destination-objects; and then retrieve and present, the multitude of destination objects simultaneously for convenient viewing and comparison. A multitude of links in an electronically stored and array-presented page 132A, can be selected at will, as exemplified by the checked check-boxes in 132B, and then submitted simultaneously by clicking a "Submit," or similar command button 134. The electronic/computing device would then, alone or in conjunction with the network of connected electronic/computing devices, retrieve and brings forth all linked destination objects, including information and command facilities, according to the selected links in 132B, and present them on the device screen in a new window 136A. The information and command facilities are organized in sets of sub-frames 136B, grouped together according to the corresponding starting link in 132. A multitude of links can be selected from the multitude of links 138A in this new window/page 136A. As the viewer/user completes the selection process, a "Submit" (or the like) command button 138B on this page can be clicked to cause all next level linked information/command-facilities to be brought forth with yet a new page or new window 138C. The process continues henceforth. The present invention saves tremendous cumulative wait time and laborious process from the prior-art. For returning to review previous pages, the present invention, when implement with strategic new windows for new pages, has the added advantage of quickly returning to view prior pages on the display screen by minimizing a present top-view window. This can also be accomplished by clicking a particular prior page-window's corresponding access bar located at the bottom of a Browser, if the particular page-window is not partially visible (while over lapped by the current page-window in the foreground). If the particular page-window is partially visible, the viewer can "click" on any place of the visible portion of the page/window, which instantly causes the page-window to be displayed in the foreground. The prior art requires that the viewer/user to enter the URL address of the particular prior page he/she wishes to be displayed, or to click the "Back" button on the Browser tool bar located at the top portion of the Browser, and wait for the immediate previous-page to load on the display screen. Viewer must scan the page to see whether it is the particular page he/she wishes to retrieve. In the prior-art, if a particular page the viewer wishes to retrieve is many link-levels back from the present page, the viewer must repeat this "back-and-wait" process as many times.

Figure 14C:
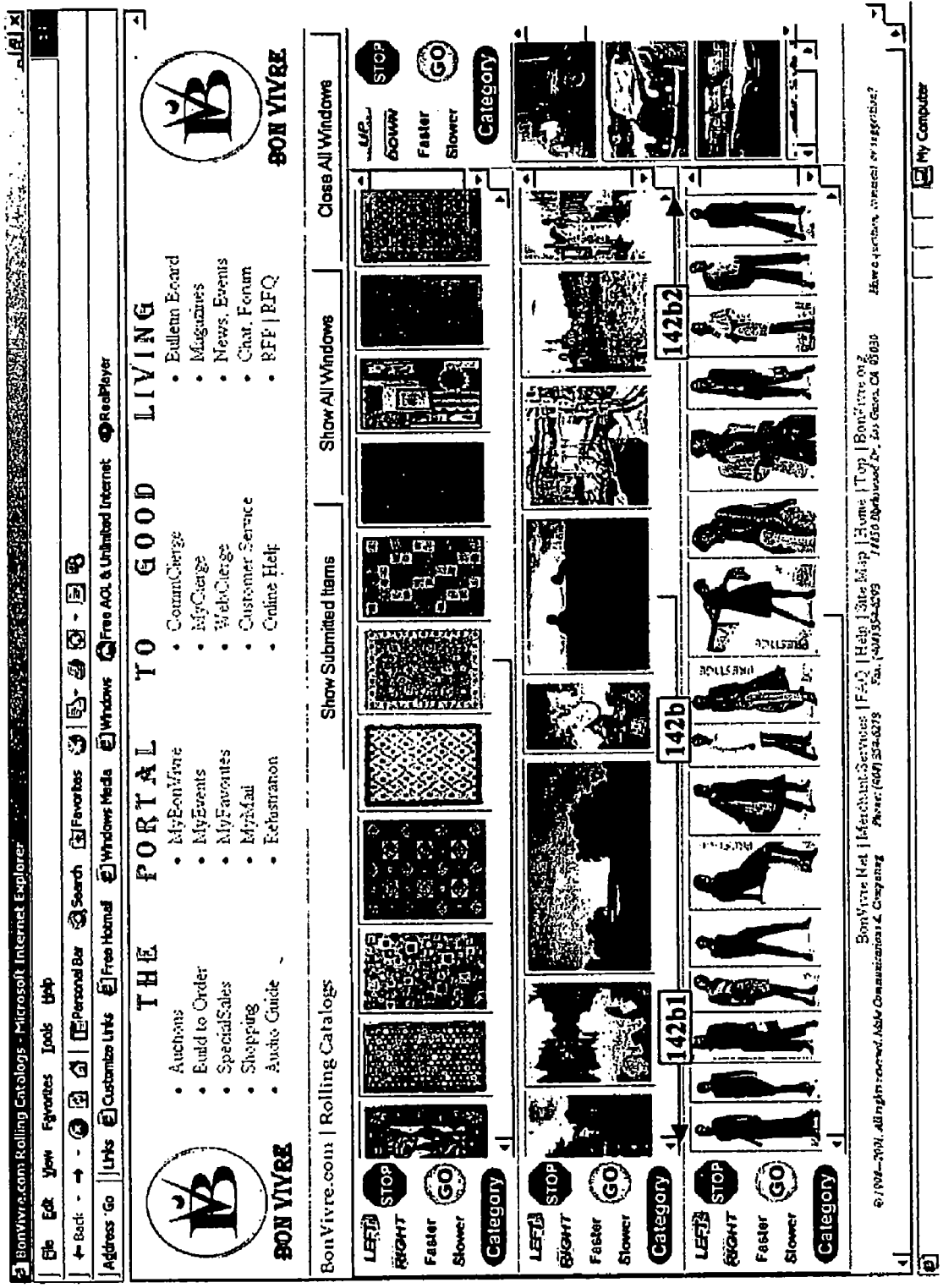
Figure 14D:
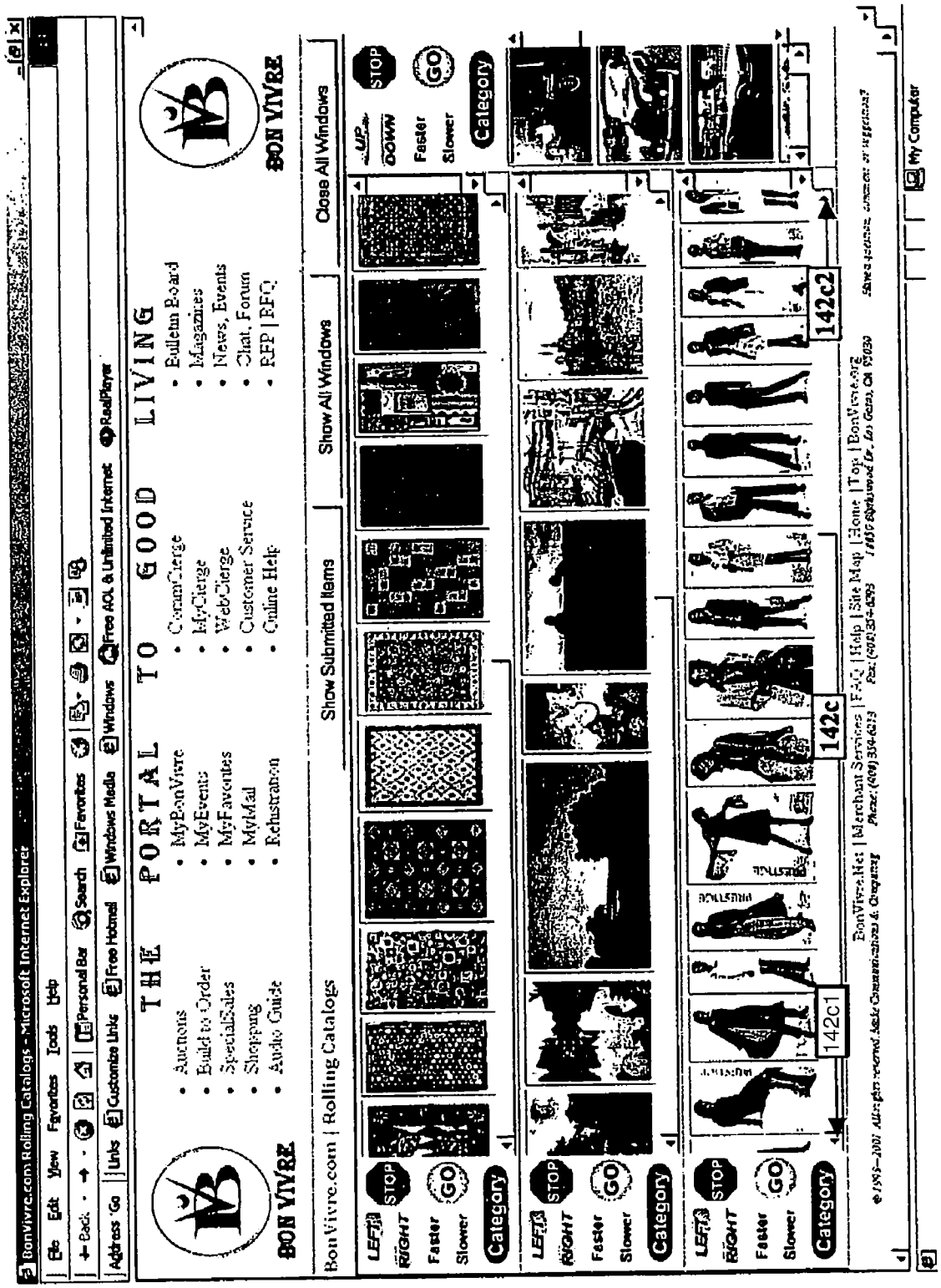
Figure 14E:
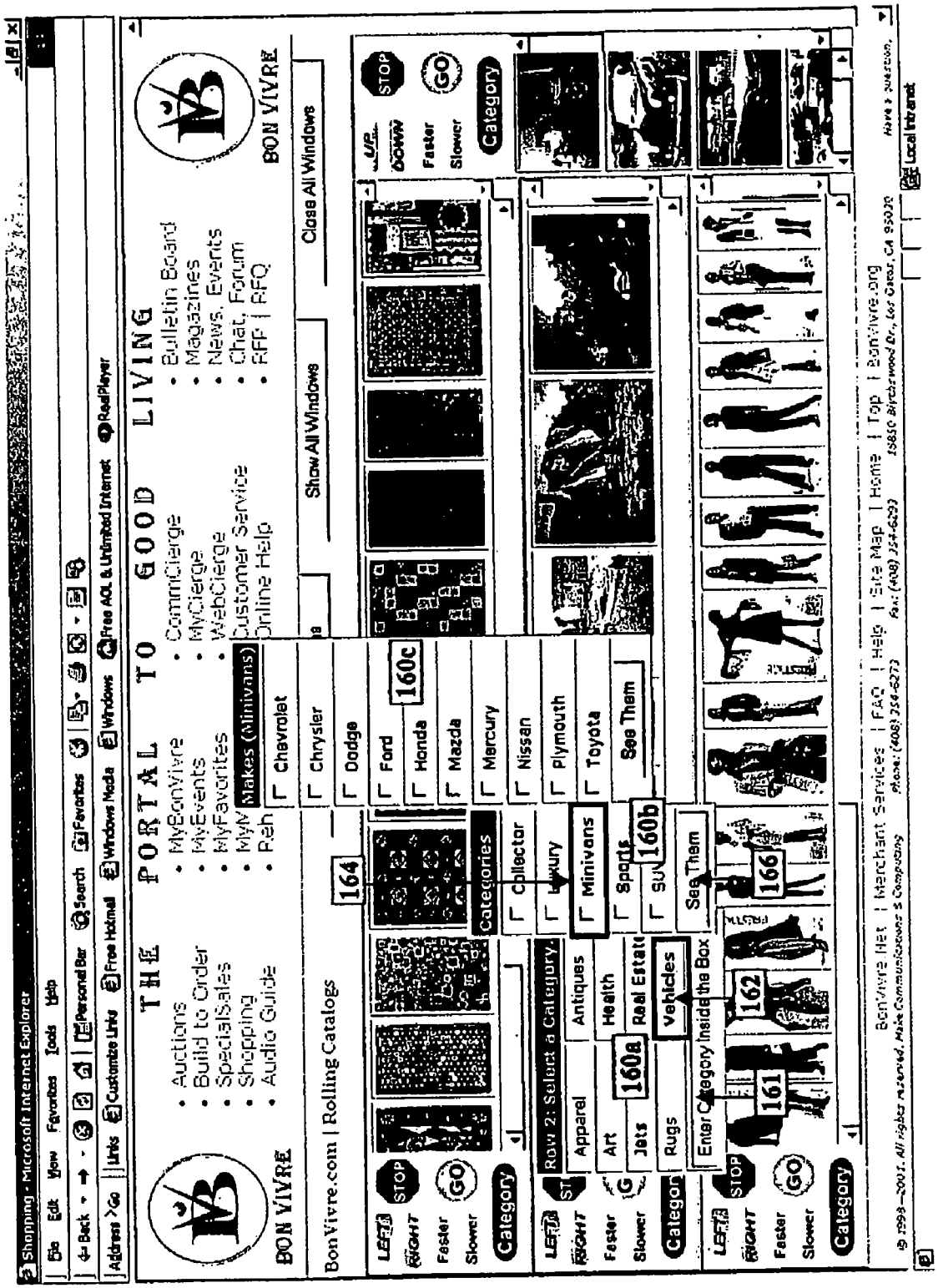
Figure 14F:
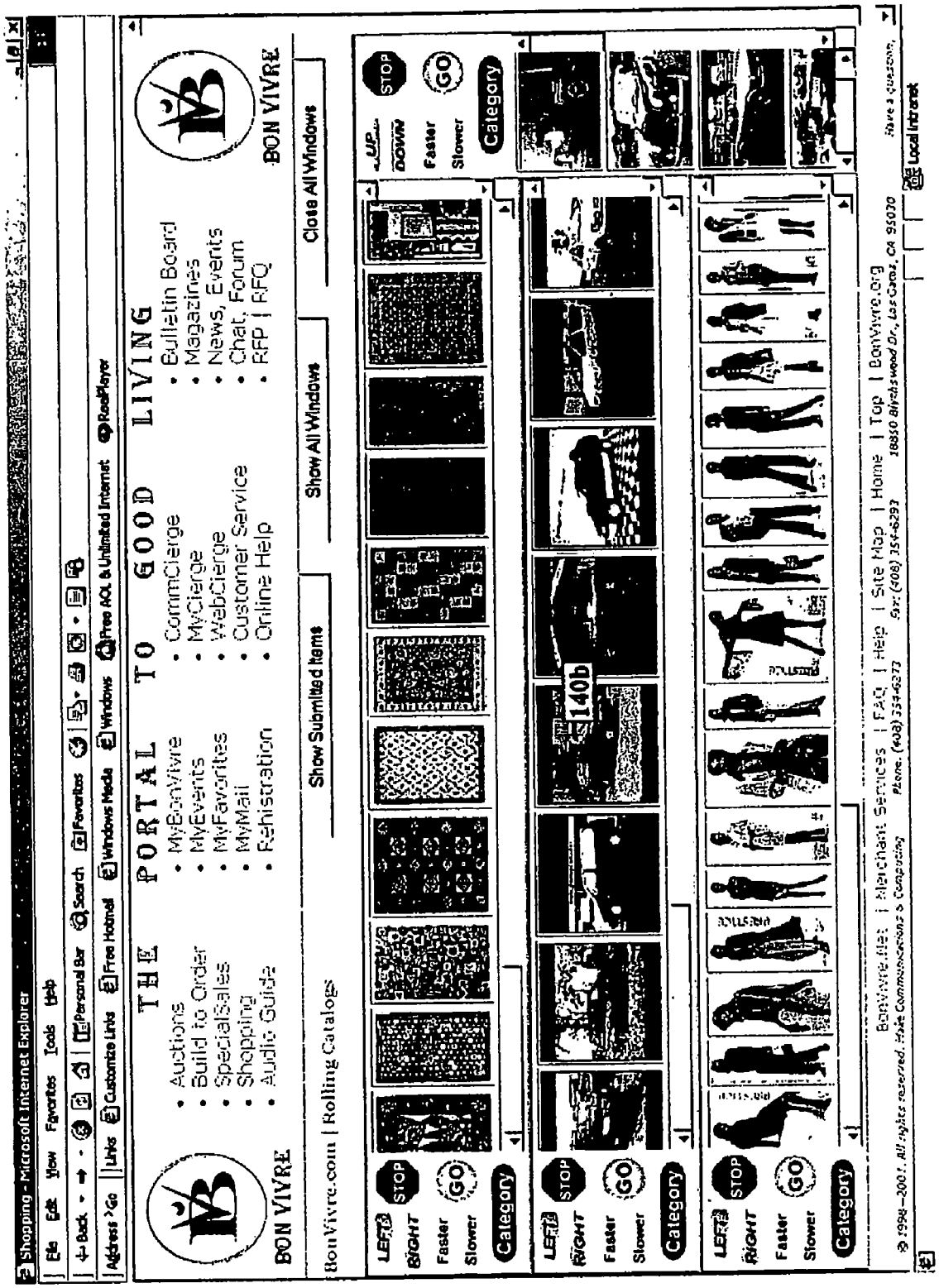
Figure 14G:
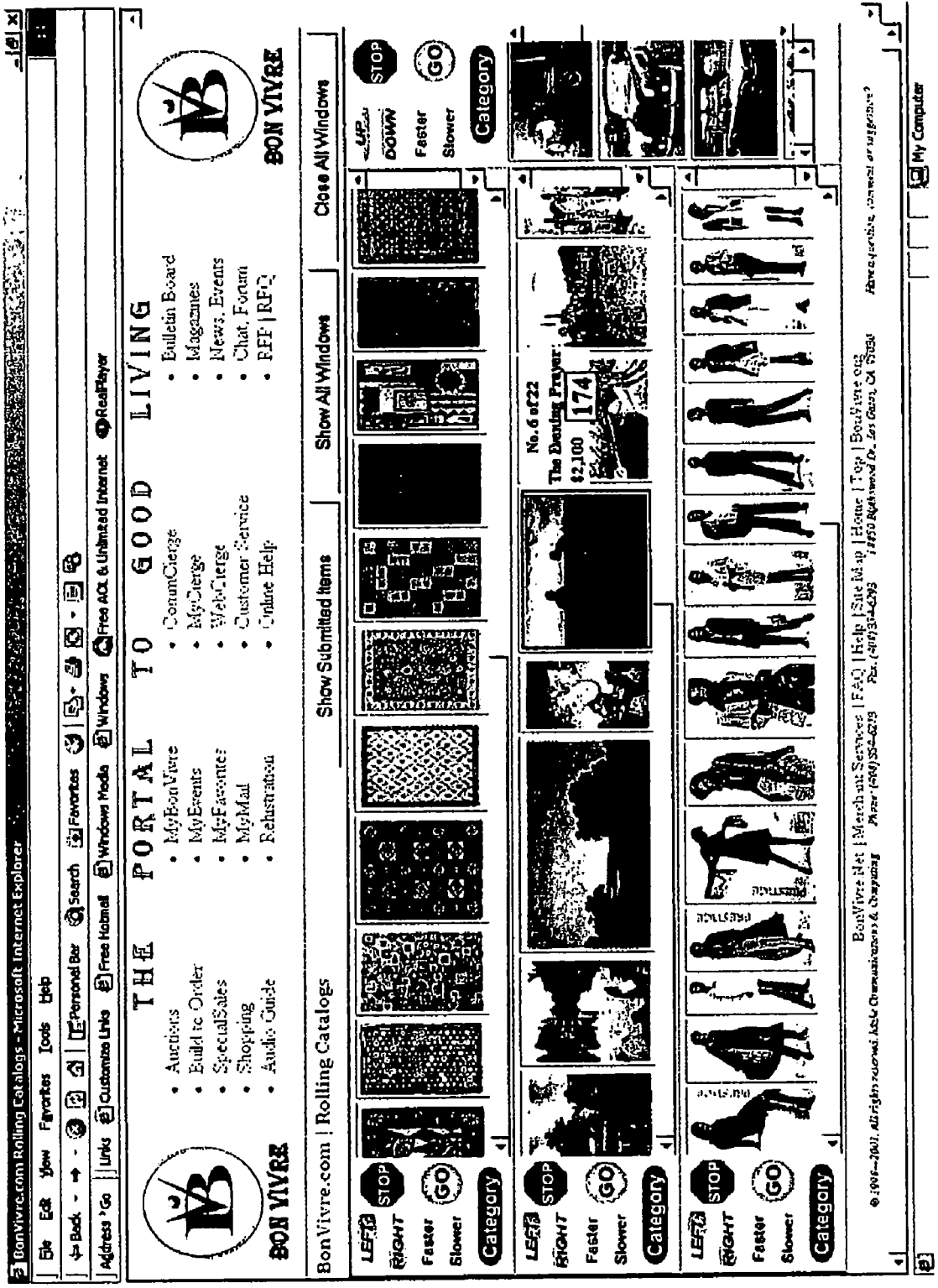
Figure 14H:
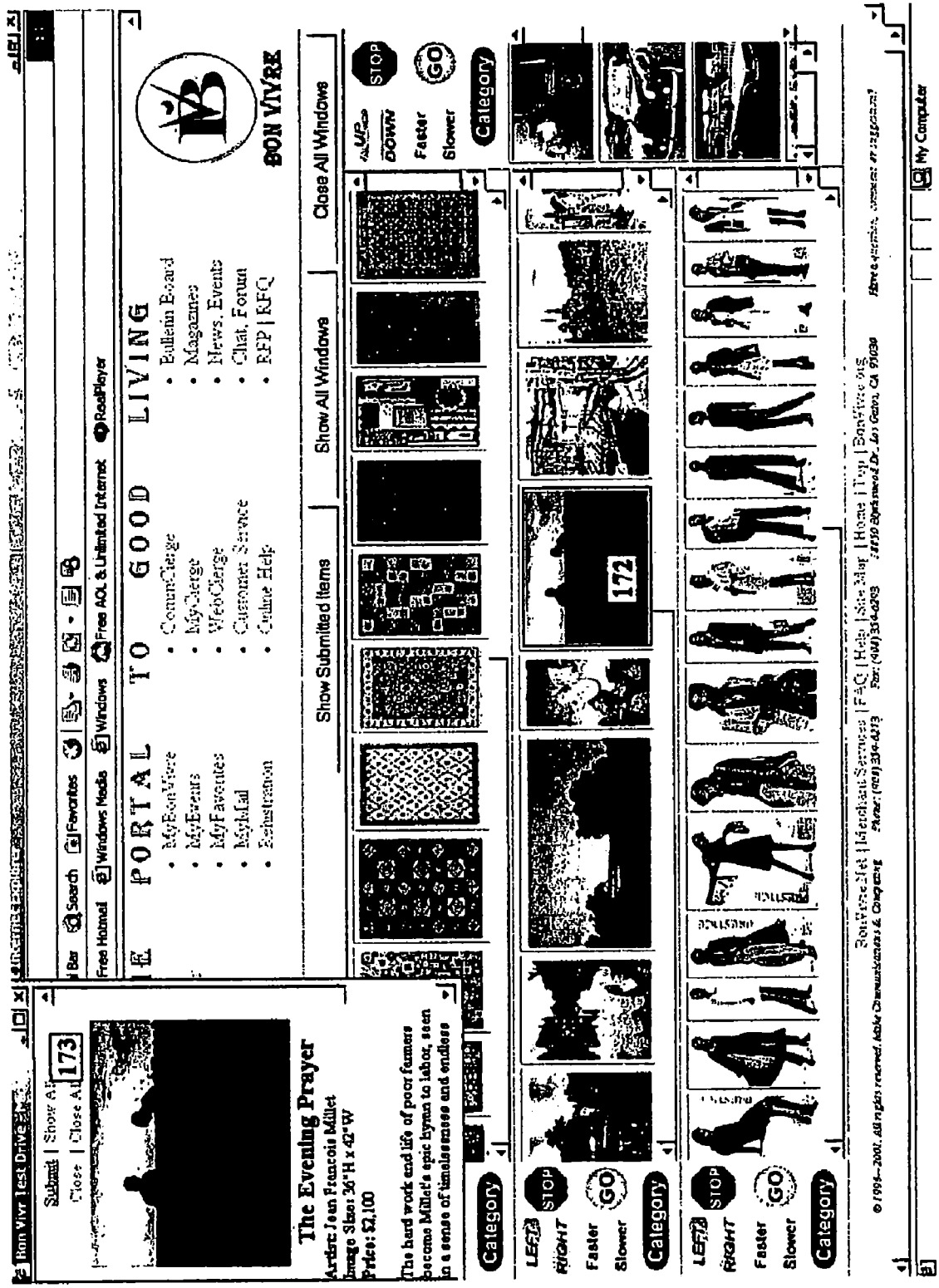
Figure 14I:
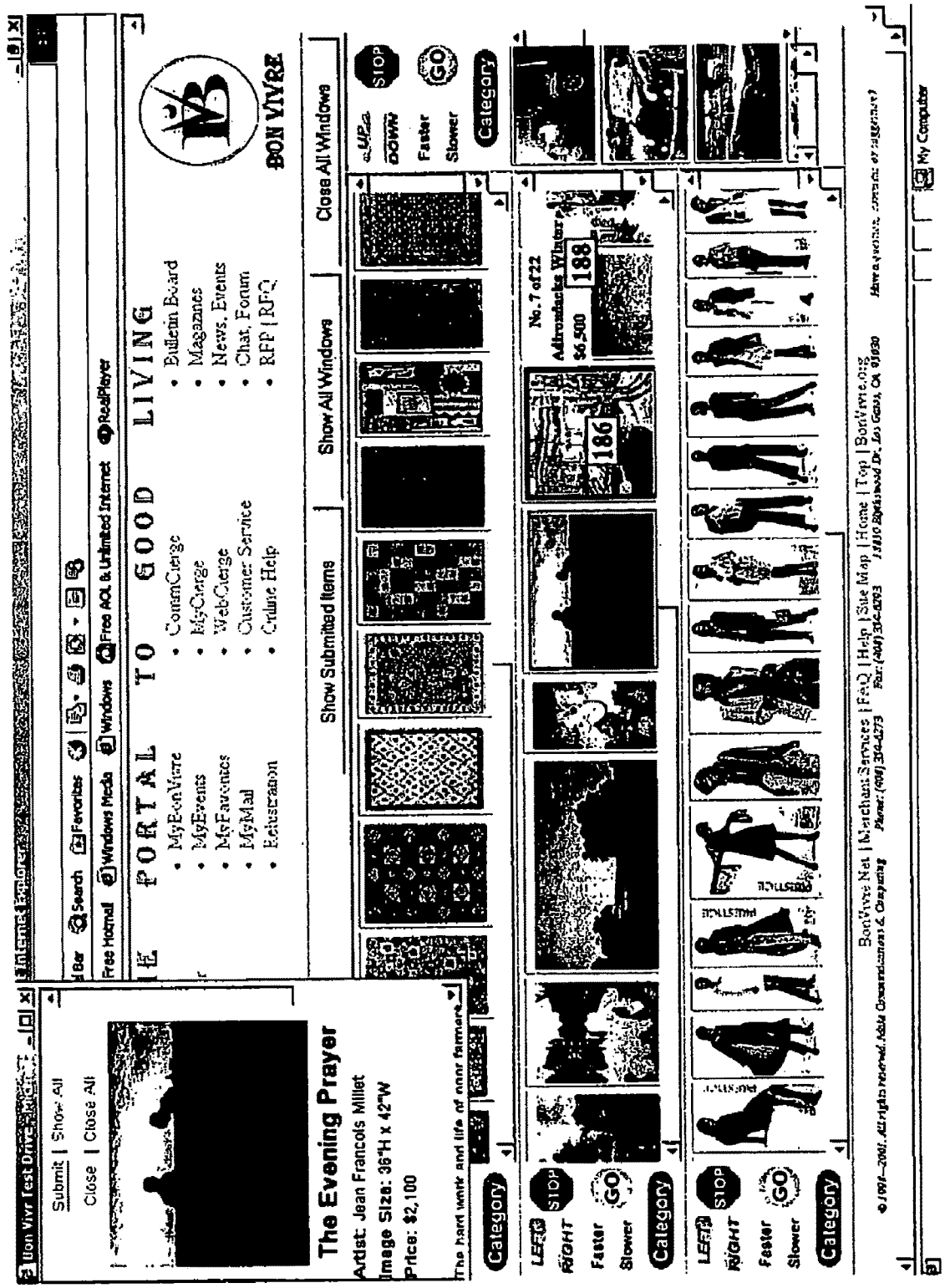
Figure 14J:
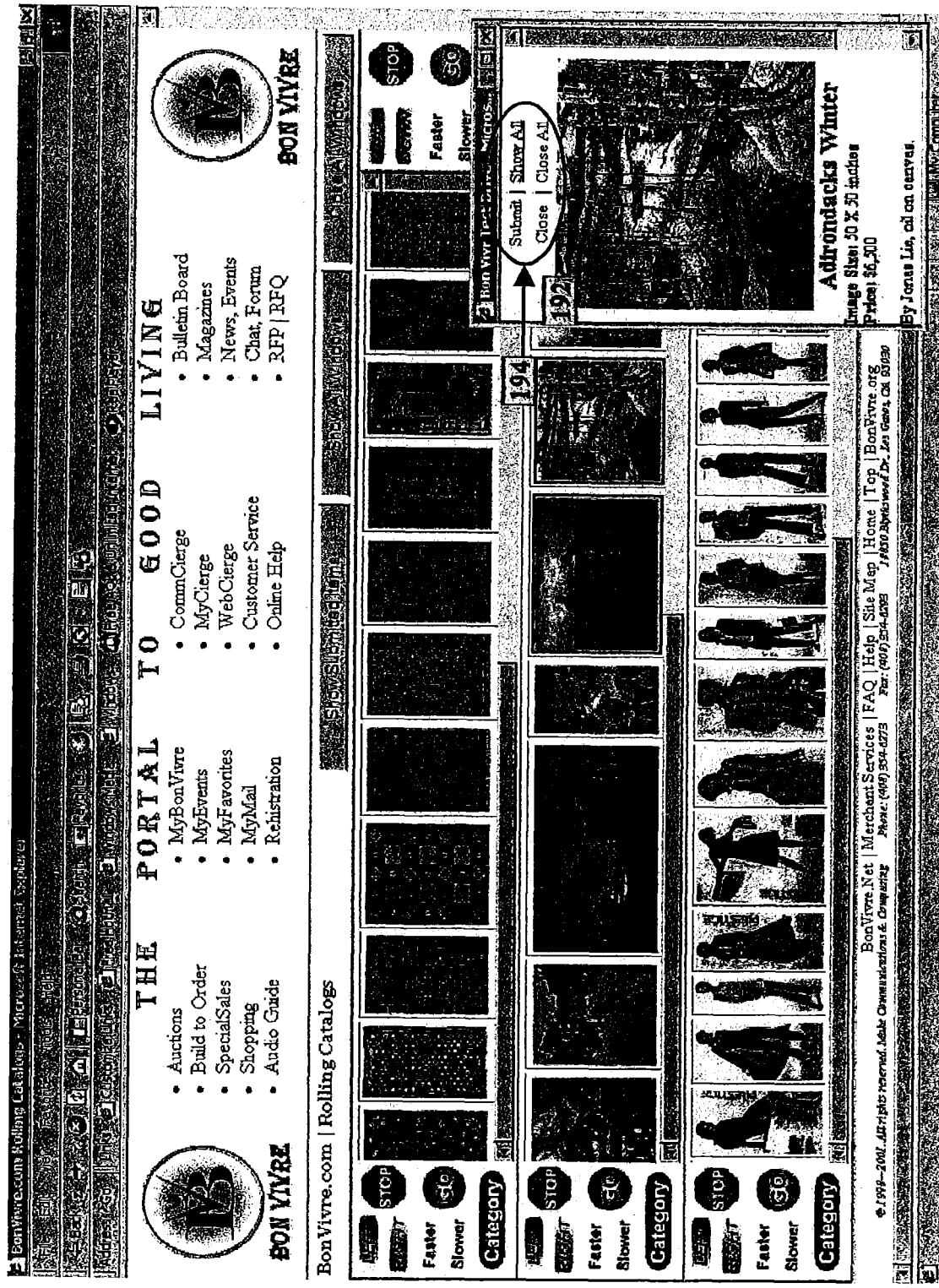
Figure 14K:
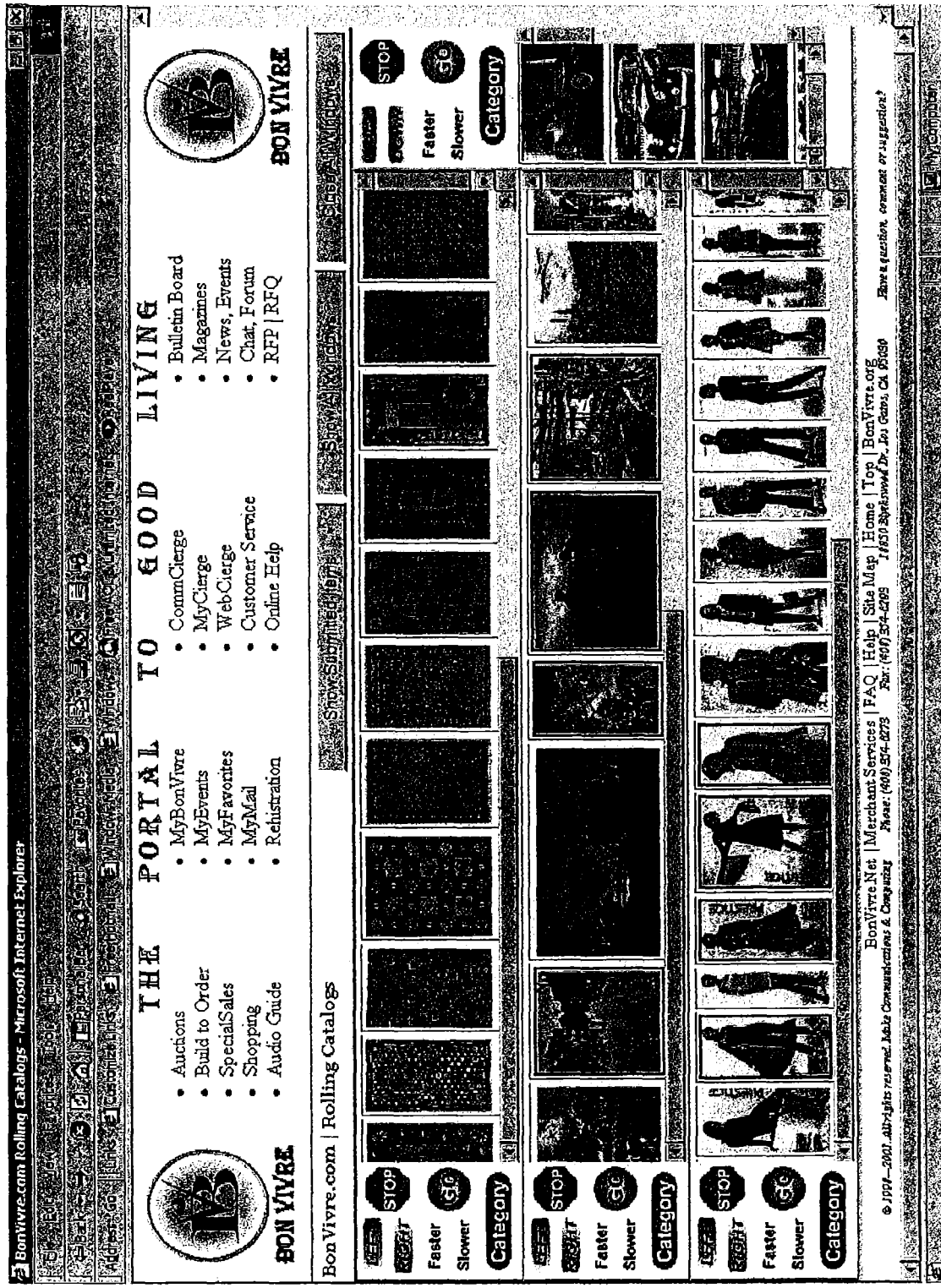
Figure 14L:
Figure 14M:
Figure 14M1:
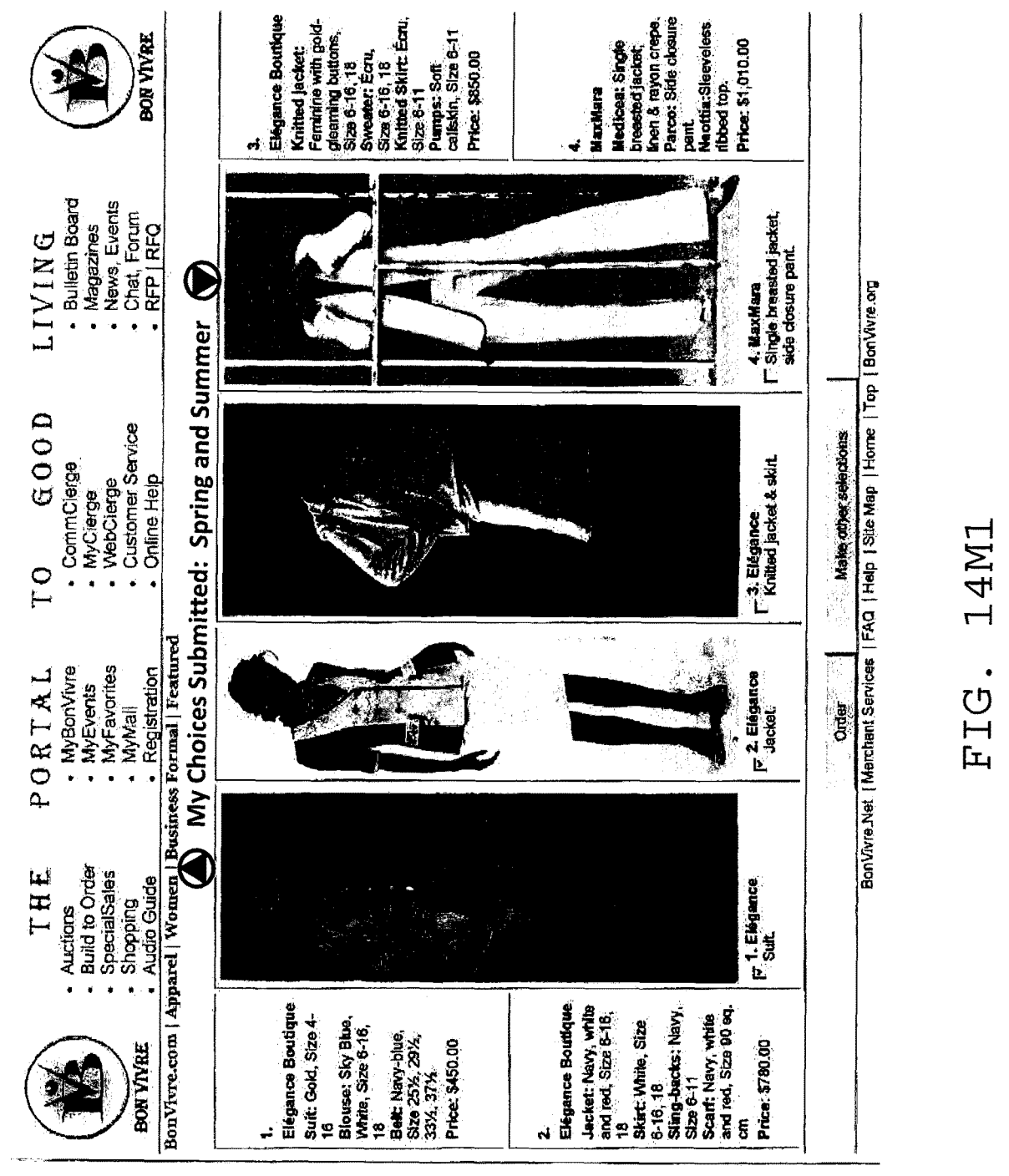

Referring now to FIG. 14A-14M2, which shows the sub-framing and arraying features of the present invention, allowing a multitude of categories with a large number of objects within each category to be presented on any electronic device display screen simultaneously by one-click. Beyond what can be simultaneously shown in one full view-frame of the display screen, additional objects are automatically sequenced/scrolled into view. Many more rows and columns than can be contained in a single screen/view-frame of the device can be accommodated, and viewed by manual or automatic scrolling. Each row or column can display a category, or a sub-category under a main category. The starting categories can first default to the viewer's last selections, or the site-operator's objectives. Each row/column's content is selectable/changeable by the viewer, facilitated via the "Category" 144 button in each row/column. When a viewer moves the cursor onto a "Category" button 144 in a particular row or column, a data entry box and a nested cascading category tree appears one-level after another. A viewer can either enter a category name via the data entry box, or select from the nested cascading category tree, as shown later in FIGS. 14E and 14F.

Referring now to FIG. 14A through 14D, when the content, i.e., number of thumbnails, is more numerous than can be accommodated in one screen viewing area, the present invention allows the sub-frame to contain a scroll bar 142a, a scroll bar 142b, a scroll bar 142c and a scroll bar 142d to indicate that there is more content beyond the viewing area of the screen in the corresponding row or column. The lengths of scroll bars 142a, 142b, 142c, and 142d indicate the ratio of the numbers of the thumbnails already scrolled through the viewing area of the row/column plus those presently displayed in the viewing area, versus the number of additional thumbnails that are beyond the right-edge of the row (or bottom edge for a column) of the view-frame, and yet to come into view from the right (or bottom) side. Alternately, within the present invention, one can implement the scroll bars as floating scroll bars not attached to the triangle manual scroll pointers 142a1 and 142a2, 142b1 and 142b2, 142c1 and 142c2 at either ends of the corresponding scroll bars, (see FIG. 14B, FIG. 14C and FIG. 14D). The shaded portion of the scroll bar in the "floating" manifestation would have a length when compared with the full-length of the scroll bar, represents the proportion of the number of thumbnails that are currently visible within the view-frame versus the total number items/thumbnails in the category the row is assigned to display. The position of the floating scroll bar indicates the position/ordering of the thumbnails presently shown in the display view-frame relative to the entire ordered array of all thumbnails in that category row/column. The length of un-shaded portion represents the proportion of the total number of the thumbnails in the corresponding category-row/column that are beyond the right edge of the view-frame, and yet to be scrolled into the view-frame. The current invention facilitates the automated scrolling of each row or column presented in a sub-frame, commenced when the row or column display space is filled. All rows/columns can be scrolled at the same time, either at the same or different speeds. Alternately, one can auto-scroll one row or one column at a time, or any combination of the number of rows and columns. The scrolling of the thumbnails in each row/column can be controlled via control buttons, for example, selectively started or stopped via the "STOP" 146 button and "GO" 148 buttons. The speed of the scrolling of the thumbnails can be selectively increased or decreased, facilitated by the "Faster" and "Slower" buttons 152. The thumbnails can be scrolled either vertically as shown in column(s) 140d, or horizontally as shown in rows 140a, 140b, 140c, to the left or to the right via the "LEFT" and "RIGHT" buttons 156 for rows, or up and down via the "UP" and "DOWN" buttons 158 for columns.

FIGS. 14A (at time 0) and 14B (at time 1) are snapshots showing row 1 scrolling (notice the shift of the positions of the thumbnails in the row), while rows 2 and 3 remain stationary. FIG. 14C (time 1) is a snapshot showing rows 1 and 2 scrolling (referencing to FIG. 14A at time 0) while row 3 remains stationary. FIG. 14D shows all three rows scrolling. The automate scrolling manifests in the time-1 snapshots 14B, 14C, and 14D is shown in the shifting of thumbnail positions and display of additional thumbnails (those out-of-view in time-0 snapshot FIG. 14A) at the right side of the rows, and the left side thumbnails previously in view in FIG. 14A are now out-of-view in FIGS. 14B, 14C, and 14D correspondingly.

Referring now to FIG. 14E, which illustrates the "nested cascading category menu" of this invention, with multiple-select feature. When the viewer moves the cursor to the "Category" button 144, the first level category menu 160a appears. When the viewer moves the cursor to a particular category, such as "Vehicles" 162, the next-level category menu 160b appears, listing the categorical choices underneath the particular $1^{st}$ level category "Vehicles" 162, which now becomes highlighted. Similarly, when the viewer moves the cursor to a particular category in the $2^{nd}$ level menu, such as "Minivan" 164, a $3^{rd}$ level category menu appears next to the $2^{nd}$ level menu, with the particular $2^{nd}$ level category "Minivan" 164 now also highlighted. The highlights show the hierarchy of the cascading menu. Alternately, the viewer can enter a particular category title in the "Enter Category" entry-box 161, and skipping the nested cascading category menu. The example selection made in FIG. 14E is "Minivan" 164. When the viewer checks the check-box in front of "Minivan" 164, and clicks the "See Them" 166 button below, the thumbnails of all of the subcategories as shown in 160c are brought forth from the database, displayed and scrolled in this particular row in the manner described earlier in this disclosure, as shown scrolling in row 140b in FIG. 14F.

Returning now to FIG. 14E, the nested cascading menu contains the multiple-select feature of this invention. The viewer can select a single subcategory, or a multitude of subcategories from the $2^{nd}$ level (or any subsequent levels) category-menu. The viewer can click on the "check box" to the left of each category to indicate selection, or use any of the previously described (or any other) alternate methods, such as click on the category title, which would change color to indicate selection. When the viewer completes the selection of a multitude of categories, he/she clicks the "See Them" button 166, to submit the selection, which causes the computing device to retreat the thumbnails of all selected categories from the connected storage devices, and display them in that row or column in the manner of the present invention. If the viewer clicks the "See Them" button 166, without making selections from the present menu, all of the categories in that menu are displayed.

Referring now to FIGS. 14G through 14M2, illustrating how information and transaction regarding a multitude of interested thumbnails can be retreated and displayed. As illustrated in FIG. 14G, when the cursor is moved on top of a particular thumbnail 172 in a row or a column, the scrolling of that row/column stops, and the relative position of that particular thumbnail in the total number of thumbnails in that row/column-category, along with a brief high-level description 174 of the object pictured by the particular thumbnail is displayed adjacent to the thumbnail. When the cursor is moved away from the thumbnail and the pausing row/column, the high-level description 174 disappears, and the automatic scrolling resumes. When the viewer decides that the object is of interest from the high level description 174, the viewer "clicks" the input device while the cursor is rested on the thumbnail of the object. A larger and more detailed picture of the object along with detailed descriptions and other links to further information and relevant commands (such as buying, selling, or contact seller commands) is displayed in a sub-frame/window 173 as shown in FIG. 14H. When the user/viewer continues to "overview" the scrolling thumbnails, and finds other interesting thumbnails from the overview, he/she repeats the process by moving the cursor onto the next interested thumbnail 186 shown in FIG. 14I, the high-level description 188 of the thumbnail would pop up next to this object, as shown in FIG. 14I. Each time, when an interested thumbnail is "clicked," a new sub-frame/window pops up to show the large picture and the detailed information of the object represented by the particular thumbnail, while the previous such sub-frames/windows, of previously clicked thumbnails can be automatically minimized, or pushed to the background, and leaving in view only the new sub-frame containing the detailed information and command links of the object represented by the most recently clicked thumbnail, as shown in sub frame 192 in FIG. 14J. This is for the purpose of preserving the maximum viewing of the thumbnail arrays. Any and all sub-frames can be clicked to the foreground for comparison amongst one-another, or all together. Each sub-frame/window can contain a multitude of command buttons 194 that can be "clicked" to perform tasks, for example: (1) to close the individual sub-frame/window, (2) to close "ALL" such sub-frames/windows that are minimized or in the background, (3) to show "ALL" such sub-frames/windows of objects selected in the session (as shown in FIG. 14I) into the foreground as shown in FIG. 14L, and (4) to "submit" request to obtain further information and relevant command links. These particular command buttons are shown as an example, but do not limit the type or number of command buttons that can be implemented in such sub-frames. The thumbnails that have been clicked for its detail-information sub-frame are highlighted as shown in FIG. 14K, as long as the thumbnail's sub-frame has not yet been "closed" out. When a viewer clicks the "Show All" command button in a sub-frame, all of the sub-frames in the background, along with the ones in the foreground would be displayed on the screen with a programmable desired ordering. FIG. 14L shows a left-to-right and top-to-bottom ordering according to the order of "clicking." The large picture, further information, and buy/sell command frames of the "submitted" objects (or any other desired connected information and commands) are presented in the ordered array fashion as previously described, and shown in FIGS. 14M1-M2. The ordering of the presentation can be programmed in the present invention to be in reverse order—the last selected item to be at the top of the array presentation, and the first selected at the bottom of the array-in contrast to the shopping-cart software of prior-art, where the first purchase item is always listed at the top list of "bought items" in the shopping cart, and the last bought item is always at the bottom of the list.

The method and apparatus described herein has many applications, including, but not limited to, 1) storing, selecting, presenting, viewing, examining, and navigation of electronic commerce catalogs in categories, movies, videos, music CDs/Tapes/DVDs, books, other items, other merchandise, and services, 2) storing, selecting, presenting, viewing, and navigation of digital recording of software, equipment manuals, manufacturing, repair, and maintenance instructions, products/parts catalogs, and 3) storing, presentation, reading, listening, viewing, and navigation of digitally recorded books, journals, dictionary, encyclopedia, news, and audio, video, or any other digitally recorded media. A truncated (shorter) or non-truncated (full-length) self-scrolling row or column can also be used, with or without the control buttons, for advertising and promotions.

The present invention is implemented using software, which can be written in many computer languages. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed. Also, information displayed and viewed using the present invention can be printed, stored to other storage medium, and electronically mailed to third parties.

The invention claimed is:

1. A method for configuring and displaying data on an interactive display screen of an electronic display device, the method comprising:
   displaying a page of content on the interactive display screen;
   assigning a designated portion of a displayed page as a thumbnail display area for displaying sets of image representations as graphical thumbnails in a thumbnail array, the thumbnails representing a category of items, each thumbnail representing an item in the category of items, and each thumbnail embedded with a link to an information packet describing the item with various information elements;
   in response to a first thumbnail in the thumbnail array being tentatively selected by a viewer, temporally displaying a predetermined information element in a first information packet linked to the first thumbnail on a first different display area, the predetermined information element including a larger and higher resolution image than the first thumbnail;
   in response to a second thumbnail in the thumbnail array being tentatively selected by the viewer, temporally displaying a predetermined information element in a second information packet linked to the second thumbnail on the first different display area, the second temporarily displayed information element from the second information packet including an image larger and at higher resolution than the second tentatively selected thumbnail; and
   in response to the viewer activating a determined selection of the first thumbnail when the predetermined information element in the first information packet linked to the first thumbnail is displayed on the first different display area, displaying additional information and relevant command links from the full information packet linked to the first thumbnail on a second different display area.

2. A method as in claim 1, additionally comprising:
   opening a new display window for displaying of the full information packet linked to the determinedly selected thumbnail.

3. A method as in claim 1, additionally comprising:
   displaying the full information packet linked to the determinedly selected thumbnail in a same display window that displays the thumbnail array.

4. A method as in claim 1:
   wherein when desirable for a category of items to be compared for viewer choosing convenience, information elements in an information packet linked to the thumbnail are organized into an array with the information elements sequenced according to a nature of each information element; and
   wherein in response to multiple items being determinedly selected from the thumbnail array, displaying full information packets of the determinedly selected items in a contiguous and organized fashion row by row or column by column, with corresponding information elements in the full information packets positioned in corresponding column or row.

5. A method as in claim 1, wherein when and if displaying of a total number of thumbnails in the thumbnail array is larger than an assigned display area can accommodate, parading the thumbnail array through the assigned display area in a time-sharing manner so that in each time period there is displayed a sequenced subset of thumbnails from the thumbnail array so that when all the thumbnails in the thumbnail array have been displayed, sequenced displaying of thumbnails repeats.

6. A method as in claim 1, wherein at a margin location of an assigned portion of the thumbnail display area, including a set of at least one icon which when activated by the viewer, enables the viewer to command specific interactions with displaying of thumbnails, the specific interactions including:
   initiating a change of category of items and representing thumbnails displayed;
   initiating a change of a subset of thumbnails from the thumbnail array displaying in the thumbnail display area;
   Initiating an automated time-shared parading manner of displaying of thumbnails in the thumbnail array, including but not limited to an automated visually scrolling of thumbnails across the thumbnail display area, and an automated visually discrete change from displaying a set of thumbnails to a next set of thumbnails;

changing from a speed of automated parading to a different speed, changing a direction of parading to a different direction, or changing from a smooth scrolling display of sets of thumbnails across the thumbnail display area to a discrete change in time of the sets displayed or to a fade-out of one set and fade-in of the next set.

7. A method as in claim 1, wherein the information packet includes an element that has a mechanism for the viewer to command or conduct a viewer request.

8. A method as in claim 1, when the viewer determinedly selects more than one thumbnail in succession followed by clicking a "Show All" command, information packets of the thumbnails are displayed in an organized and contiguous manner to allow side-by-side comparison, including:

higher resolution images of items, specifications of the items, prices of the items, merchant or owner of the item, an action venue for viewer request, in a corresponding top-down, or side-by-side manner in columns, or rows in an order of a sequence of thumbnails as selected by the viewer.

9. A system that configures and display data on an interactive display screen of an electronic display device, the system including one or more processors and controlling software that performs the following:

display a page of content on the interactive display screen;

assign a designated portion of a displayed page as a thumbnail display area for displaying sets of image representations as graphical thumbnails in a thumbnail array, the thumbnails representing a category of items, each thumbnail representing an item in the category of items, and each thumbnail embedded with a link to an information packet describing the item with various information elements;

in response to a first thumbnail in the thumbnail array being tentatively selected by a viewer, temporally display a predetermined information element in a first information packet linked to the first thumbnail on a first different display area, the predetermined information element including a larger and higher resolution image than the first thumbnail;

in response to a second thumbnail in the thumbnail array being tentatively selected by the viewer, temporally display a predetermined information element in a second information packet linked to the second thumbnail on the first different display area, the second temporarily displayed information element from the second information packet including an image larger and at higher resolution than the second tentatively selected thumbnail; and in response to the viewer activating a determined selection of the first thumbnail when the predetermined information element in the first information packet linked to the first thumbnail is displayed on the first different display area, display additional information and relevant command links from the full information packet linked to the determinedly selected thumbnail on a second different display area.

10. A system as in claim 9, wherein the system including one or more processors and controlling software additionally performs the following:

opening a new display window for displaying of the full information packet linked to the determinedly selected thumbnail.

11. A system as in claim 9, wherein the system including one or more processors and controlling software additionally performs the following:

display the full information packet linked to the determinedly selected thumbnail in a same display window that displays the thumbnail array.

12. A system as in claim 9, wherein the system including one or more processors and controlling software additionally performs the following:

when desirable for a category of items to be compared for viewer choosing convenience, information elements in an information packet linked to the thumbnail is organized into an array with the information elements sequenced according to a nature of each information element; and in response to multiple items being determinedly selected from the thumbnail array, display full information packets of the determinedly selected items in a contiguous and organized fashion row by row or column by column, with corresponding information elements in the full information packets positioned in corresponding column or row.

13. A system as in claim 9, wherein the system including one or more processors and controlling software additionally performs the following:

when and if displaying of a total number of thumbnails in the thumbnail array is larger than an assigned display area can accommodate, parading the thumbnail array through the assigned display area in a time-sharing manner so that in each time period there is displayed a sequenced subset of thumbnails from the thumbnail array so that when all the thumbnails in the thumbnail array have been displayed, sequenced displaying of thumbnails repeats.

14. A system as in claim 9, wherein the system including one or more processors and controlling software additionally performs the following:

at a margin location of an assigned portion of the thumbnail display area, including a set of at least one icon which when activated by the viewer, enables the viewer to command specific interactions with displaying of thumbnails, the specific interactions including:

initiating a change of category of items and representing thumbnails displayed;

initiating a change of a subset of thumbnails from the thumbnail array displaying in the thumbnail display area;

initiating an automated time-shared parading manner of displaying of thumbnails in the thumbnail array, including but not limited to an automated visually scrolling of thumbnails across the thumbnail display area, and an automated visually discrete change from displaying a set of thumbnails to a next set of thumbnails;

changing from a speed of automated parading to a different speed, changing a direction of parading to a different direction, or changing from a smooth scrolling display of sets of thumbnails across the thumbnail display area to a discrete change in time of the sets displayed or to a fade-out of one set and fade-in of the next set.

15. A system as in claim 9, wherein the information packet includes an element that has a mechanism for the viewer to command or conduct a viewer request.

16. A system as in claim 9, wherein the system including one or more processors and controlling software additionally performs the following:

when the viewer determinedly selects more than one thumbnail in succession followed by clicking a "Show All" command, information packets of the thumbnails are displayed in an organized and contiguous manner to allow side-by-side comparison, including:

higher resolution images of items, specifications of the items, prices of the items, merchant or owner of the item, an action venue for viewer request, in a corresponding top-down, or side-by-side manner in columns, or rows in an order of a sequence of thumbnails as selected by the viewer.

\* \* \* \* \*